US011144685B2

(12) United States Patent
Saito

(10) Patent No.: US 11,144,685 B2
(45) Date of Patent: Oct. 12, 2021

(54) SIMULATION METHOD, SIMULATION METHOD BY MBD PROGRAM, NUMERICAL ANALYSIS APPARATUS, NUMERICAL ANALYSIS SYSTEM FOR MBD, NUMERICAL ANALYSIS PROGRAM, AND MBD PROGRAM

(71) Applicant: AGC Inc., Chiyoda-ku (JP)

(72) Inventor: Tsunehiro Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 299 days.

(21) Appl. No.: 16/285,262

(22) Filed: Feb. 26, 2019

(65) Prior Publication Data
US 2020/0082036 A1   Mar. 12, 2020

Related U.S. Application Data

(63) Continuation of application No. PCT/JP2018/043832, filed on Nov. 28, 2018.

(30) Foreign Application Priority Data

Sep. 12, 2018 (JP) .............................. JP2018-170765

(51) Int. Cl.
*G06F 30/20* (2020.01)
*G06F 111/10* (2020.01)
(52) U.S. Cl.
CPC .......... *G06F 30/20* (2020.01); *G06F 2111/10* (2020.01)
(58) Field of Classification Search
CPC ............................ G06F 30/20; G06F 2111/10
(Continued)

(56) References Cited

U.S. PATENT DOCUMENTS 6,138,270 A * 10/2000 Hsu ........................ G06F 8/34
                                                    717/125
10,282,914 B1 * 5/2019 Tran ...................... A61B 5/1128
(Continued)

FOREIGN PATENT DOCUMENTS

EP    2 610 772 A1    7/2013
EP    3 090 948 A1    11/2016
(Continued)

OTHER PUBLICATIONS

International Search Report dated Jan. 22, 2019 in PCT/JP2018/043832 filed Nov. 28, 2018 (with English Translation of Categories of Cited Documents).

(Continued)

*Primary Examiner* — Thai Q Phan
(74) *Attorney, Agent, or Firm* — Oblon, McClelland, Maier & Neustadt, L.L.P.

(57) ABSTRACT

A simulation method executed by a computer includes: dividing an analysis domain into divided domains; generating a calculation data model on the divided domains that includes the volume of each divided domain and a characteristic of the domain with respect to each adjacent domain as the quantities not requiring the vertices and connectivity; generating a requested number of aggregated domains by aggregating the divided domains; generating a calculation data model on the aggregated domains that includes the volume of each aggregated domain and a characteristic quantity of the domain with respect to each adjacent domain as the quantities not requiring the vertices and connectivity; and calculating with respect to the physical quantity, based on a physical property in the analysis domain and the calculation data model on the aggregated domains, conductance representing transfer characteristic between the aggre- (Continued)

gated domains, and capacitance representing accumulation characteristic for each aggregated domain.

13 Claims, 32 Drawing Sheets

(58) Field of Classification Search
USPC .......................................................... 703/2, 5
See application file for complete search history.

(56) References Cited

U.S. PATENT DOCUMENTS

| | | | |
|---|---|---|---|
| 10,650,114 B2* | 5/2020 | Dweik | G06N 20/00 |
| 2009/0006156 A1* | 1/2009 | Hunt | G06Q 30/02 |
| | | | 705/7.11 |
| 2009/0018996 A1* | 1/2009 | Hunt | G06F 16/2264 |
| 2012/0095738 A1 | 4/2012 | Saito et al. | |
| 2013/0173239 A1 | 7/2013 | Uemura et al. | |
| 2013/0306276 A1* | 11/2013 | Duchesneau | F28D 15/0266 |
| | | | 165/104.21 |
| 2014/0064637 A1* | 3/2014 | Anderson | G06T 3/40 |
| | | | 382/298 |
| 2018/0260501 A1* | 9/2018 | Dweik | G06N 20/00 |

FOREIGN PATENT DOCUMENTS

| | | |
|---|---|---|
| WO | WO 2010/150758 A1 | 12/2010 |
| WO | WO 2012/026383 A1 | 3/2012 |

OTHER PUBLICATIONS

Written Opinion dated Jan. 22, 2019 in PCT/JP2018/043832 filed Nov. 28, 2018.
Akira Ohata, "Multi-physics modeling for model-based development", TechShare Inc., ISBN978-4-906864-02-7, Nov. 30, 2012, 13 pages.

* cited by examiner

SIMULATION METHOD, SIMULATION METHOD BY MBD PROGRAM, NUMERICAL ANALYSIS APPARATUS, NUMERICAL ANALYSIS SYSTEM FOR MBD, NUMERICAL ANALYSIS PROGRAM, AND MBD PROGRAM

CROSS-REFERENCE TO RELATED APPLICATIONS

This U.S. non-provisional application is a continuation application of, and claims the benefit of priority under 35 U.S.C. § 365(c) from, PCT International Application PCT/JP2018/043832 filed on Nov. 28, 2018, which is designated the U.S., and is based upon and claims the benefit of priority of Japanese Patent Application No. 2018-170765 filed on Sep. 12, 2018, the entire contents both of which are incorporated herein by reference.

TECHNICAL FIELD

Embodiments of the present invention relate to a simulation method, a simulation method by an MBD program, a numerical analysis apparatus, a numerical analysis system for MBD, a numerical analysis program, and an MBD program.

BACKGROUND ART

Model-based development (referred to as "MBD", below) has drawn attention in recent years in design development of industrial products including motor vehicles, aircrafts, and electronic/electric devices, especially in the automobile industry, as a simulation technology that executes virtual simulation of a process of advanced development and/or performance evaluation without depending on a real product.

For setting up an MBD model or simulation calculation, a functional model setting-up program dedicated to MBD (referred to as an "MBD program", below) is used. As MBD programs, various programs are used that range from free programs developed at universities and the like, to commercial programs that have advanced functions.

At present, a problem in the field of the model-based development (MBD) is development of a technology that facilitates integration with 3D (three-dimensional) simulation. Although unsteady simulation of functions and performance of an entire motor vehicle is executed by MBD using a functional model that has a hierarchical structure covering from the parts level to the entire vehicle level, 1D (one-dimensional) simulation used in MBD cannot analyze or evaluate a physical quantity having a three-dimensional distribution.

For example, an MBD model for calculating the airflow temperature in a cabin of a motor vehicle as a distribution has hitherto been performed mainly by two methods. The first method roughly divides a space in a cabin into domains from experience of an engineer who specializes in air-conditioning control of cabins. Further, the method identifies the amount of heat transfer between the domains in the cabin and a flow distribution based on the experience and experimental results, to generate a heat management MBD model. If executed by a skillful engineer, this method may generate an MBD model that fits the experiments very well. However, if conditions become different, such as the cabin shape and/or space volume being significantly different, the number of occupants being different, and the like, a re-experiment is required every time. Also, another major problem is that the method depends on the personal skill of an engineer.

The second method is a method that generates a simple shape model of a cabin, and generates meshes of several ten thousands to several hundred thousands of cells in the cabin having the simple shape model, to execute a thermal fluid simulation calculation. Since the calculation time is comparatively shorter, a coupled calculation with an MBD program is possible. However, since a simplified cabin shape makes the surface areas of glasses and the body greatly different from those of a real vehicle, the amount of insolation passing through the glasses, the heat of transmission through the body, and even the heat capacity and the like become inaccurate, and thereby, the reliability of a calculation result is greatly impaired. Also, even if a thermal fluid simulation calculation is accelerated with a smaller number of meshes, the calculation time is still required in an order of minutes and hours. Therefore, the calculation time taken in a coupled calculation with an MBD program may increase unusually, and a numerical calculation may become unfeasible.

Meanwhile, not executing a 3D simulation having such a high calculation load, and replacing functions of the 3D simulation with those of an equivalent 0D or 1D simulation as reduction is called model reduction (or a reduced-order model (ROM)).

In conventional model reduction, other than the method described above, a response function method, a response surface method, a statistical model, a neural network, and the like have been used. The response function method uses a function that represents a single output in response to a single input; the response surface method uses a function that represents multiple outputs in response to multiple inputs; and the statistical model is a method that statistically obtains a response to input. It is common for these models that 3D simulation is executed many times to determine a model based on the calculation result data. In the response surface method often used for model reduction, there may be cases where data of several hundreds of cases or more is required. This is a method that requires a very long calculation time for executing the 3D simulation many times to calculate a response curved surface from the data. Also, if (the number of input/the number of outputs) becomes greater, some problems arise such that generation of a response curved surface becomes harder, the response behavior of a generated response curved surface becomes abnormal, and the like. In recent years, with development of AI (artificial intelligence) technologies, neural networks have become used in model reduction. However, regarding the requirement of 3D simulation to be executed many times for learning on a neural network, it is the same as the response surface method.

PRIOR ART DOCUMENTS

Patent Documents

Patent Document 1: WO2010/150758

SUMMARY

According to one aspect of the present invention, a simulation method executed by a computer to numerically analyze a physical quantity in a physical phenomenon, the method comprising:

dividing by the computer the analysis domain into a plurality of divided domains;

generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;

generating a requested number of aggregated domains by aggregating the divided domains;

generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices; and calculating, based on a physical property in the analysis domain and the calculation data model with respect to the aggregated domains, conductance representing a characteristic with respect to transfer of the physical quantity between the aggregated domains and to the outside of the analysis domain, and capacitance representing a characteristic with respect to accumulation of the physical quantity for each aggregated domain.

EMBODIMENTS FOR IMPLEMENTING THE INVENTION

Figure 1:
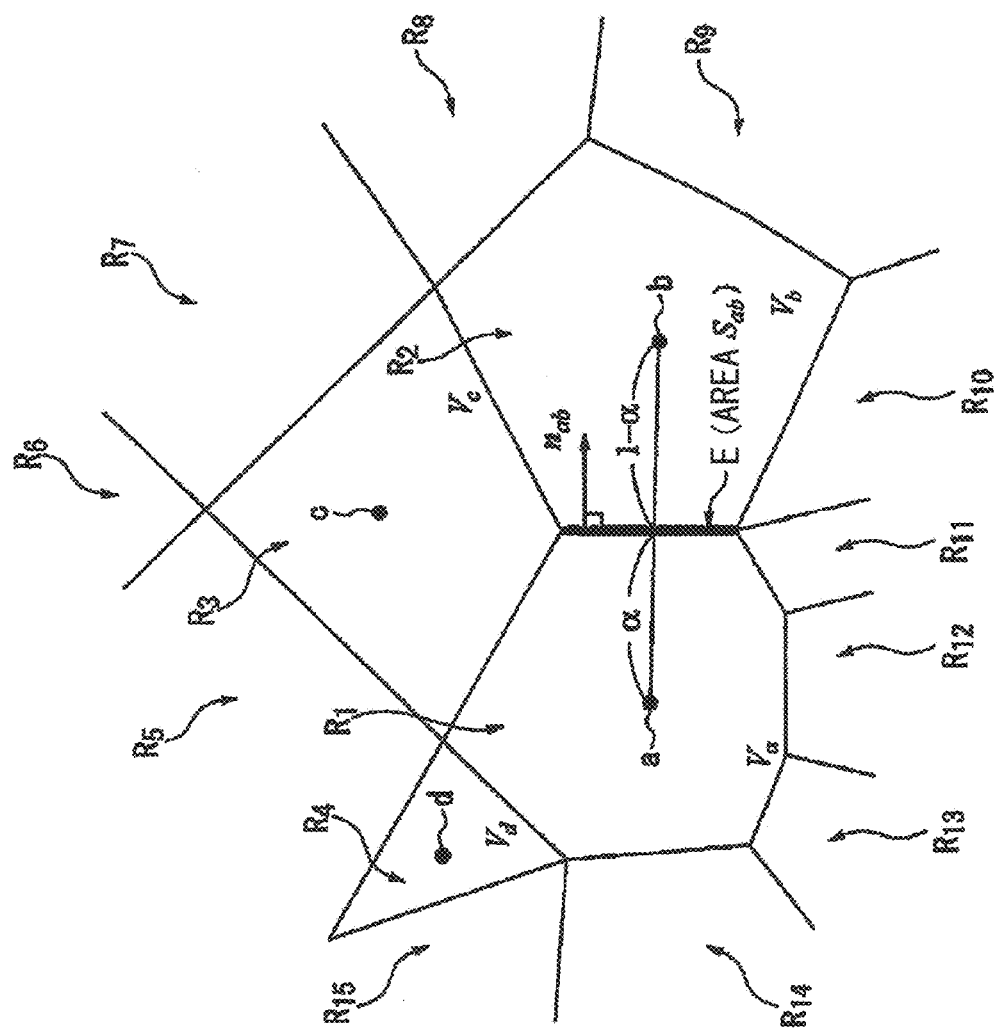
FIG. 1 is a conceptual diagram illustrating an example of a calculation data model of the present numerical analysis method.

A simulation method, a simulation method by an MBD program, a numerical analysis apparatus, a numerical analysis system for MBD, a numerical analysis program, and a numerical analysis program for an MBD program will be described with reference to the drawings. The embodiments described below are merely examples; and an embodiment to which the present invention is applied is not limited to the following embodiments.

According to an embodiment, it is possible to provide a 3D simulation method that can be applied to an MBD program. Further, according to an embodiment, it is possible to significantly shorten the calculation time of the MBD program by applying this 3D simulation method to the MBD program and executing a coupled calculation with the MBD program.

Note that throughout all the drawings for describing the embodiments, the same code will be used for elements having the same function, and repeated description will be omitted.

In the present embodiment, "based on XX" means "at least based on XX", which includes a case based on an element in addition to "based on XX". Also, "based on XX" is not limited to the case directly using XX, and includes a case based on an element obtained by a calculation or a process executed on XX. Here, "XX" represents any element (for example, any information item).

A "physical phenomenon" in the present embodiment means a phenomenon that is reproducible in a simulation. For example, in the case of a simulation related to a cabin of a motor vehicle, a phenomenon of heat transfer may be considered, which may be caused by insolation by the sun transmitting a window glass; heat taken from the outside surface of a window glass depending on the vehicle speed; blowing air caused by air-conditioning; thermal convection and thermal radiation in the cabin; and the like. In addition, a combustion phenomenon in an internal-combustion engine, a mechanical phenomenon in a member of an industrial machine, an electric phenomenon in an electric system, and the like may be considered as examples.

A "physical quantity" in the present embodiment means a quantity obtained as an analysis result of a simulation of a physical phenomenon, such as temperature, thermal flux, stress, pressure, voltage flow velocity, diffusion velocity, and or the like.

An "analysis domain" in the present embodiment means a target domain of an analysis model set for simulating a physical phenomenon. For example, in the case of a cabin of a motor vehicle, the analysis domain corresponds to a cabin space surrounded by objects such as the body, window glasses, and the like. However, other than an analysis domain for calculating the following conductance and capacitance for using in an MBD program, the analysis domain does not include an analysis target as the subject of unsteady calculation by the MBD program.

In the present embodiment, "conductance" is not limited to conductance in an electric circuit, but also means heat conductance that represents a degree of difficulty of heat transmission, conductance that represents a degree of difficulty when a fluid flows, and the like, and represents a characteristic related to transfer of a physical quantity.

In the present embodiment, "capacitance" is not limited to capacitance in an electric circuit, but also means thermal capacitance that represents a heat capacity, capacitance that represents an accumulated amount of mass or momentum of a fluid, and the like, which represents a characteristic with respect to accumulation of a physical quantity.

EMBODIMENTS

A simulation method of the present invention is a method of numerically analyzing a physical quantity in a physical phenomenon by a computer.

In the simulation method, the computer executes dividing an analysis domain into a plurality of divided domains, and generating a calculation data model with respect to the divided domains based on a discretized governing equation with respect to the divided domains that uses only quantities that do not require coordinates of vertices of the divided domains and connectivity information on the vertices, wherein the discretized governing equation is derived based on a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;

Furthermore, in the simulation method, the computer executes generating a requested number of aggregated domains by aggregating the divided domains, and generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived based on a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;

Furthermore, in the simulation method, the computer calculates conductance representing a characteristic with respect to transfer of a physical quantity between the aggregated domains and to the outside of the analysis domain, and capacitance representing a characteristic with respect to accumulation of the physical quantity for each aggregated domain.

Unlike conventional methods, a discretized governing equation used in the present embodiment (referred to as a "discretized governing equation", below) is not expressed in a form that includes coordinates of vertices and connectivity information on the vertices as quantities that specify geometrical shapes of divided domains; namely, the equation does not require coordinates of vertices and connectivity information on the vertices as quantities that specify geometrical shapes of divided domains. In the present embodiment, in the following, coordinates of vertices and connectivity information on the vertices as quantities that specify geometrical shapes may be simply referred to as "quantities that specify geometrical shapes".

The discretized governing equation used in the present embodiment does not require even quantities that specify geometrical shapes of aggregated domains formed by aggregating multiple divided domains. The discretized governing equation used in the present embodiment can be obtained by forcibly stopping halfway through a process of deriving a conventional equation that uses quantities specifying geometrical shapes, based on a weighted residual method.

The discretized governing equation as such used in the present embodiment is expressed with quantities that do not require geometric shapes of divided domains; and the equation can be expressed in a form depending on only two types of quantities, for example, the volume and a boundary-surface characteristic quantity of each divided domain. The discretized governing equation in the present embodiment is expressed with quantities that do not require geometric shapes of aggregated domains; and the equation can be expressed in a form depending on only two types of quantities, for example, the volume and a boundary-surface characteristic quantity of each aggregated domain.

Note that in the present embodiment, the term "divided domain" is called as such for the sake of convenience; this divided domain is different from a divided domain in the conventional finite element method, finite volume method, and the like, and in the present embodiment, a so-called mesh is not required. The present embodiment is a meshless simulation method.

In other words, in the conventional finite element method and finite volume method, as a prerequisite, an object to be analyzed is divided into minute domains; therefore, a discretized governing equation is derived on the assumption that the quantities specifying the geometrical shapes of the minute domains are used. However, the discretized governing equation used in the present embodiment is derived based on an idea which is different from these conventional methods.

Further, the present embodiment uses a discretized governing equation derived based on this idea, and unlike the conventional numerical analysis methods such as the finite element method and finite volume method, is not dependent on quantities that specify geometrical shapes. Also, the present embodiment solves conventional problems, and brings various remarkable effects. Also, in addition to these effects, by enabling calculation with respect to aggregated domains formed by aggregating divided domains, the present embodiment brings effects of enabling model reduction, enabling implementation on an MBD program, and shortening the calculation time of the MBD program, which have been neither disclosed nor implied in Patent document 1.

Here, it will be described that the volume and a boundary-surface characteristic quantity of a divided domain are quantities that do not require quantities that specify a specific geometrical shape of the divided domain. Note that the quantities that do not require quantities that specify a geometrical shape mean quantities that can be defined without using the vertices and connectivity.

For example, considering the volume of a divided domain, there exist multiple geometric shapes of the divided domain for the volume to have a certain specific value. In other words, the geometric shape of the divided domain whose volume takes the specific value could be a cube, a sphere, or the like. Then, for example, the volume of the divided domain can be defined by an optimization calculation such that the volume of the divided domain is proportional the cube of the average distance with respect to adjacent divided domains as much as possible, under a constraint condition that the total sum of all the divided domains is equivalent to the volume of the entire analysis domain. Therefore, the volume of the divided domain can be regarded as a quantity that does not require a quantity that specifies a specific geometric shape of the divided domain.

Also, as a boundary-surface characteristic quantity of a divided domain, for example, the area of the boundary surface, the normal vector of the boundary surface, the perimeter of the boundary surface, and the like can be considered; and there exist multiple geometric shapes of the divided domain for these boundary-surface characteristic quantities to have a certain specific value. Then, the boundary-surface characteristic quantity can be defined, for example, by an optimization calculation such that, under a constraint condition that the length of the area-weighted average vector of normal vectors with respect to all the boundary surfaces delimiting the divided domain is zero, the direction of the normal vector of each boundary surface is brought closer to the line segment that connects the control point of the divided domain and the control point of the adjacent divided domain (see FIG. 1), and that the total sum of the areas of all the boundary surfaces delimiting the divided domain is proportional to the three-halves power of the volume of the divided domain as much as possible. Therefore, the boundary-surface characteristic quantity of a divided domain can be regarded as a quantity that does not require a quantity that specifies a specific geometric shape of the divided domain. Such a characteristic with respect to the boundary-surface characteristic quantity of a divided domain similarly exists with respect to the boundary-surface characteristic quantity of an aggregated domain.

Also, the volume and a boundary-surface characteristic quantity of an aggregated domain are quantities that do not require the vertices and connectivity that specify a specific geometric shape of the aggregated domain, as in the case of a divided domain.

Also, in the present embodiment, the "discretized governing equation that uses only quantities that do not require quantities that specify geometrical shapes" means a discretized governing equation in which values to be substituted consist of only quantities that do not require the vertices and connectivity.

With reference to a conceptual diagram in FIG. 1, a detailed description will be given while contrasting a pre-process and a solver process in a numerical analysis method in the present embodiment, with those in the conventional numerical analysis methods.

In the case of a numerical analysis method using the present embodiment, in the solver process, a discretized governing equation using only quantities that do not require quantities that specify geometrical shapes is used to calculate the physical quantity in the aggregated domains. Because of this, when solving the discretized governing equation, there is no need to include the vertices and connectivity in a calculation data model generated in the preprocess.

Then, in the case of using the present embodiment, as quantities that do not require quantities that specify geometrical shapes, the volumes and the boundary-surface characteristic quantities of the aggregated domains are used. Because of this, a calculation data model generated in the preprocess does not have the vertices and connectivity, but is generated to have the volumes, the boundary-surface characteristic quantities of the aggregated domains, and other auxiliary data (e.g., linkage information of the divided domains and the coordinates of control points, as will be described later) of the aggregated domains.

In this way, in the case of using the present embodiment, as described above, based on the volumes and the boundary-surface characteristic quantities of the aggregated domains as quantities that do not require quantities that specify geometrical shapes, a physical quantity in each domain can be calculated. Because of this, it is possible to calculate the physical quantity without giving quantities that specify geometrical shapes of the aggregated domains in a calculation data model. Therefore, by using the present embodiment, it is sufficient in the preprocess to generate a calculation data model having at least the volumes and the boundary-surface characteristic quantities (the areas of the boundary surfaces and the normal vectors of the boundary surfaces) of the aggregated domains, which enables to calculate the physical quantity without generating a calculation data model having quantities that specify geometrical shapes.

Since the calculation data model not having quantities that specify geometrical shapes does not require quantities that specify geometrical shapes of aggregated domains, the model can be generated without being bound by quantities that specify geometrical shapes of the aggregated domains.

Because of this, restrictions imposed on correction work of three-dimensional shape data are alleviated considerably. Therefore, the calculation data model not having quantities that specify geometrical shapes can be generated far more easily as compared with a calculation data model that has quantities that specify geometrical shapes. Therefore, according to the present embodiment, the workload in generating a calculation data model can be reduced.

Also, even in the case of using the present embodiment, in the preprocess, quantities that specify geometrical shapes may be used. In other words, in the preprocess, the volumes, the boundary-surface characteristic values, and the like of divided domains may be calculated using quantities that specify the geometrical shapes. Even in such a case, since it is possible in the solver process to calculate the physical quantity as long as the volumes and the boundary-surface characteristic values of the aggregated domains are available, even if the quantities that specify geometrical shapes are used in the preprocess, no constraint is imposed on the geometric shapes of the aggregated domains, for example, no constraint resulted from distortion or twist of the divided domains, and the workload in generating the calculation data model can be reduced.

Further, by using the present embodiment, since no constraint is imposed on the geometric shapes of the divided domains in the preprocess, the aggregated domains can be changed into any shapes. Because of this, it becomes possible to easily fit the analysis domain to a domain that is desired to be analyzed practically without increasing the number of aggregated domains, and it becomes possible to improve the analysis precision without increasing the calculation load.

Furthermore, since the distribution density of the aggregated domains can also be discretionarily changed by using the present embodiment, it is also possible to further improve the analysis precision while allowing an increase of the calculation load within a necessary range.

In the present embodiment, in the preprocess, first, a calculation data model with respect to divided domains is generated that includes the volumes and the boundary-surface characteristic quantities (the areas of the boundary surfaces and the normal vectors of the boundary surfaces) of the divided domains that are discretionarily arranged, and information that associates divided domains that exchange a physical quantity with each other. For example, this information that associates divided domains that exchange a physical quantity with each other consists of linkage information on divided domains adjacent to each other (links) and the distances between the adjacent domains adjacent to each other. Further, the divided domains associated by this link are not necessarily spatially adjacent to each other, and may be spatially separated from each other. Such a link is not according to quantities that specify geometrical shapes, and compared with quantities that specify geometrical shapes, it is possible to be generated within an extremely shorter time. Also, as will be described in detail later, in the present embodiment, when necessary, there may be a case where coordinates of a control point arranged inside a divided domain are included in the calculation data model with respect to the divided domains. Next, in the present embodiment, in the preprocess, multiple divided domains are aggregated to generate a requested number of aggregated domains. Then, a calculation data model with respect to the aggregated domains is generated that includes the volumes and the boundary-surface characteristic quantities (the areas of the boundary surfaces and the normal vectors of the boundary surfaces) of the aggregated domains, and information that associates aggregated domains that exchange the physical quantity with each other. The information that associates aggregated domains that exchange the physical quantity with each other and linkage information on aggregated domains adjacent to each other (links) also have a similar characteristic with respect to the characteristic of the divided domains. Also, as will be described in detail later, in the present embodiment, when necessary, there may be a case where coordinates of a control point arranged inside an aggregated domain are included in the calculation data model with respect to the aggregated domains.

Then, in the present embodiment, the preprocess transfers to the solver process the calculation data model with respect to the divided domains that includes the volumes, the boundary-surface characteristic quantities, the links, and the coordinates of the control points of the divided domains; boundary conditions; initial conditions; and the like. The solver process solves a discretized governing equation by using the volumes, the boundary-surface characteristic quantities, and the like of the divided domains included in the transferred calculation data model, to calculate the physical quantity.

Also, in the present embodiment, the preprocess also transfers to the solver process the calculation data model with respect to the aggregated domains that includes the volumes, the boundary-surface characteristic quantities, the links, and the coordinates of the control points of the aggregated domains; boundary conditions; initial conditions; and the like. The solver process solves a discretized governing equation by using the volumes, the boundary-surface characteristic quantities, and the like of the aggregated domains included in the transferred calculation data model, to calculate the physical quantity.

In the present embodiment, the solver process calculates the physical quantity without using quantities that specify geometrical shapes, which is significantly different from the conventional finite volume method, and this point is a significant feature of the present embodiment. Such a feature is obtained by using a discretized governing equation that uses only quantities that do not require quantities that specify geometrical shapes in the solver process.

Consequently, in the present embodiment, there is no need to transfer quantities that specify geometrical shapes to the solver process, and the preprocess simply needs to generate a calculation data model not having quantities that specify geometrical shapes. Therefore, as compared with the conventional finite volume method, it is possible to generate a calculation data model far more easily in the present embodiment, and it is possible to reduce the workload in generating a calculation data model.

A discretized governing equation derived based on a weighted residual method as a principle of the numerical analysis method of the present embodiment (referred to as "the present numerical analysis method", below), and a principle by which a physical quantity can be calculated by the volume and a boundary-surface characteristic quantity of an aggregated domain, will be described in detail. Note that in the following description, a character parenthesized in [ ] represents a vector denoted in a boldface in the drawings.

First, a flow of a process of numerical analysis in a numerical analysis method using the present embodiment will be briefly described.

As described above, a numerical analysis method using the present embodiment includes a process of dividing an analysis domain into multiple divided domains (referred to as the "process of dividing into multiple divided domains", below). The present numerical analysis method further includes a process of generating a calculation data model with respect to the divided domains based on a discretized governing equation with respect to the divided domains that uses only quantities that do not require coordinates of vertices of the divided domains and connectivity information on the vertices (referred to as the "process of generating a calculation data model with respect to divided domains", below); the discretized governing equation is derived based on a weighted residual method; and the calculation data model includes the volume of each divided domain and a divided-domain characteristic quantity representing a characteristic quantity of the divided domain with respect to each adjacent domain as the quantities that do not require the coordinates of the vertices of the divided domain and the connectivity information on the vertices.

The present numerical analysis method further includes a process of generating a requested number of aggregated domains by aggregating multiple divided domains (referred to as the "process of generating aggregated domains", below). The present numerical analysis method further includes a process of generating a calculation data model with respect to the aggregated domains based on a discretized governing equation with respect to the aggregated domains that uses only quantities that do not require coordinates of vertices of the aggregated domains and connectivity information on the vertices (referred to as the "process of generating a calculation data model with respect to aggregated domains", below); the discretized governing equation is derived based on a weighted residual method; and the calculation data model includes the volume of each aggregated domain and an aggregated-domain characteristic quantity representing a characteristic quantity of the aggregated domain with respect to each adjacent domain as the quantities that do not require the coordinates of the vertices of the aggregated domains and the connectivity information on the vertices. The present numerical analysis method further includes a process of calculating conductance representing a characteristic with respect to transfer of a physical quantity across aggregated domains, and capacitance representing a characteristic with respect to accumulation of the physical quantity of an aggregated domain, based on a physical property in the analysis domain and the calculation data model with respect to the aggregated domains (referred to as a "calculating process", below).

(Process of Dividing into Multiple Divided Domains)

The process of dividing an analysis domain into multiple divided domains will be described. In the process of dividing into multiple divided domains, the analysis domain is finely divided into cells without using quantities that specify geometrical shapes.

(Process of Generating Calculation Data Model with Respect to Divided Domains)

The process of generating a calculation data model with respect to divided domains will be described. Note that this process of generating a calculation data model with respect to divided domains is substantially the same as a process disclosed in Patent document 1.

In FIG. 1, cells $R_1$, $R_2$, $R_3$, and so on are divided domains obtained by dividing an analysis domain, each of which has the volume $V_a$, $V_b$, $V_c$, and so on. Also, a boundary surface E is a surface where a physical quantity is exchanged between the cell $R_1$ and the cell $R_2$, which corresponds to the boundary surface in the present embodiment. Also, an area $S_{ab}$ represents the area of the boundary surface E, which is one of the boundary-surface characteristic quantities in the present embodiment. Also, $[n]_{ab}$ represents a normal vector of the boundary surface E, which is one of the boundary-surface characteristic quantities in the present embodiment.

Also, control points a, b, c, and so on are arranged inside the respective cells $R_1$, $R_2$, $R_3$, and so on, and in FIG. 1, arranged at positions corresponding to the center of gravity of the cells $R_1$, $R_2$, $R_3$, and so on. However, the control points a, b, c, and so on are not necessarily arranged at the positions corresponding to the center of gravity of the cells $R_1$, $R_2$, $R_3$, and so on. Also, α represents the distance from the control point a to the boundary surface E in the case of defining the distance from the control point a to the control point b as 1, or represents a ratio designating an internally dividing point on the line segment connecting the control point a and the control point b at which the boundary surface E exists. Note that the distance from the control point a to the control point b is an example of the distance between divided domains adjacent to each other.

Note that a boundary surface exists not only between the cell $R_1$ and the cell $R_2$, but also between every two cells adjacent to each other. In addition, the normal vector of the boundary surface and the area of the boundary surface are also given for each of the boundary surfaces.

Further, a calculation data model with respect to divided domains in practice is constructed as a group of data items that includes arrangement data of the control points a, b, c, and so on; volume data representing the volumes $V_a$, $V_b$, $V_c$, and so on of the cells $R_1$, $R_2$, $R_3$, and so on in which the control points a, b, c, and so on exist, respectively; area data representing the area of each boundary surface; and normal vector data representing the normal vector of each of the boundary surfaces (referred to as the "normal vector", below).

The calculation data model with respect to divided domains in the present numerical analysis method is defined to include the volumes $V_a$, $V_b$, $V_c$, and so on of the cells $R_1$, $R_2$, $R_3$, respectively; the area of each boundary surface as the boundary-surface characteristic quantity representing a characteristic of the boundary surface with respect to the corresponding one of the adjacent cells $R_1$, $R_2$, $R_3$, and so on; and the normal vector of each boundary surface as the boundary-surface characteristic quantity representing a characteristic of the boundary surface with respect to the corresponding one of the adjacent cells $R_1$, $R_2$, $R_3$, and so on.

Note that the cells $R_1$, $R_2$, $R_3$, and so on have the control points a, b, c, and so on, respectively. Because of this, the volumes $V_a$, $V_b$, $V_c$, and so on of the cells $R_1$, $R_2$, $R_3$, and so on can be regarded as the volumes of spaces (control volumes) that are virtually occupied by the control points a, b, c, and so on, respectively.

Also, the calculation data model in the present numerical analysis method includes, where necessary, ratio data that represents a ratio α designating an internally dividing point on a line segment connecting control points interposing a boundary surface in-between, at which the boundary surface exists.

In the following, an example of a physical quantity calculation will be described in which the temperature in each cell of an analysis domain is obtained by using a calculation data model as described above. Note that here, the temperature at each control point is obtained as the temperature in each cell.

First, in the present physical quantity calculation, in the case of heat transfer analysis, the present numerical analysis method uses the heat conduction equation expressed as the following Equation (1) and the advection-diffusion equation expressed as the following Equation (2).

$$\frac{\partial}{\partial t}(\rho \cdot C_P \cdot T) = \frac{\partial}{\partial x_j}\left[\lambda \frac{\partial T}{\partial x_j}\right] \quad (1)$$

$$\frac{\partial}{\partial t}(\rho \cdot C_P \cdot T) + \frac{\partial}{\partial x_j}[u_j \cdot (\rho \cdot C_P \cdot T)] = \frac{\partial}{\partial x_j}\left[\rho \cdot C_P \cdot \alpha^* \frac{\partial T}{\partial x_j}\right] \quad (2)$$

where in Equations (1) and (2), t represents time; $x_i$ (i=1, 2, 3) represents a coordinate in a Cartesian system; ρ represents the density of a substance through which heat transfers; $C_p$ represents the specific heat of the substance through which heat transfers; $u_i$ (i=1, 2, 3) represents a flow velocity component of the substance through which heat transfers; λ represents the thermal conductivity of the substance through which heat transfers; and the subscripts i (i=1, 2, 3) and j (j=1, 2, 3) represent respective components in the respective directions in the Cartesian coordinate system. Also, the subscript j follows the summation convention.

Here, $\alpha^*$ is thermal diffusivity in consideration of turbulent diffusion defined by Equation (3), where $\alpha_t$ is turbulent diffusion coefficient.

$$\alpha^* = \frac{\lambda}{\rho \cdot C_P} + \alpha_t \quad (3)$$

Then, based on a weighted residual method, by integrating Equations (1) and (2) with respect to the volume of the control volume of a divided domain, Equation (1) is expressed as the following Equation (4), and Equation (2) is expressed as the following Equation (5).

$$\int_V \left[\frac{\partial}{\partial t}(\rho \cdot C_P \cdot T)\right] dV = \int_S \left[\lambda \frac{\partial T}{\partial n}\right] dS \quad (4)$$

$$\int_V \left[\frac{\partial}{\partial t}(\rho \cdot C_P \cdot T)\right] dV + \int_S [u_n(\rho \cdot C_P \cdot T)] dS = \int_S \left[\rho \cdot C_P \cdot \alpha^* \frac{\partial T}{\partial n}\right] dS \quad (5)$$

where in Equations (4) and (5), V represents the volume of a control volume; $\int_V dV$ represents the integration with respect to the volume V; S represents the area of a control volume; $\int_S dS$ represents the integration with respect to the area S; [n] represents a normal vector of S; $n_i$ (i=1, 2, 3) represents respective components of the normal vector [n]; and ∂/∂n represents the normal derivative. Also, $u_n$ represents flow velocity in the normal direction.

Here, in order to simplify the description, the density ρ, the specific heat $C_p$, and the thermal conductivity λ of a substance through which heat transfers are assumed to be constants. Furthermore, the thermal diffusivity $\alpha^*$ in consideration of turbulent diffusion of the substance through which heat transfers is also assumed to be a constant. However, the constants assumed as such can be extended to a case where the physical properties and/or $\alpha^*$ of a substance through which heat transfers changes depending on time, space, temperature, and the like.

Then, with respect to the control point a in FIG. 1, by discretizing with the area $S_{ab}$ of the boundary surface E and by transforming into an approximation expressed as an algebraic equation, Equation (4) is expressed as the following Equation (6), and Equation (5) is expressed as the following Equation (7).

$$V_a \cdot \left[\rho \cdot C_P \frac{\partial T_a}{\partial t}\right] = \sum_{b=1}^{m}\left[S_{ab} \cdot \lambda \cdot \left(\frac{\partial T}{\partial n}\right)_{ab}\right] \quad (6)$$

$$V_a \cdot \left[\rho \cdot C_P \frac{\partial T_a}{\partial t}\right] + \sum_{b=1}^{m}\left[S_{ab} \cdot u_{nab} \cdot \rho \cdot C_P \cdot T_{ab}\right] = \sum_{b=1}^{m}\left[S_{ab} \cdot \rho \cdot C_P \cdot \alpha^* \cdot \left(\frac{\partial T}{\partial n}\right)_{ab}\right] \quad (7)$$

where each of $u_{nab}$, $T_{ab}$, and $(\partial T/\partial n)_{ab}$ with the subscript ab represents a physical quantity on the boundary surface E between the control point a and the control point b; $u_{nab}$ is the flow velocity in the normal direction on the boundary surface E between the control point a and the control point b; and m represents the number of all control points each of which has a connection relationship (relationship of having a boundary surface in-between) with the control point a.

Then, by dividing Equations (6) and (7) by $V_a$ (the volume of the control volume of the control point a), Equation (6) is expressed as the following Equation (8), and Equation (7) is expressed as the following Equation (9).

$$\rho \cdot C_P \cdot \frac{\partial T_a}{\partial t} = \sum_{b=1}^{m}\left[\frac{S_{ab}}{V_a} \cdot \lambda \cdot \left(\frac{\partial T}{\partial n}\right)_{ab}\right] \quad (8)$$

$$\rho \cdot C_P \cdot \frac{\partial T_a}{\partial t} + \sum_{b=1}^{m}\left[\frac{S_{ab}}{V_a} \cdot u_{nab} \cdot \rho \cdot C_P \cdot T_{ab}\right] = \sum_{b=1}^{m}\left[\frac{S_{ab}}{V_a} \cdot \rho \cdot C_P \cdot \alpha^* \cdot \left(\frac{\partial T}{\partial n}\right)_{ab}\right] \quad (9)$$

Here, by replacing with the following Equation (10), $$\phi_{ab} \equiv \frac{S_{ab}}{V_a} \quad (10)$$

then, Equation (8) is expressed as the following Equation (11), and Equation (9) is expressed as the following Equation (12).

$$\rho \cdot C_P \cdot \frac{\partial T_a}{\partial t} = \sum_{b=1}^{m} \left[ \phi_{ab} \cdot \lambda \cdot \left( \frac{\partial T}{\partial n} \right)_{ab} \right] \quad (11)$$

$$\rho \cdot C_P \cdot \frac{\partial T_a}{\partial t} + \sum_{b=1}^{m} [\phi_{ab} \cdot u_{nab} \cdot \rho \cdot C_P \cdot T_{ab}] = \quad (12)$$

$$\sum_{b=1}^{m} \left[ \phi_{ab} \cdot \rho \cdot C_P \cdot \alpha^* \cdot \left( \frac{\partial T}{\partial n} \right)_{ab} \right]$$

In Equations (11) and (12), each of $u_{nab}$, $T_{ab}$, and $(\partial T/\partial n)_{ab}$ is obtained approximately as a weighted average of physical quantities on the control point a and the control point b (a weighted average considering the upwind scheme in the case of an advective term), and is determined depending on the distance and the direction between the control points a and b; the positional relationship with the boundary surface E located in-between (the above ratio $\alpha$); and the direction of the normal vector of the boundary surface E. Note that $u_{nab}$, $T_{ab}$, and $(\partial T/\partial n)_{ab}$ are quantities unrelated to quantities that specify the geometrical shape of the boundary surface E.

Also and $\phi_{ab}$ defined as Equation (10) is a quantity that represents (area/volume), and is also a quantity unrelated to quantities that specify the geometrical shape of a control volume.

In other words, Equations (11) and (12) as such are arithmetic equations based on a weighted residual method, with which a physical quantity can be calculated only using quantities that do not require the vertices and connectivity that specify cell shapes.

Because of this, by generating the, described above, calculation data model prior to the physical quantity calculation (the solver process) and by using the calculation data model and the discretized governing equations expressed as Equations (11) and (12) in the physical quantity calculation, it is possible to calculate the temperature without using quantities that specify geometrical shapes of the control volumes at all in the physical quantity calculation.

In this way, since it is possible to calculate the temperature without using quantities that specify geometrical shapes at all in the physical quantity calculation, there is no need to have quantities that specify geometrical shapes in the calculation data model. Therefore, when generating the calculation data model, it is not necessary to be bound by the geometric shapes of the cells, and hence, the shapes of the cells can be set discretionarily. Because of this, according to the present numerical analysis method, as described above, it is possible to significantly alleviate the restrictions on the work of modifying three-dimensional shape data.

Note that when solving Equation (11) and (12) in practice, the physical quantities on the boundary surface E such as $T_{ab}$ are normally interpolated by linear interpolation. For example, denoting a physical quantity of the control point a by $\psi_a$ and a physical quantity of the control point b by $\psi_b$ and a physical quantity $\psi_{ab}$ on the boundary surface E can be obtained by the following Equation (13).

$$\psi_{ab} = \frac{1}{2}(\psi_a + \psi_b) \quad (13)$$

Alternatively, the physical quantity $\psi_{ab}$ can also be obtained by the following Equation (14) by using the ratio $\alpha$ designating an internally dividing point on a line segment connecting the control points interposing the boundary surface in-between, at which the boundary surface exists.

$$\psi_{ab} = (1-\alpha) \cdot \psi_a + \alpha \cdot \psi_b \quad (14)$$

Therefore, in the case where the first calculation data model has the ratio data representing the ratio $\alpha$ and by using Equation (14), it is possible to calculate the physical quantity on the boundary surface E by using a weighted average in accordance with separating distances from the control point a and the control point b.

In addition, as expressed in Equation (1), an equation of a continuum model (the heat advection-diffusion equation, and the like) includes a first-order partial derivative (partial differentiation).

Here, for the differential coefficients in the equation of the continuum model, the order of differentiation is lowered by transforming a volume integral into a surface integral by using integration by parts, Gauss's divergence theorem, or the generalized Green's theorem. This enables to transform the first-order differential into a zeroth-order differential (a scalar quantity or a vector quantity).

For example, in the generalized Green's theorem, denoting a physical quantity by $\psi$, a relationship as in the following Equation (15) holds.

$$\int_V \frac{\partial \psi}{\partial x_i} dV = \int_S \psi n_i dS \quad (15)$$

where in Equation (15), ni (i=1, 2, or 3) is a component in the i-direction of a unit normal vector [n] of the surface S.

By transforming the volume integral into the surface integral, the first-order derivative term of the equation of the continuum model is handled as a scalar quantity or a vector quantity on the boundary surface. Also, these values can be interpolated from the physical quantities on the control points by the linear interpolation or the like as described above.

Also, a second-order partial derivative may be included depending on the equation of the continuum model.

An equation obtained by further applying first-order differentiation to the integrand of Equation (15) is expressed as the following Equation (16), and the second-order derivative term of the equation of the continuum model is expressed as the following Equation (17) on the boundary surface E by the transformation from the volume integral into the surface integral.

$$\int_V \frac{\partial^2 \psi}{\partial x_i \partial x_j} dV = \int_S \frac{\partial \psi}{\partial x_j} n_i dS = \int_S \frac{\partial \psi}{\partial n} n_i n_j dS \quad (16)$$

$$\int_{S_{ab}} \frac{\partial \psi}{\partial n_{ab}} \cdot n_{iab} \cdot n_{jab} dS \quad (17)$$

where in Equation (16), $\partial/\partial n$ represents the normal derivative, and in Equation (17) $\partial/\partial n_{ab}$ represents the directional derivative in the direction of $[n]_{ab}$.

In other words, by the transformation from the volume integral into the surface integral, the second-order derivative term in the equation of the continuum model takes a form in which the normal derivative of the physical quantity $\psi$ (the directional derivative in the direction of the normal $[n]_{ab}$ of $S_{ab}$) is multiplied by components $n_{iab}$ and $n_{jab}$ of [n].

Here, $\partial\psi/\partial n_{ab}$ in Equation (17) is approximated by the following Equation (18).

$$\frac{\partial \psi}{\partial n_{ab}} = \frac{\psi_b - \psi_a}{r_{ab} \cdot n_{ab}} \qquad (18)$$

Note that an inter-control-point vector $[r]_{ab}$ between the control point a and the control point b is defined as in the following Equation (19) from the position vector $[r]_a$ of the control point a and the position vector $[r]_b$ of the control point b.

$$r_{ab} \propto r_b - r_a \qquad (19)$$

Therefore, as $S_{ab}$ represents the area of the boundary surface E, Equation (17) turns out to be the following Equation (20), and by using this, Equation (17) can be calculated.

$$\int_{S_{ab}} \frac{\partial \psi}{\partial n_{ab}} \cdot n_{iab} \cdot n_{jab} dS = S_{ab} \cdot \frac{\psi_b - \psi_a}{r_{ab} \cdot n_{ab}} \cdot n_{iab} \cdot n_{jab} \qquad (20)$$

Note that the derivation of Equation (17) brings out the following matters.

Every linear partial differential equation is expressed by a linear sum of constant and partial derivative terms of first-order, second-order, and so on multiplied by respective coefficients. By replacing the physical quantity ψ with the first-order partial derivative of ψ in Equations (16) to (19), it is possible to obtain the volume integral as a higher-order partial derivative by the surface integral as a lower-order partial derivative as in Equation (15). Repeating this procedure one by one starting from a low-order partial differential, it becomes possible to calculate the partial derivative of every term constituting the linear partial differential equation from the physical value 4, at the control point; $\psi_{ab}$ as ψ on the boundary surface calculated by Equation (13) or Equation (14); the inter-control-point distance obtained from the inter-control-point vector defined by Equation (19); the area $S_{ab}$ of the boundary surface E expressed in Equation (6); and the components $n_{iab}$ and $n_{jab}$ of the normal vector expressed in Equation (17).

As described above, the physical quantity calculation in the present numerical analysis method does not require quantities that specify geometrical shapes. Because of this, when generating a calculation data model (preprocess), once the volumes of control volumes, and the areas and the normal vector of boundary surfaces are obtained without using quantities that specify geometrical shapes, by using the discretized governing equations of Equation (11) and Equation (12), it is possible to calculate the temperature without using the geometric shapes of the cells as the geometric shapes of the control volumes at all.

However, in the present numerical analysis method, the volumes of the control volumes and the areas and the normal vector of the boundary surfaces do not necessarily need to be obtained without using the geometric shapes of the control volumes. As such, since quantities that specify geometrical shapes are not necessarily used in the solver process, even if specific geometric shapes of the control volumes, specifically the vertices and connectivity are used, there is no constraint resulted from distortion or twist of the divided domains as imposed in the conventional finite element method and finite volume method; therefore, it is possible to easily generate a calculation data model as described above.

In the present embodiment, when calculating a physical quantity, the conservation law of the physical quantity is satisfied. This will be described next. The reason why the conservation law of the physical quantity is satisfied is substantially the same as the reason described in Patent document 1.

First, in order to satisfy the conservation law of a physical quantity in a physical quantity calculation of the present embodiment, for all the control points, when adding up the discretized governing equation with respect to each of the control points representing a control volume domain, the added-up equation needs to satisfy the conservation law with respect to the entirety of the analysis domain to be calculated.

Next, denoting the total number of control points by N, and adding up Equation (6) and Equation (7) for all the control points, Equation (21) and Equation (22) are obtained, respectively.

$$\sum_{a=1}^{N} \left[ V_a \cdot \left[ \rho \cdot C_P \cdot \frac{\partial T_a}{\partial t} \right] - \sum_{b=1}^{m} \left[ S_{ab} \cdot \lambda \cdot \left( \frac{\partial T}{\partial n} \right)_{ab} \right] \right] = 0 \qquad (21)$$

$$\sum_{a=1}^{N} \left[ V_a \cdot \left[ \rho \cdot C_P \cdot \frac{\partial T_a}{\partial t} \right] + \sum_{b=1}^{m} \left[ S_{ab} \cdot u_{nab} \cdot \rho \cdot C_P \cdot T_{ab} \right] - \sum_{b=1}^{m} \left[ S_{ab} \cdot \rho \cdot C_P \cdot \alpha^* \cdot \left( \frac{\partial T}{\partial n} \right)_{ab} \right] \right] = 0 \qquad (22)$$

Assuming that in Equation (21) and Equation (23), the area of a boundary surface between control points is equivalent in either case of viewing from the control point a side, or of viewing from the control point b side, the heat transferred between the control points has a reversed plus or minus sign on either side of the control point a or of the control point b, and has an equivalent absolute value, and thereby, is canceled to be zero. In other words, Equation (21) and Equation (22) express that with respect to all the domains to be calculated, the difference between the accumulated quantity of heat flowing in and the accumulated quantity of heat flowing out is equal to the unit time change of the heat capacity of all the domains. Therefore, Equation (21) and Equation (22) turn out to be equations of the thermal energy conservation with respect to the entire analysis domain.

Therefore, in order for Equation (21) and Equation (22) to satisfy the conservation law of thermal energy for all the domains to be calculated, it is necessary to satisfy a condition that the area of a boundary surface between two control points is equivalent; and a condition that a normal vector of the boundary surface has a reversed plus or minus sign in either case of viewing from the control point on one side, or of viewing from the control point on the other side, and has an equivalent absolute value.

Also, in order to satisfy the conservation law of thermal energy, it is necessary to satisfy a condition that the total sum of the volumes occupied by the control volumes of divided domains is equivalent to the total volume $V_{total}$ of the entire analysis domain as expressed in the following Equation (23), where N represents the total number of divided domains in the analysis domain.

$$V_{total} = \sum_{a=1}^{N} V_a \quad (23)$$

Note that here, although it has been described with respect to the conservation law of thermal energy, the conservation law should also be satisfied with respect to the mass and the momentum of a continuum. In order to satisfy the conservation law for these physical quantities by taking the total sum with respect to all the control points, it is understood that it is necessary to satisfy a condition that the volume occupied by the control volumes of all the control points is equivalent to the total volume of the entire analysis domain; a condition that the area of a boundary surface between two control points is equivalent for the control points; and a condition that a normal vector of the boundary surface has a reversed plus or minus sign in either case of viewing from the control point on one side, or of viewing from the control point on the other side, and has an equivalent absolute value.

Figure 2:
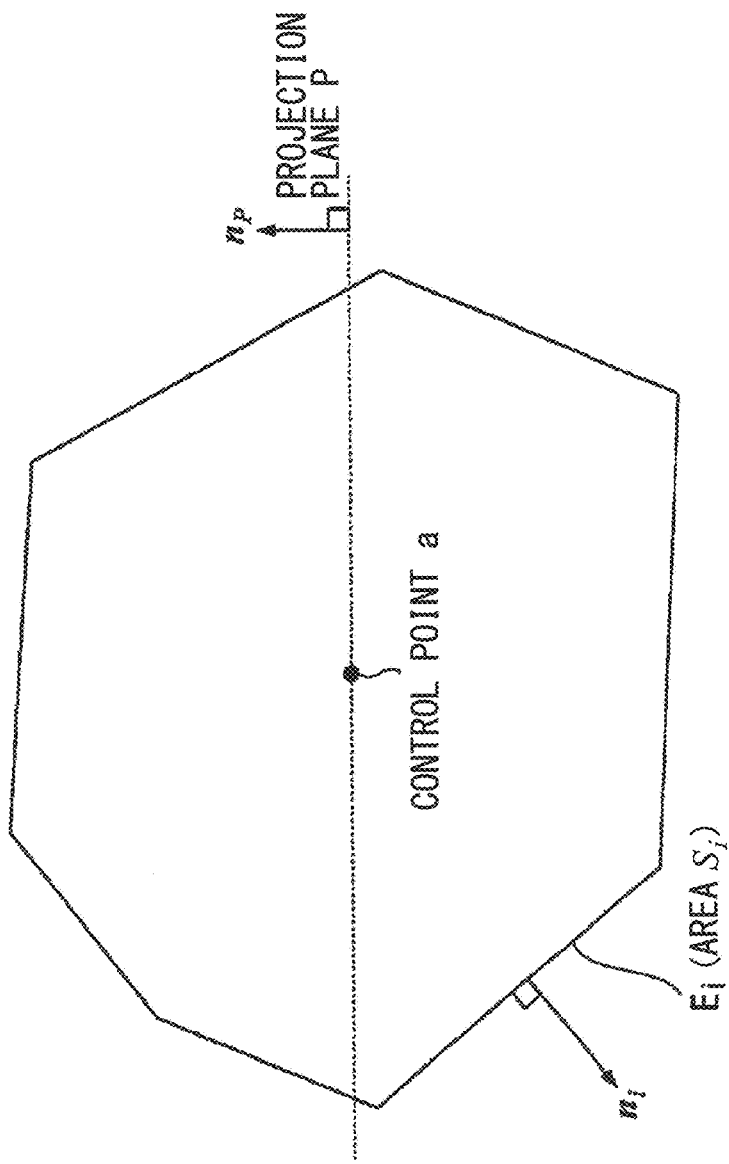
FIG. 2 is a schematic view illustrating an infinitely large projection plane that passes through a control point, and has a unit normal vector directed in an arbitrary direction.

Further, in order to satisfy the conservation law, as illustrated in FIG. 2, considering a control volume occupied by a control point a, a condition is necessary that the following Equation (24) is satisfied considering an infinitely large projection plane P that passes through the control point a, and has a unit normal vector $[n]_p$ directed in an arbitrary direction.

$$\sum_{i=1}^{m} [(n_i \cdot n_p) \cdot S_i] = 0 \quad (24)$$

where in FIG. 2 and Equation (24), $S_i$ represents the area of the boundary surface $E_i$; $[n]_i$ represents the unit normal vector of the boundary surface $E_i$; and m represents the total number of surfaces of the control volume.

Equation (24) expresses that a polyhedron constituting a control volume constitutes a closure space. This Equation (24) is satisfied even if a part of the polyhedron constituting the control volume is dented.

Figure 3:
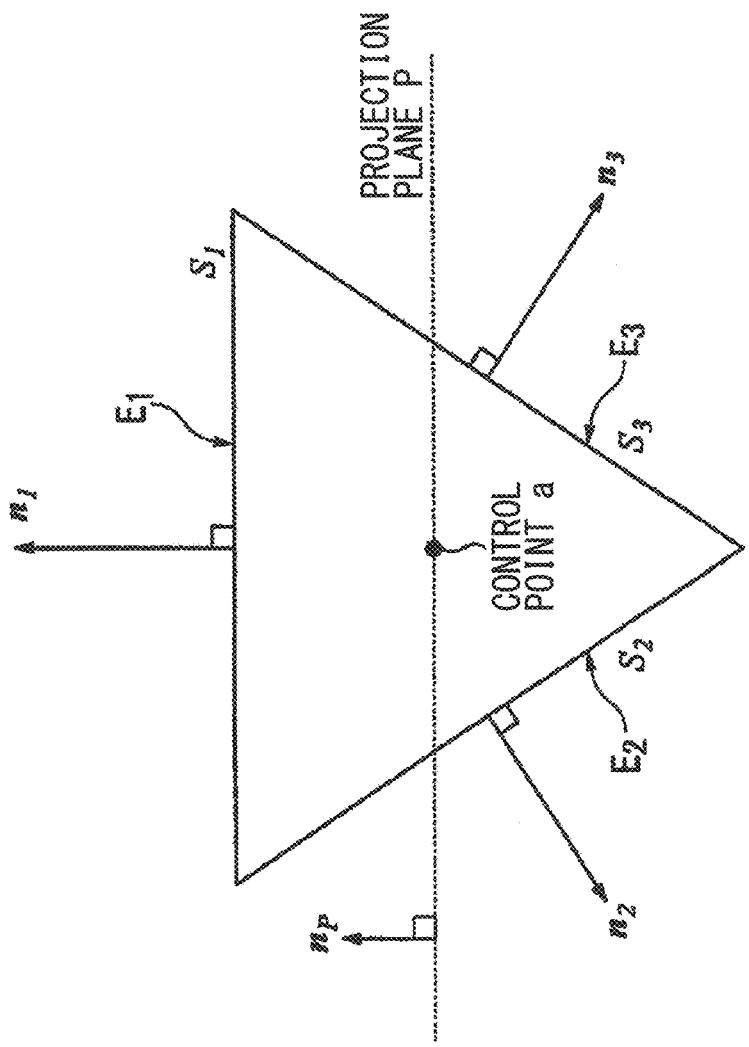
FIG. 3 is a schematic view illustrating a condition under which the conservation law of a physical quantity is satisfied in the case of considering a triangular control volume in a two-dimensional space.
Figure 4:
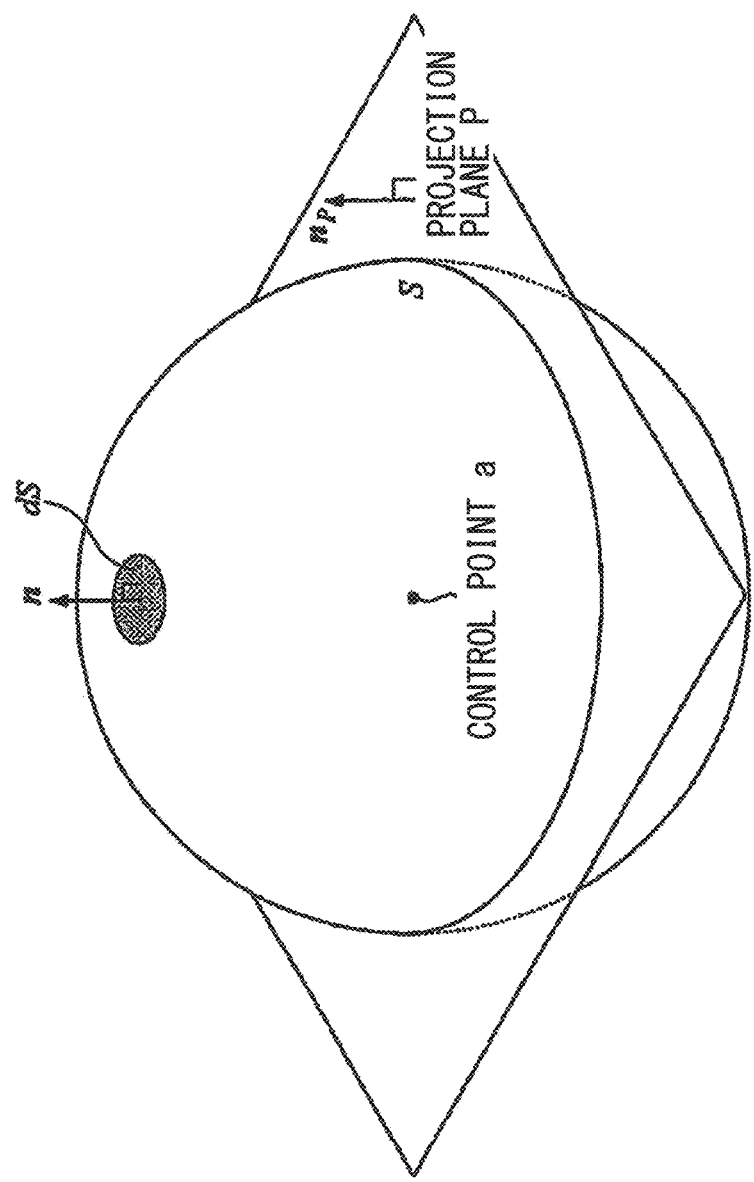
FIG. 4 is a schematic view illustrating a condition under which the conservation law of a physical quantity is satisfied in the case of considering a spherical control volume in a two-dimensional space.
Figure 14:
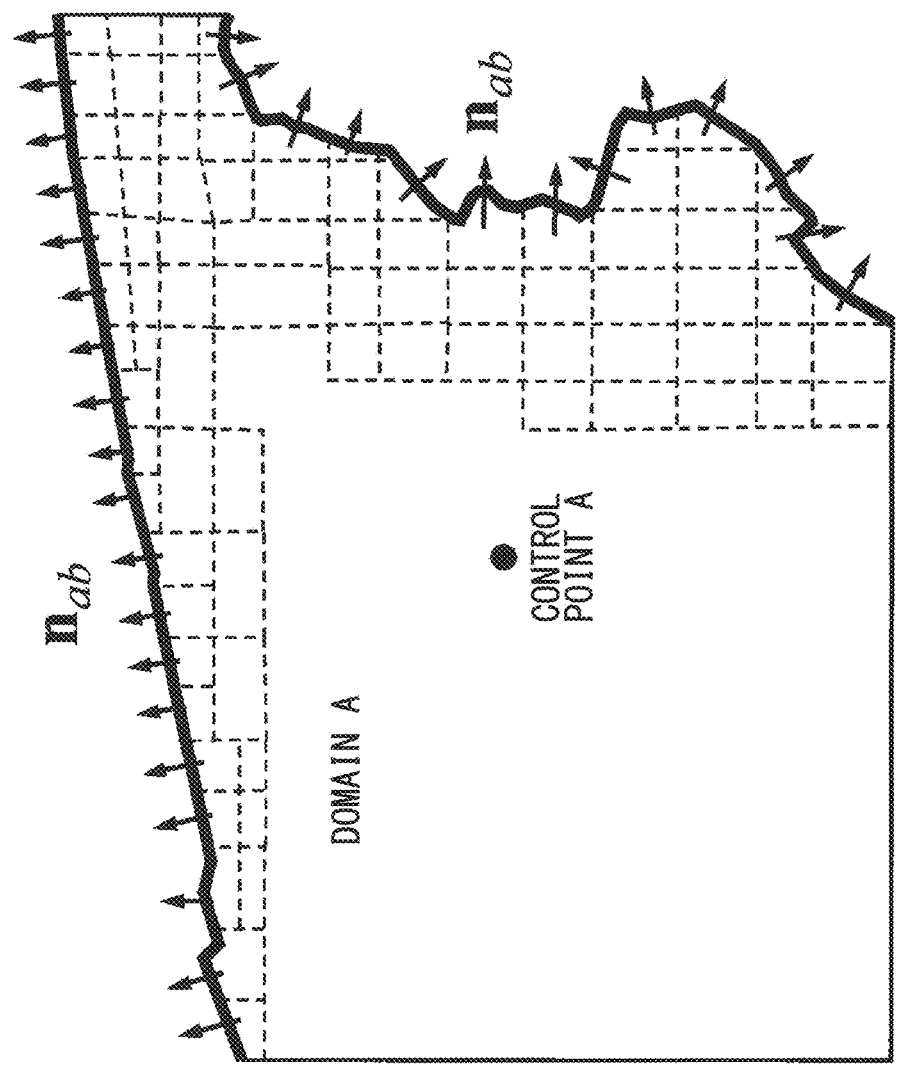
FIG. 14 is a diagram for describing an example of a boundary-surface characteristic quantity of an aggregated domain on a boundary of an analysis domain in a numerical analysis method of the present embodiment.

Note that as illustrated in FIG. 3, Equation (24) is also satisfied with a two-dimensional triangle. Also, by taking one surface of the polyhedron as a minute face dS, and taking the limit of m to infinity, the following Equation (25) is obtained, and it is understood that a curved surface object as illustrated in FIG. 14 also constitutes a closure space.

$$\int_S n \cdot n_p dS = 0 \quad (25)$$

The condition that Equation (24) is satisfied is a necessary condition to satisfy Gauss' divergence theorem and the generalized Green's theorem expressed as Equation (15).

Also, the generalized Green's theorem is a fundamental theorem for discretization of a continuum. Therefore, in the case of transforming a volume integral into a surface integral to be discretized according to Green's theorem, in order to satisfy the conservation law, the condition that Equation (24) is satisfied is indispensable.

As such, when executing a numerical analysis using the calculation data model and the physical quantity calculation as described above, in order to satisfy the conservation law of a physical quantity, the following three conditions are necessary.

(a) The total sum of volumes of control volumes of all control points (the volume of all divided domains) is equivalent to the volume of the analysis domain.

(b) The area of a boundary surface between two control points is equivalent for the two control points; and a normal vector of the boundary surface has an absolute value that is equivalent (with the sign of plus or minus reversed) in either case of viewing from the control point on one side (one of the divided domains forming the boundary surface), or of viewing from the control point on the other side (the other of the divided domains forming the boundary surface).

(c) Equation (24) is satisfied considering an infinitely large projection plane P that passes through a control point (passes through a divided domain), and has a unit normal vector [n]p directed in an arbitrary direction.

In other words, in order to satisfy the conservation law, it is necessary to generate the calculation data models so as to satisfy these conditions. However, as described above, in the present numerical analysis method, when generating a calculation data model, it is possible to change a cell shape of a divided domain discretionarily; therefore, it is possible to easily generate the calculation data models so as to satisfy the above three conditions.

Note that in the description described above, although examples of calculation of a physical quantity have been described in which discretized governing equations derived based on a weighted residual method from the equation of heat conduction and the heat advection-diffusion equation are used, the discretized governing equations that can be used in the present numerical analysis method are not limited to these.

In other words, any discretized governing equation can be used in the present numerical analysis method as long as it is derived from among various equations (the mass conservation equation, the equation for conservation of momentum, the equation for conservation of energy, the advection-diffusion equation, the wave equation, and the like) based on a weighted residual method, and is capable of calculating a physical quantity by using only quantities that do not require quantities that specify geometrical shapes.

Also, such characteristics of the discretized governing equations enable so-called meshless calculation in which a mesh is not required, unlike the conventional finite element method or finite volume method. Further, even if quantities that specify geometrical shapes of cells are used in the preprocess, since there is no constraint on the mesh as imposed in the conventional finite element method, the finite volume method, and the voxel method; therefore, it is possible to reduce the workload accompanying generation of the calculation data model.

In the present embodiment, it is possible to derive a discretized governing equation that uses only quantities that do not require quantities that specify geometrical shapes, based on a weighted residual method, from the mass conservation equation, the equation for conservation of momentum, the equation for conservation of energy, the advection-diffusion equation, and the wave equation. In the present numerical analysis method, it is possible to use other governing equations. In this regard, the reason is substantially the same as described in Patent document 1, and the description is omitted here.

(Process of Generating Aggregated Domains)

Next, a process of generating aggregated domains will be described. In the process of generating aggregated domains, an aggregated domain is generated by an aggregated sum of cells. In the following, an aggregated domain may be referred to as a "domain". Once domains are generated, the analysis domain transitions to a state of being divided by the domains.

Figure 5:
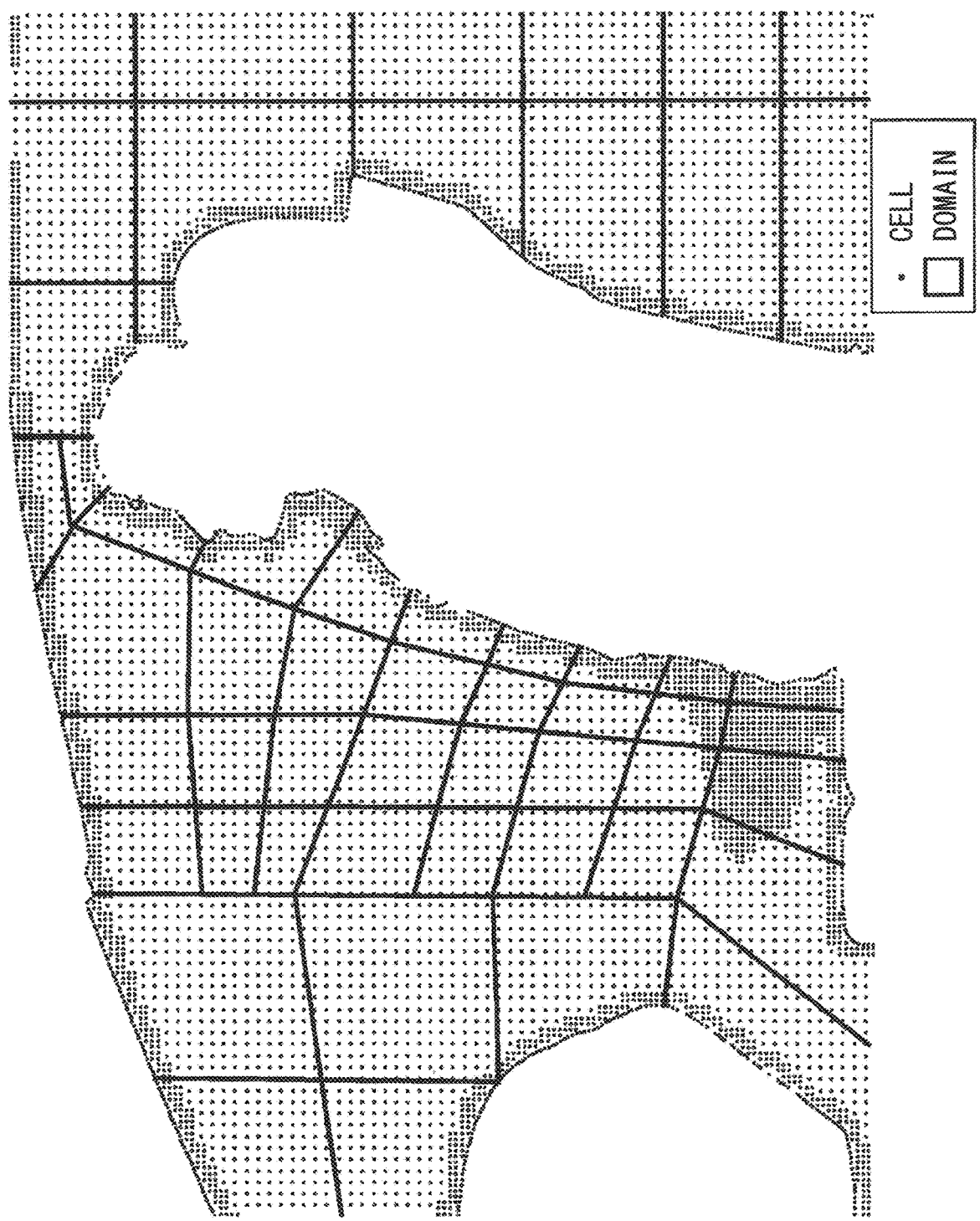
FIG. 5 is a diagram illustrating an example of a process of generating aggregated domains in a numerical analysis method of the present embodiment.

In the process of generating aggregated domains in FIG. 5, a domain is defined as a control volume that is newly set by aggregating control volumes (cells) generated automatically in the analysis domain. The domain is a control volume and is an aggregated sum of cells.

Figure 6:
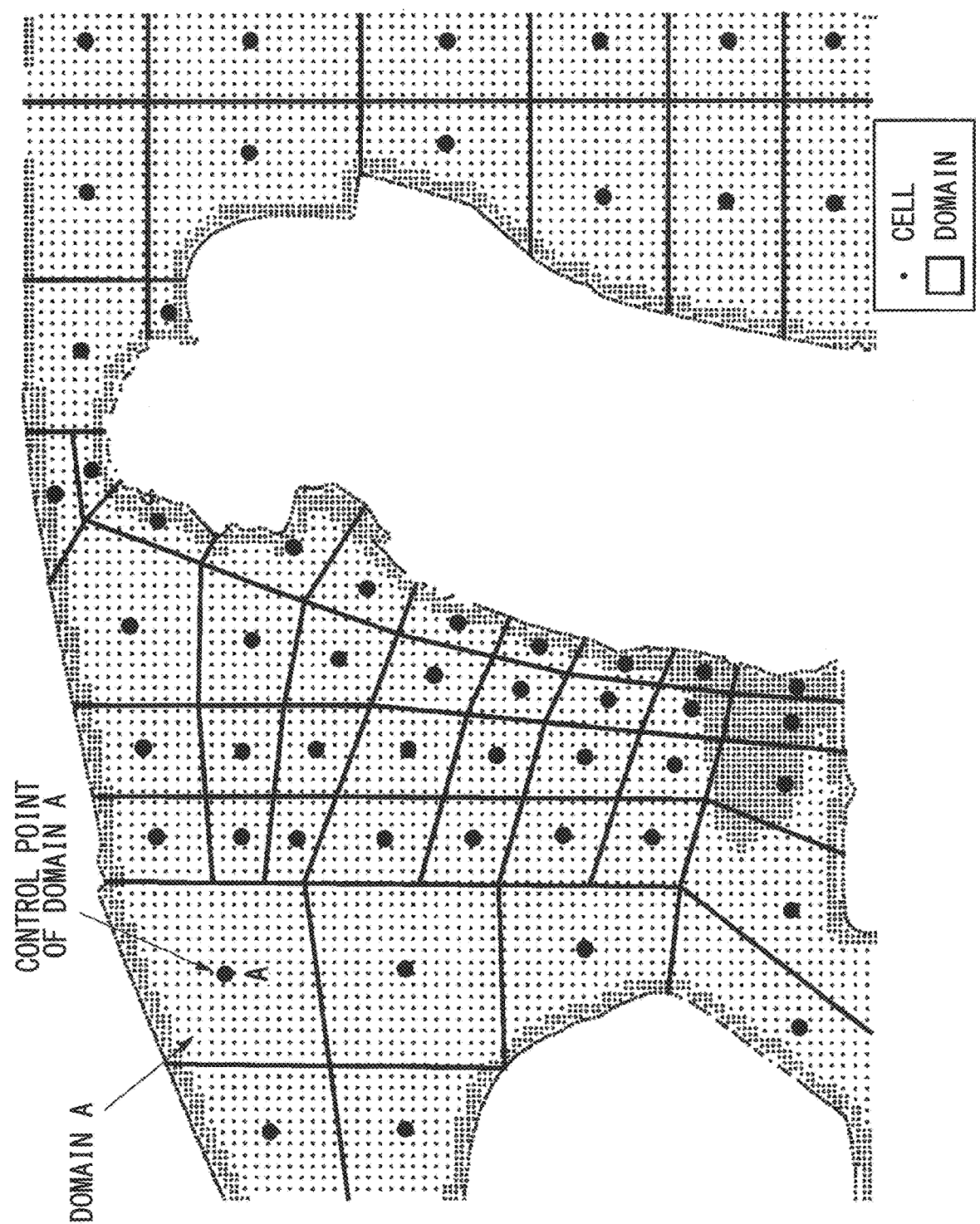
FIG. 6 is a diagram illustrating an example of a process of generating aggregated domains in a numerical analysis method of the present embodiment.

Among multiple domains illustrated in FIG. 6, suppose that a domain A represents any one of the domains. Denoting the total number of cells that exist in the domain A by $NV_A$, the volume $V_A$ of the domain A is expressed as Equation (26), and the coordinate vector $[r]_A$ of the control point of the domain A is expressed as Equation (27). By the following Equation (26) and Equation (27), an aggregated sum of cells is calculated to set a domain.

$$V_A = \sum_{a=1}^{NV_A} V_a \qquad (26)$$

$$V_A \cdot r_A = \sum_{a=1}^{NV_A} [V_a \cdot r_a] \qquad (27)$$

where in Equations (26) and (27), A, B, and so on are subscripts representing respective domains.

Here, after having set domains, a domain may be newly set by aggregating the domains having been set.

Figure 7:
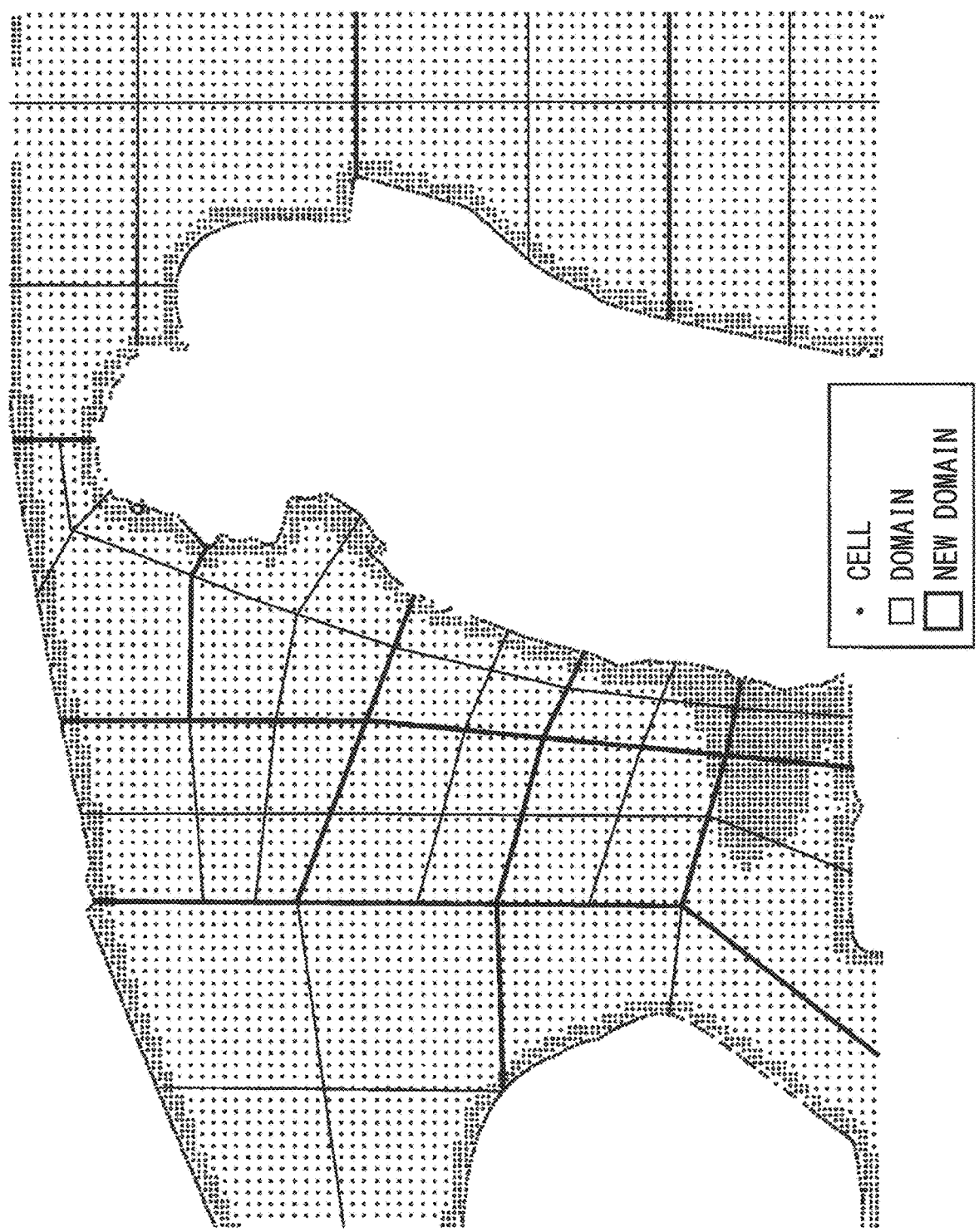
FIG. 7 is a diagram illustrating an example of a process of generating aggregated domains in a numerical analysis method of the present embodiment.

As illustrated in FIG. 7, an aggregated sum of multiple domains are set. In the example illustrated in FIG. 7, a domain is drawn by thin lines.

Figure 8:
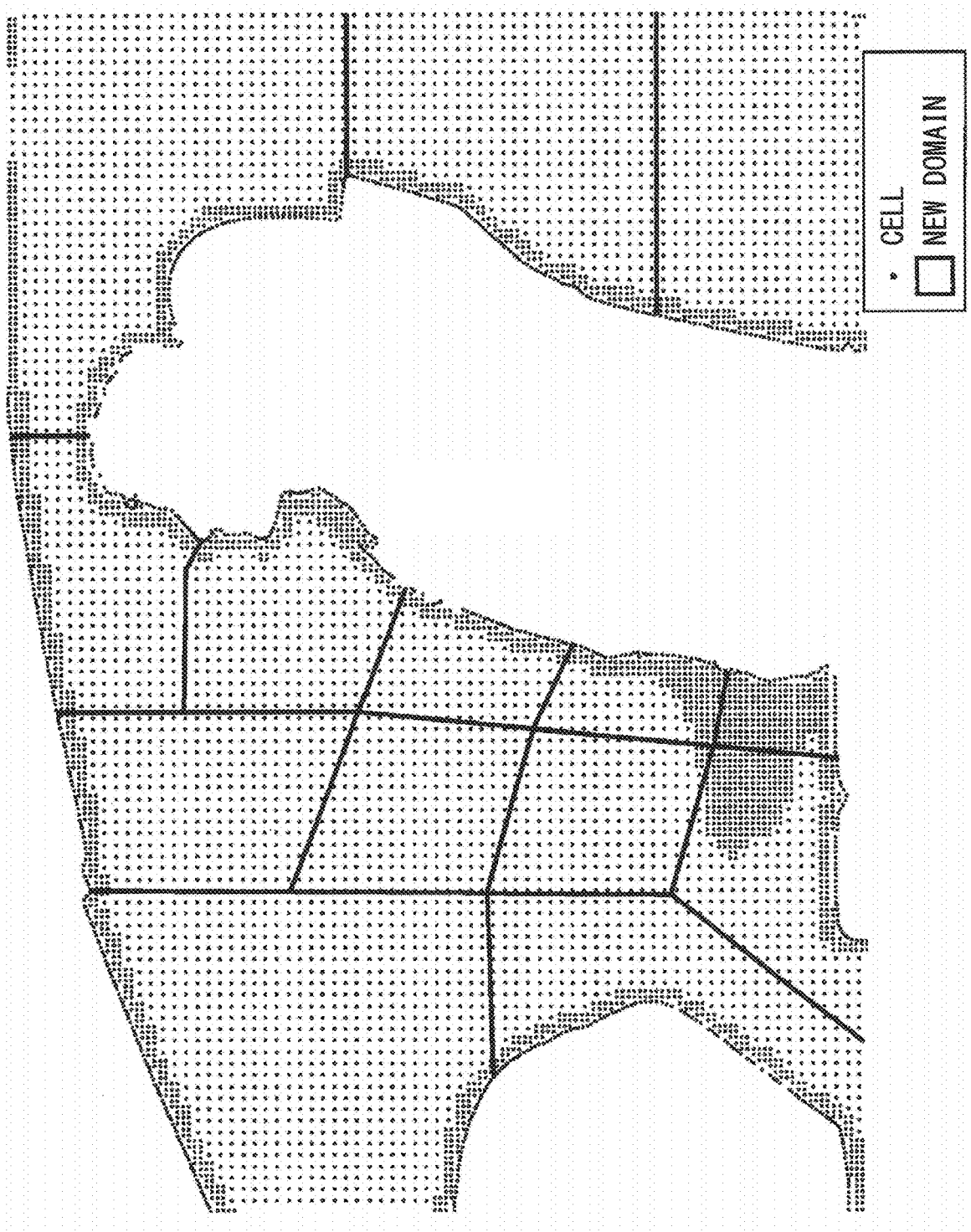
FIG. 8 is a diagram illustrating an example of a process of generating aggregated domains in a numerical analysis method of the present embodiment.

As illustrated in FIG. 8, a domain is newly set by aggregating multiple domains. A newly set domain is drawn by thick lines.

Figure 9:
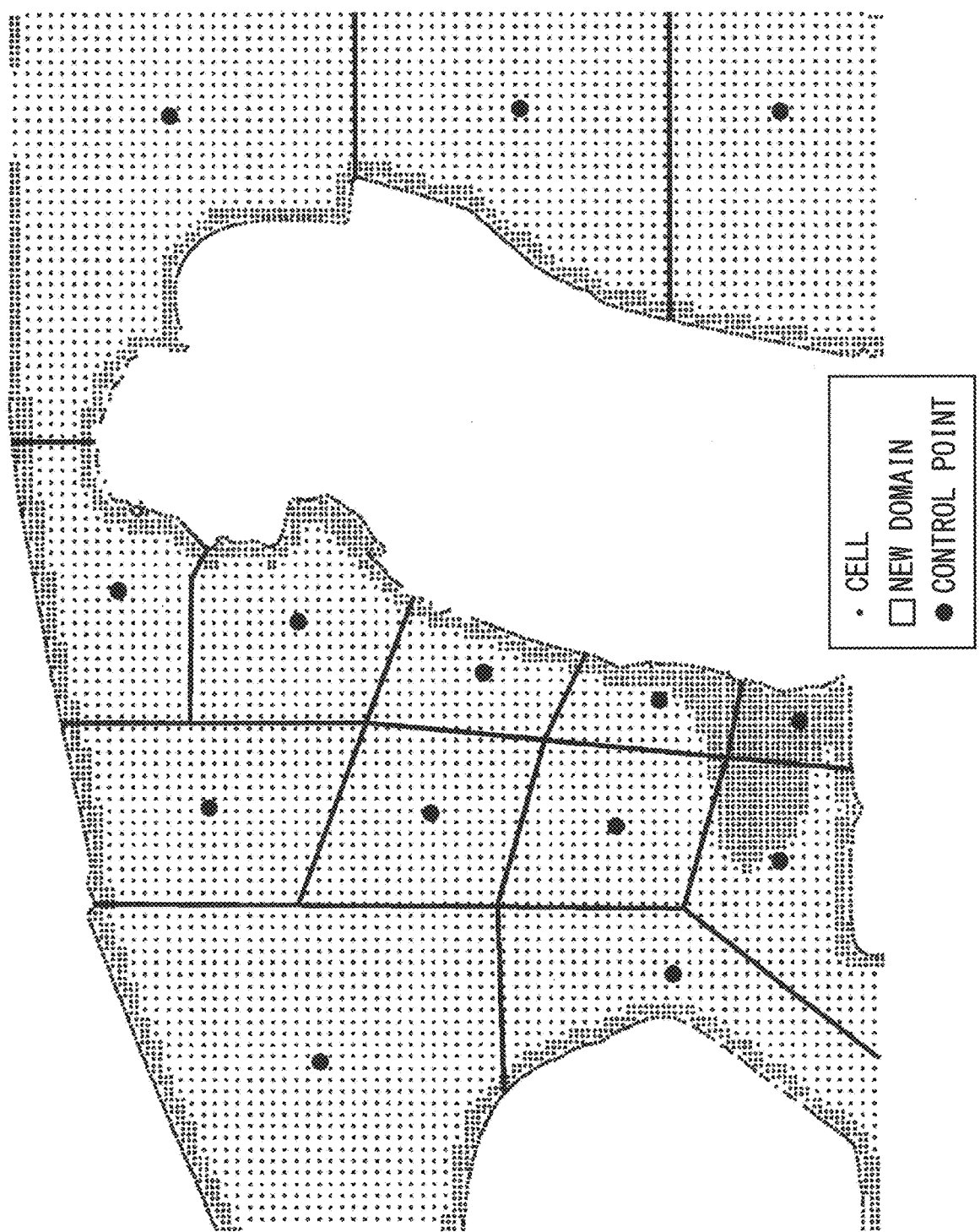
FIG. 9 is a diagram illustrating an example of a process of generating aggregated domains in a numerical analysis method of the present embodiment.

A newly set domain is also a control volume and is also an aggregated sum of domains. For each newly set domain, the volume of the newly set domain and the coordinate vector of the control point of the newly set domain are calculated by Equation (26) and Equation (27). The control points are illustrated as illustrated in FIG. 9. In addition, a newly set domain is handled in substantially the same way as the other domains.

Here, it is denoted that a domain 1 is a domain generated by an aggregated sum of cells, a domain 2 is a domain generated by an aggregated sum of domains 1, and a domain 3 is a domain generated by an aggregated sum of domains 2. Based on control volumes (cells) automatically generated in an analysis domain, it is possible to set a hierarchical structure of domains including domains 1, domains 2, domains 3, so on, and the last domains.

Since the MBD is basically an unsteady analysis that requires an enormous number of calculation steps, high performance is required for a single calculation step. In accordance with a calculation precision requested in MBD, it is possible to set a hierarchical structure of domains including domains 1, domains 2, domains 3, so on, and the last domains from control volumes (cells). Here, the last domains may be set from domains 1 without setting domains 2 or domains 3. In the case of setting a hierarchical structure of domains including domains 1, domains 2, domains 3, so on, and the last domains, or in the case of setting the last domains from domains 1 without setting domains 2 or domains 3, the cell-division precision with respect to the boundary shape of the initial analysis domain is not lost.

In the conventional finite volume method or finite element method, if initially divided meshes are aggregated, the boundary shape of an aggregated domain becomes one having complicated faces, and thereby, the calculation cannot be executed. Specifically, under the present circumstances, the finite volume method is limited to an icosahedron, and in the finite element method, an interpolation function in an element cannot be defined for a polyhedron exceeding a hexahedron. For this reason, in the conventional methods, the idea of aggregating initial divided meshes does not exist. Thus, in the circumstances where neither motivation nor implication of forming an aggregated domain from divided domains is found, the inventors conceived of the present embodiment, which brings remarkable effects that cannot be brought by the conventional methods.

With control volumes (cells) generated automatically, it is possible to execute numerical analysis while satisfying the conservation law of a physical quantity, such as mass balance (conservation of mass) between cells, the conservation of momentum, and the conservation of energy. Therefore, in either case of setting a hierarchical structure of domains including domains 1, domains 2, domains 3, so on, and the last domains, or setting the last domains from domains 1 without setting domains 2 or domains 3, the conservation law of a physical quantity holds between the domains.

A method of aggregating control volumes (cells) for newly setting domains by aggregating control volumes (cells) automatically generated in an analysis domain will be described.

Figure 10:
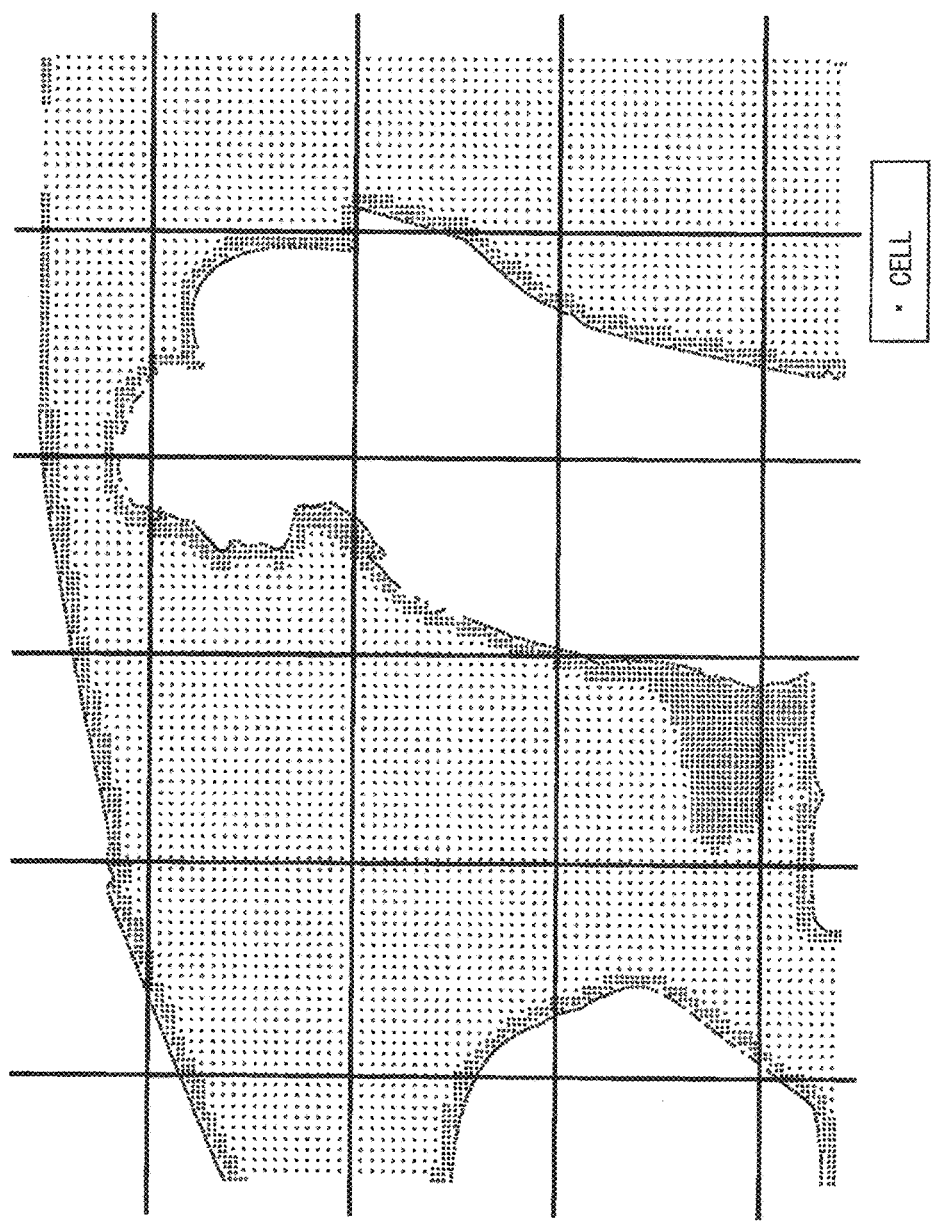
FIG. 10 is a diagram for describing an example of an aggregation method of cells in a numerical analysis method of the present embodiment.

As illustrated in FIG. 10, the analysis domain is coarsely divided into regions forming orthogonal grids, and cells are aggregated such that the control points are included in the orthogonal grids.

Figure 11:
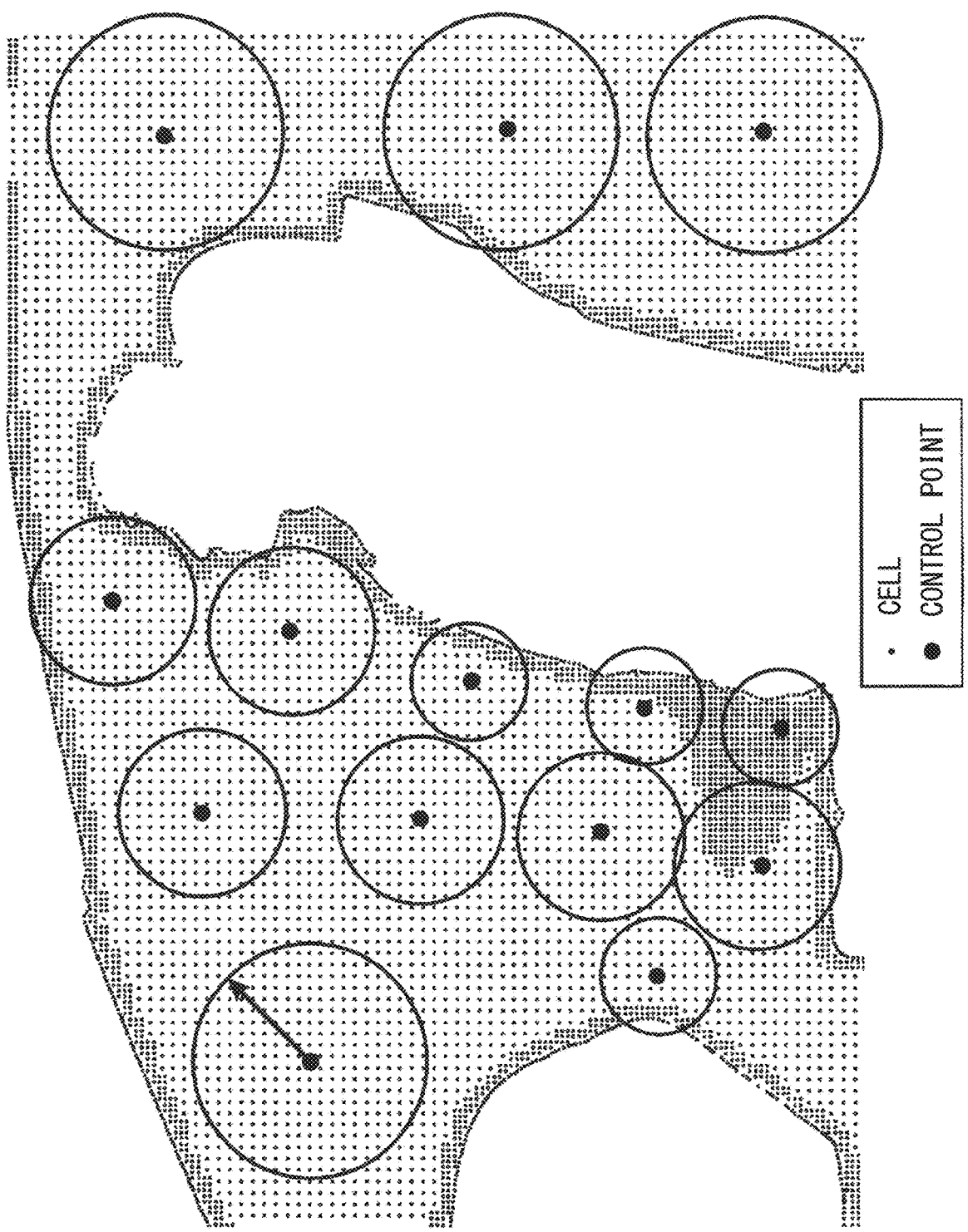
FIG. 11 is a diagram for describing an example of the aggregation method of cells in a numerical analysis method of the present embodiment.

As illustrated in FIG. 11, the control points of the domains are set in the analysis domain. Cells whose control points are included in a sphere of a predetermined radius from the control point of each domain are aggregated. The radius is gradually enlarged so that all the cells in the analysis domain are aggregated in one of the domains.

Alternatively, by using the voxel method, voxels may be generated in a region covering the analysis domain, so as to have the voxels serve as the domains. In this case, cells whose control points are included in a voxel are aggregated.

Here, although three examples have been described as the methods of aggregating cells, the methods are not limited to these examples. For example, an aggregation method other than the examples described here may be used.

In the case of newly setting a domain by aggregating control volumes (cells) automatically generated in an analysis domain according to the method of aggregating the control volumes (cells), the cell-division precision with respect to the boundary shape of the initial analysis domain is not lost. Because of this, it is possible to execute numerical analysis while satisfying the conservation law of a physical quantity between the domains that are newly set by aggregating the control volumes (cells) automatically generated in the analysis domain according to the method of aggregating the control volumes (cells).

(Process of Generating Calculation Data Model with Respect to Aggregated Domains)

Further, a process of generating a calculation data model with respect to aggregated domains will be described.

Figure 12:
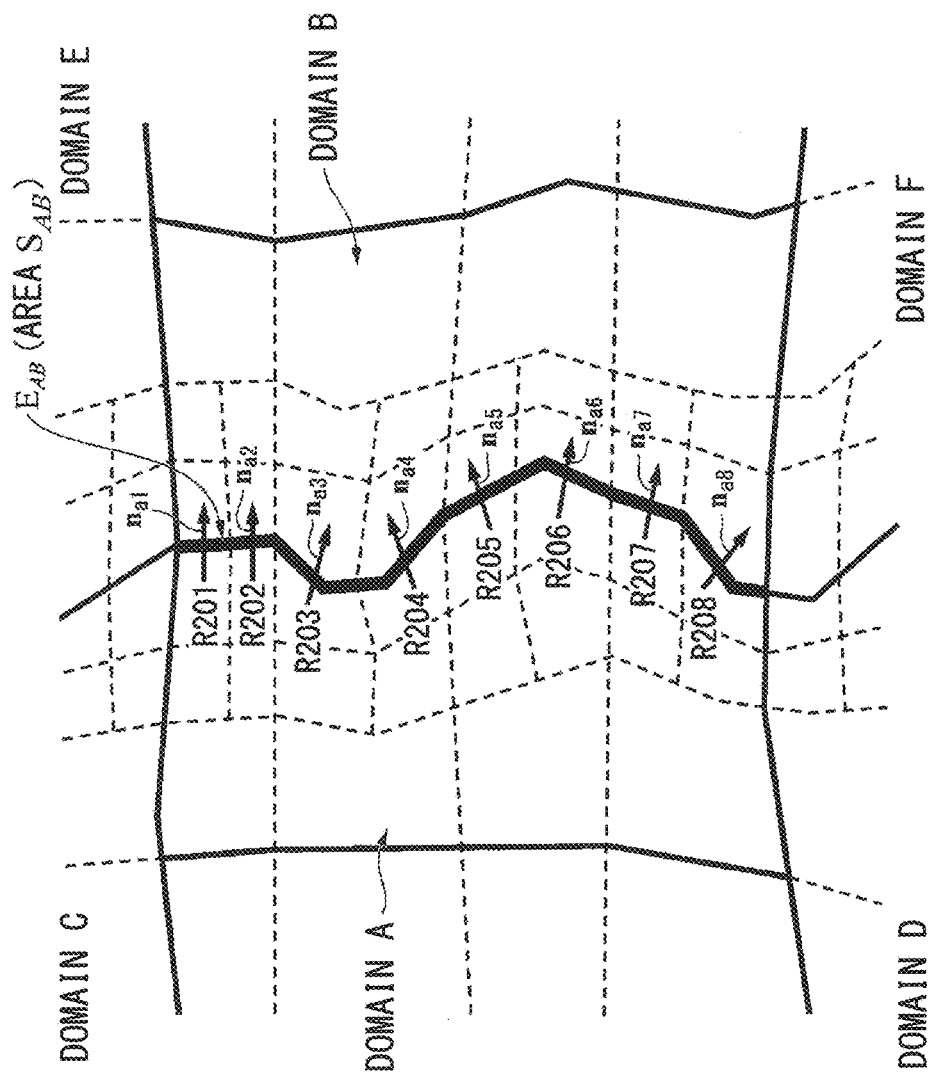
FIG. 12 is a diagram illustrating an example of a boundary-surface characteristic quantity of an aggregated domain in a numerical analysis method of the present embodiment.

FIG. 12 is a conceptual diagram illustrating an example of a boundary-surface characteristic quantity of an aggregated domain in the numerical analysis method according to the invention. FIG. 12 illustrates multiple divided domains that divide an analysis domain, and multiple aggregated domains. In FIG. 12, a domain A and a domain B enclosed with solid lines are aggregated domains. In FIG. 12, figures enclosed with dashed lines are divided domains. For example, cells R201 to R208 are divided domains. The domain A is an aggregated domain obtained by aggregating multiple divided domains including the cells R201 to R208. A boundary surface EAB is a surface through which a physical quantity is exchanged between the domain A and the domain B, and corresponds to a boundary surface in a calculation data model with respect to aggregated domains. Also, the area $S_{AB}$ represents the area of the boundary surface $E_{AB}$, which is one of the boundary-surface characteristic quantities of an aggregated domain in the present embodiment.

Each of $[n]_{a1}$ to $[n]_{a8}$ is a normal vector, which is a quantity representing a characteristic of the boundary surface of cells contacting each other on the boundary surface $E_{AB}$.

Figure 13:
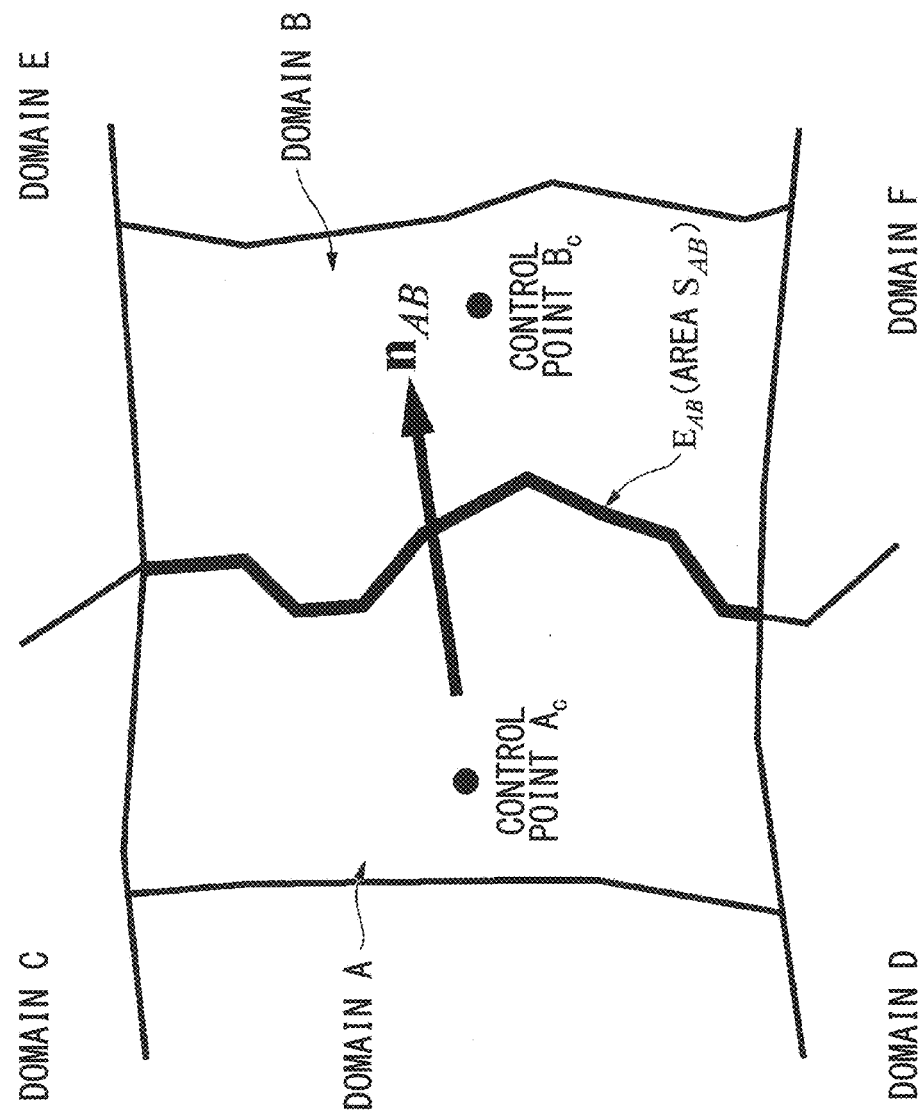
FIG. 13 is a diagram illustrating an example of a boundary-surface characteristic quantity of an aggregated domain in a numerical analysis method of the present embodiment.

A domain A and a domain B in FIG. 13 correspond to the domain A and the domain B in FIG. 12, respectively. A control point $A_c$ and a control point $B_c$ are arranged inside the domain A and the domain B, respectively.

Denoting the total number of boundary surfaces of cells b that belong to the domain B and contact the boundary surface EAB by $NS_{AB}$, the area $S_{AB}$ of the boundary surface between the domain A and the domain B, and the normal vector $[n]_{AB}$ of the boundary surface between the domain A and the domain B are calculated by Equation (28) and Equation (29), respectively, where $S_{ab}$ represents the area of the boundary surface of a cell b that belongs to the domain B and contacts the boundary surface $E_{AB}$.

$$S_{AB} = \sum_{b=1}^{NS_{AB}} S_{ab} \quad (28)$$

$$S_{AB} \cdot n_{AB} = \sum_{b=1}^{NS_{AB}} [S_{ab} \cdot n_{ab}] \quad (29)$$

Figure 15:
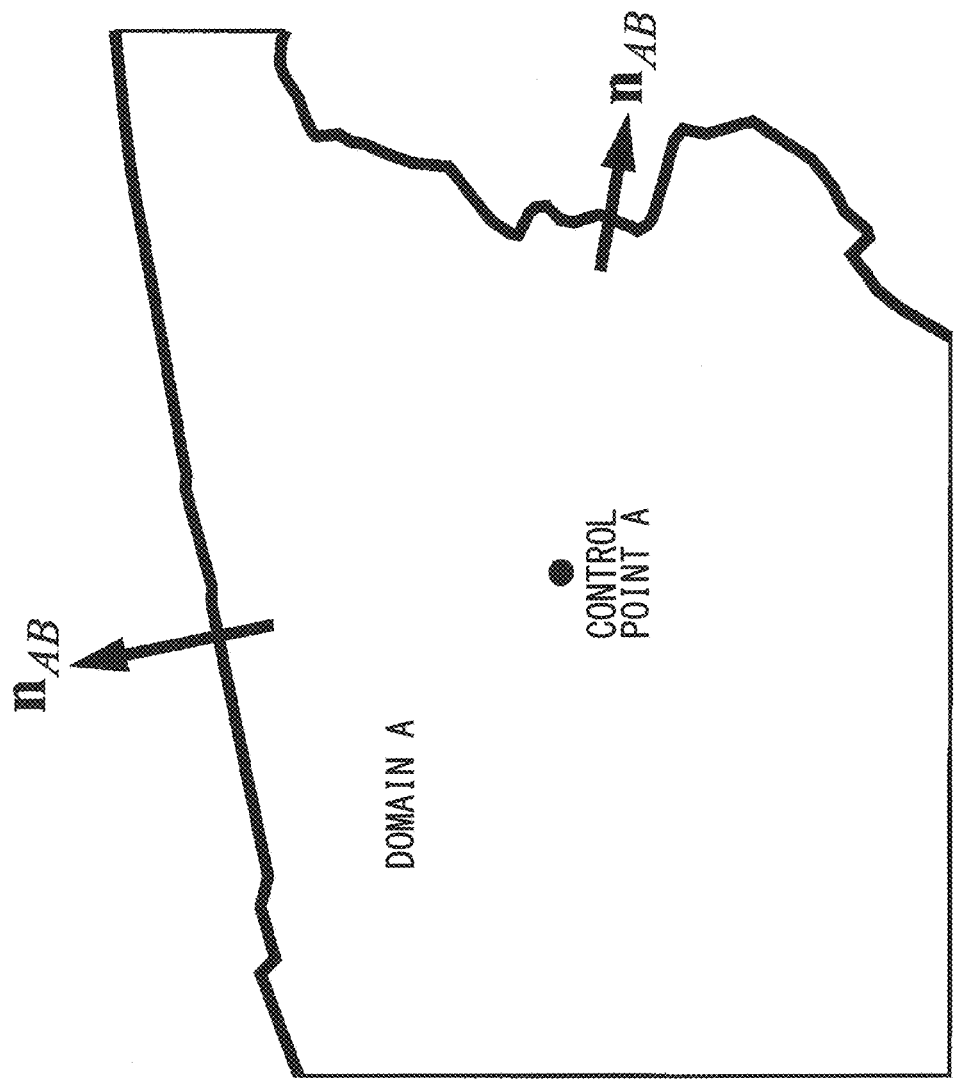
FIG. 15 is a diagram for describing an example of a boundary-surface characteristic quantity of an aggregated domain on a boundary of an analysis domain in a numerical analysis method of the present embodiment.

An example illustrated in FIG. 14 illustrates a case where a domain A contacts a boundary with the external space of the analysis domain. In this case, as illustrated in FIG. 15, assuming that a domain B exists outside of the analysis domain, by calculating an aggregated sum of boundary surfaces of cells a that contact the domain B, similarly to Equation (28) and Equation (29), the area $S_{AB}$ of the boundary surface between the domain A and the domain B, and the normal vector $[n]_{AB}$ of the boundary surface between the domain A and the domain B can be derived.

(Calculating Process)

The calculating process will be described. In the numerical analysis method described above, control volumes (cells) automatically generated in an analysis domain are aggregated to generate a domain.

Furthermore, in the numerical analysis method, by using the boundary-surface characteristic quantities of the boundary surface $S_{ab}$ between the cell a and the cell b (the area $S_{ab}$ of the boundary surface and the normal vector $[n]_{ab}$ of the boundary surface) to calculate an aggregated sum with respect to the boundary surface $S_{AB}$ between the domain A and the domain B, the boundary-surface characteristic quantities of the boundary surface $S_{AB}$ between the domain A and the domain B (the area $S_{AB}$ of the boundary surface and the normal vector $[n]_{AB}$ of the boundary surface) are calculated.

In other words, the numerical analysis method on a continuum with respect to cells, which does not use quantities that specify geometrical shapes, is applied to domains as completely the same calculation method.

Furthermore, based on control volumes (cells) automatically generated in an analysis domain, it is possible to set a hierarchical structure of domains including domains 1, domains 2, domains 3, so on, and the last domains. Therefore, the numerical analysis method of a continuum can be applied to all the domains set to have a hierarchical structure including domains 1, domains 2, domains 3, so on, and the last domains.

In either case of setting the last domains at once from control volumes (cells), or of setting a hierarchical structure of domains including domains 1, domains 2, domains 3, so on, and the last domains, the cell-division precision with respect to the boundary shape of the initial analysis domain is not lost. This is a very significant advantage in a numerical analysis in which the heat transfer area is regarded as important as in thermal fluid analysis.

In the case where the number of divisions of control volumes (cells) automatically generated in an analysis domain is as coarse as an order of below several tens to several thousands, a numerical analysis using the coarse number of divided cells may include many errors in an analysis result.

Meanwhile, although a numerical analysis with the number of divided cells of an order above several ten millions to several hundred millions exhibits a very high precision, the calculation level requires use of a supercomputer, namely, requires computing resources of a large memory capacity and HDD capacity, which leads to a significant increase of the calculation cost for a long calculation time and a process of analyzing results.

However, regarding cell division of an order of several ten millions to several hundred millions of cells, if only the automatic generation of cells is required, it is possible to be executed within a short time by a computer having a comparatively low-capacity memory.

Thereupon, it is possible to execute cell division of an order of several ten millions to several hundred millions in an analysis domain, and based on the cell division, to execute domain division to set a hierarchical structure including domains 1, domains 2, domains 3, so on, and the last domains. If the number of divisions of divided domains is an order of several thousands to several ten thousands, it is possible to execute a numerical analysis within a short time by a computer having a comparatively low-capacity memory.

In this case, although the boundary shape of a domain in which cells are aggregated may have very complicated faces, by using the numerical analysis method on a continuum based on cells, which does not use quantities that specify geometrical shapes, it is possible to execute the numerical analysis method on the continuum in a state where the cell-division precision with respect to the boundary shape of the initial analysis domain is maintained, within a short time, by a computer having a comparatively low-capacity memory, while curbing errors included in an analysis result so as not to be problematic.

In the following, a case where a numerical analysis of a continuum is applied to MBD will be described in detail.

MBD is basically an unsteady analysis and requires high performance of calculation. It is difficult to couple a numerical analysis at a calculation level requiring use of a supercomputer with an unsteady analysis by an MBD program for analysis.

However, if the number of divisions of divided domains is an order of several thousands to several ten thousands, it is possible to execute a numerical analysis within a short time by a computer having a comparatively low-capacity memory. Because of this, based on the fineness of a cell division of the boundary shape of an analysis domain, and a result of a numerical analysis obtained in a state where the calculation precision has been maintained, it is possible to execute an unsteady analysis by an MBD program within a short time.

Furthermore, as described above, with respect to control volumes (cells) generated automatically, a numerical analysis is calculated while satisfying the conservation law of a physical quantity between the cells. Because of this, even for domains set to have a hierarchical structure including domains 1, domains 2, domains 3, so on, and the last domains, the conservation law of a physical quantity between the domains is satisfied. Even for a comparatively coarse cell division in an order of several thousands to several ten thousands, a numerical analysis can be executed while satisfying the conservation law of a physical quantity in the same order as obtained with an extremely fine cell division.

In the case of implementing a calculation model on LMS Imagine.Lab Amesim (product name) or Simulink (product name) of MathWorks, Inc., as an integration platform for an MBD program, for example, a 1D (one-dimensional) multi-domain simulation of Siemens AG, it is desirable to set the number of divided domains in an order of a single digit, several tens, or several hundreds although it also depends on the calculation environment including specification of the MBD program, calculation performance, CPU, memory, and the like.

Although the last domains are formed based on a fine cell division with a high calculation precision in the analysis domain, in the case of setting the number of divided domains in an order of a single digit, several tens, or several hundreds, a great difference is generated between the great number of finely divided cells of the first cell division, and the number of divided domains in the calculation model that is implemented on the MBD program.

As the number of divided domains is set in an order of a single digit, several tens, or several hundreds, the physical quantity calculated in a control point of a domain is calculated as an average quantity as compared with a calculation result by the initial fine cell division. However, the numerical analysis can be executed while satisfying the conservation law of a physical quantity in the same order as obtained with an extremely fine cell division; maintaining a high precision to a certain extent; and shortening the calculation time.

(Heat Transfer Analysis)

Heat transfer analysis will be described as an example of a numerical analysis of a diffusion field.

The fundamental equations of heat transfer analysis are expressed as Equation (30) or Equation (31) and Equation (32).

$$\frac{\partial}{\partial t}(\rho \cdot C_P \cdot T) = \frac{\partial}{\partial x_j}\left[\lambda \frac{\partial T}{\partial x_j}\right] \quad (30)$$

$$\frac{\partial T}{\partial t} = \frac{\partial}{\partial x_j}\left[\alpha \frac{\partial T}{\partial x_j}\right] \quad (31)$$

$$\alpha = \frac{\lambda}{\rho \cdot C_P} \quad (32)$$

where in Equation (30) or Equation (31) and Equation (32), T represents temperature; $\lambda$ represents thermal conductivity; $\alpha$ represent thermal diffusivity; $\rho$ represents density; and $C_p$ represents specific heat. The other variables, subscripts, and partial differential coefficients are as described above. The thermal diffusivity $\alpha$ is defined as Equation (32), and Equation (31) is obtained by rewriting Equation (30) using $\alpha$.

Equation (33) is obtained by integrating the fundamental equation described above with respect to a control volume (cell). Equation (34) is obtained by discretizing Equation (33) with respect to the cell a illustrated in FIG. 1 and m units of cells b enclosing the cell a.

$$\int_V \left[\frac{\partial}{\partial t}(\rho \cdot C_P \cdot T)\right] dV = \int_S \left[\lambda \frac{\partial T}{\partial n}\right] dS \quad (33)$$

$$V_a \cdot \left[\rho \cdot C_P \frac{\partial T_a}{\partial t}\right] = \sum_{b=1}^{m}\left[S_{ab} \cdot \lambda \cdot \left(\frac{\partial T}{\partial n}\right)_{ab}\right] \quad (34)$$

In Equation (30) to Equation (34) and the following equations, notations with respect to a cell such as $V_a$ and $S_{ab}$, and notation with respect to a domain such as $V_A$ and $S_{AB}$ are as described above.

The normal derivative $(\partial T/\partial n)_{ab}$ of the temperature on the right-hand side of Equation (34) is calculated as follows.

$$\left(\frac{\partial T}{\partial n}\right)_{ab} = \frac{T_b - T_a}{r_{ab} \cdot n_{ab}} = \frac{T_b - T_a}{(r_b - r_a) \cdot n_{ab}} \quad (35)$$

$$r_{ab} \equiv r_b - r_a \quad (36)$$

Therefore, Equation (34) is expressed as follows.

$$V_a \cdot \left[\rho \cdot C_P \frac{\partial T_a}{\partial t}\right] = \sum_{b=1}^{m}\left[S_{ab} \cdot \lambda \cdot \frac{T_b - T_a}{r_{ab} \cdot n_{ab}}\right] \quad (37)$$

In terms of domain, by applying discretization to the domain A illustrated in FIG. 13 and M units of domains B enclosing the domain A, Equation (38) is obtained.

$$V_A \cdot \left[\rho \cdot C_P \frac{\partial T_A}{\partial t}\right] = \sum_{B=1}^{M}\left[S_{AB} \cdot \lambda \cdot \frac{T_B - T_A}{r_{AB} \cdot n_{AB}}\right] \quad (38)$$

Meanwhile, it is possible to obtain a discretized equation in a domain by adding Equation (37) in a domain to calculate an aggregated sum. Denoting the number of control volumes (cells) included in the domain A by $NV_A$, Equation (39) is obtained.

$$\sum_{a=1}^{NV_A}\left[V_a \cdot \rho \cdot C_P \frac{\partial T_a}{\partial t}\right] = \sum_{a=1}^{NV_A}\left[\sum_{b=1}^{m}\left\{S_{ab} \cdot \lambda \cdot \frac{T_b - T_a}{r_{ab} \cdot n_{ab}}\right\}\right] \quad (39)$$

In FIG. 1, the discretized equation of the cell a and the discretized equation of the cell b have the same absolute value and a positive or negative sign reverse to each other on the surface $S_{ab}$; therefore, when calculating the aggregated sum in the domain A, the term of $(T_b-T_a)/([r]_{ab} \cdot [n]_{ab})$ on the right-hand side of Equation (39) is canceled. Because of this, the right-hand side of Equation (39) turns out to be a boundary integration of the domain A as in Equation (40).

$$\sum_{a=1}^{NV_A}\left[\sum_{b=1}^{m}\left\{S_{ab} \cdot \lambda \cdot \frac{T_b - T_a}{r_{ab} \cdot n_{ab}}\right\}\right] = \sum_{B=1}^{M}\left[\sum_{b=1}^{NS_{AB}}\left\{S_{ab} \cdot \lambda \cdot \frac{T_b - T_a}{r_{ab} \cdot n_{ab}}\right\}\right] \quad (40)$$

In Equation (40), $NS_{AB}$ represents the number control volumes (cells) contacting the boundary $S_{AB}$ of the domain A.

Summarizing the relationship between the variables of a domain and the variables of a control volume (a cell), Equation (41) to Equation (45) are obtained.

$$V_A = \sum_{a=1}^{NV_A} V_a \quad (41)$$

$$V_A \cdot T_A = \sum_{a=1}^{NV_A} [V_a \cdot T_a] \quad (42)$$

$$V_A \cdot r_A = \sum_{a=1}^{NV_A} [V_a \cdot r_a] \quad (43)$$

$$S_{AB} = \sum_{b=1}^{NS_{AB}} S_{ab} \quad (44)$$

$$S_{AB} \cdot n_{AB} = \sum_{b=1}^{NS_{AB}} [S_{ab} \cdot n_{ab}] \quad (45)$$

In the case where Equation (41) to Equation (45) and an approximation by Expression (46) are satisfied, Equation (39) and Equation (40) are equivalent to Equation (38). In this case, an accumulated value of the transferred heat quantity that has been conserved between the cells is also conserved between the domains as aggregated sums of cells.

$$S_{AB} \cdot \lambda \cdot \frac{T_B - T_A}{r_{AB} \cdot n_{AB}} \cong \sum_{b=1}^{NS_{AB}}\left\{S_{ab} \cdot \lambda \cdot \frac{T_b - T_a}{r_{ab} \cdot n_{ab}}\right\} \quad (46)$$

In the case where the gradient in the normal direction of the temperature on the boundary surface $S_{AB}$ between the domain A and the domain B is nearly equal to the gradient in the normal direction of the temperature between the centers of the domain A and the domain B, the approximation by Expression (46) is satisfied.

In the case where there are a small number of cells included in a domain, and the temperature gradient between the domains and the temperature gradient between the cells have close values, the approximation by Expression (46) is satisfied, and it is possible to execute heat transfer analysis by using Equation (38), while conserving the transferred heat quantity at a high precision.

Here, a correction factor $\xi_{\lambda AB}$ on the boundary surface $S_{AB}$ between the domain A and the domain B is introduced, and defined as in the following Equation (47). According to Equation (47), it is possible to derive a correction factor based on a physical property and a physical quantity as an analysis result of a physical phenomenon by a calculation data model with respect to divided domains.

$$\xi_{\lambda AB} \equiv \frac{\sum_{b=1}^{NS_{AB}}\left\{S_{ab} \cdot \lambda \cdot \frac{T_b - T_a}{r_{ab} \cdot n_{ab}}\right\}}{S_{AB} \cdot \lambda \cdot \frac{T_B - T_A}{r_{AB} \cdot n_{AB}}} \quad (47)$$

The correction factor is set as $\xi_{\lambda AB}=1$ when the gradient in the normal direction of the temperature on the boundary surface $S_{AB}$ between the domain A and the domain B is equal to the gradient in the normal direction of the temperature between the centers of the domain A and the domain B.

By using the correction factor of Equation (47), Equation (38) as the discretized equation in a domain is expressed as the following Equation (48). According to Equation (48), conductance is calculated based on a physical property; a correction factor based on a physical quantity as an analysis result of a physical phenomenon by a calculation data model with respect to divided domains; and a calculation data model with respect to aggregated domains based on a corrected discretized equation obtained by correcting the discretized equation with respect to aggregated domains with the correction factor, $$(\rho \cdot C_P \cdot V_A)\frac{\partial T_A}{\partial t} = \sum_{B=1}^{M}\left[\xi_{\lambda AB} \cdot S_{AB} \cdot \lambda \cdot \frac{T_B - T_A}{r_{AB} \cdot n_{AB}}\right] \quad (48)$$

In order to express Equation (48) in the electric circuit form of MBD, heat resistance $R_{AB}$ and heat conductance $C_{AB}$ as the reciprocal of $R_{AB}$ are defined as follows.

$$C_{AB} \equiv \frac{1}{R_{AB}} \equiv \xi_{\lambda AB} \cdot S_{AB} \cdot \lambda \cdot \frac{1}{r_{AB} \cdot n_{AB}} \quad (49)$$

Incorporating Equation (49) into Equation (48), a differential equation expressed in the electric circuit form of MBD (thermal network equation) is obtained as the following Equation (50).

$$(\rho \cdot C_P \cdot V_A)\frac{\partial T_A}{\partial t} = \sum_{B=1}^{M}[C_{AB} \cdot (T_B - T_A)] = \sum_{B=1}^{M}\left[\frac{T_B - T_A}{R_{AB}}\right] \quad (50)$$

In the differential equation expressed in the electric circuit form of MBD (thermal network equation) or Equation (50), the thermal capacitance (heat capacity) of the aggregated domain A is expressed as $(\rho^* C_p \cdot V_A)$ as the coefficient of the time derivative term on the left-hand side of Equation (50).

If replacing heat resistance with electric resistance, temperature T with voltage, and heat capacity $(\rho^* C_p \cdot V_A)$ with electric capacity (capacitance), respectively, Equation (50) expresses the same calculation (thermal network calculation) as an unsteady calculation of an electric circuit that is calculated while satisfying Kirchhoff's law.

According to the heat transfer analysis, based on a physical property with respect to the analysis domain, and a calculation data model with respect to the aggregated domains, it is possible to calculate conductance representing a characteristic with respect to transfer of a physical quantity between the aggregated domains and to the outside of the analysis domain, and capacitance representing a characteristic with respect to accumulation of the physical quantity for each aggregated domain.

Therefore, according to an implementation method of heat conductance and thermal capacitance on an MBD program, which will be described later, by incorporating the heat conductance and the thermal capacitance into the MBD program, or providing an execution module that represents a thermal network model incorporating the heat conductance and the thermal capacitance to be called from the MBD program, it is possible to execute an unsteady numerical calculation by the MBD program coupled with the thermal network model incorporating the heat conductance and the thermal capacitance.

As described above, once an analysis result has been obtained with respect to control volumes (cells) of divided domains, unsteady calculation thereafter simply needs to be analyzed with a smaller number of domains than the cells.

(Advective Diffusion Analysis of Heat)

As an example of a numerical analysis of an advective diffusion field, advective diffusion analysis of heat will be described. As in the case of the heat transfer analysis, aiming at coupling with an MBD program, an improvement method of calculation precision (calculation precision of the conservation law) of coarsely divided domains will be described.

The fundamental equation of advective diffusion analysis of heat is expressed as Equation (51). Here, the variables, subscripts, and partial differential coefficients are as described above. However, $\alpha^*$ is a thermal diffusivity in consideration of turbulent diffusion defined by Equation (52), and $\alpha_t$ is a turbulent diffusion coefficient.

$$\frac{\partial}{\partial t}(\rho \cdot C_P \cdot T) + \frac{\partial}{\partial x_j}[u_j \cdot (\rho \cdot C_P \cdot T)] = \frac{\partial}{\partial x_j}\left[\rho \cdot C_P \cdot \alpha^* \frac{\partial T}{\partial x_j}\right] \quad (51)$$

$$\alpha^* = \frac{\lambda}{\rho \cdot C_P} + \alpha_t \quad (52)$$

Equation (53) is obtained by integrating the fundamental equation with respect to a control volume (cell).

$$\int_V \left[\frac{\partial}{\partial t}(\rho \cdot C_P \cdot T)\right] dV + \int_S [u_n \cdot (\rho \cdot C_P \cdot T)] dS = \int_S \left[\rho \cdot C_P \cdot \alpha^* \frac{\partial T}{\partial n}\right] dS \quad (53)$$

The first term of the left-hand side and the right-hand side of Equation (53) are as described with the heat transfer analysis.

Here, treatment of the second term on the left-hand side (advective term) of Equation (53) will be described. In order to simplify the description, a term in Equation (54) obtained from the left-hand side (advective term) by excluding the physical properties will be considered.

$$\int_S [u_n \cdot T] dS \quad (54)$$

As described above, if the conservation law is satisfied, the internal cells of a domain cancel each other in the aggregated sum obtained by addition of cells included in the domain; therefore, the aggregated sum turns out to be a boundary integration of the domain as in the following Equation (55).

$$\sum_{a=1}^{NV_A}\left[\sum_{b=1}^{m}\{S_{ab} \cdot u_{nab} \cdot T_{ab}\}\right] = \sum_{B=1}^{M}\left[\sum_{b=1}^{NS_{AB}}\{S_{ab} \cdot u_{nab} \cdot T_{ab}\}\right] \quad (55)$$

where $u_{nab}$ represents the flow velocity in the normal direction on the boundary surface $S_{ab}$ between the cell a and the cell b, which is obtained for every boundary surface between the cells by executing a cell division of the analysis domain in advance, and executing thermal fluid calculation.

$T_{ab}$ represents the temperature on the boundary surface $S_{AB}$ calculated by interpolation from the temperatures of the control points of the cell a and the cell b. In the case of taking the upwind property into consideration, when interpolating from the temperatures of the cell a and the cell b, the temperature on the boundary surface $S_{AB}$ is calculated taking an upwind scheme into consideration.

As described above, in the case where an enormous number of cells are included in the domain, a correction factor on the boundary surface $S_{AB}$ between the domain A and the domain B is defined as follows.

The flow velocity in the normal direction $u_{nAB}$ on the domain boundary surface $S_{AB}$ is obtained from Equation (56). By using this, a correction factor $\xi_{U_{AB}}$ is defined as in Equation (57).

$$S_{AB} \cdot u_{nAB} = \sum_{b=1}^{NS_{AB}} \{S_{ab} \cdot u_{nab}\} \quad (56)$$

$$\xi_{U_{AB}} \equiv \frac{\sum_{b=1}^{NS_{AB}} \{S_{ab} \cdot u_{nab} \cdot T_{ab}\}}{S_{AB} \cdot u_{nAB} \cdot T_{AB}}. \quad (57)$$

By using the correction factor of Equation (57) to calculate the aggregated sum by addition within the domain based on Equation (53), the following discretized equation with respect to a domain division is obtained.

$$(\rho \cdot C_P \cdot V_A)\frac{\partial T_A}{\partial t} + \sum_{B=1}^{M}[\xi_{U_{AB}} \cdot S_{AB} \cdot u_{nAB} \cdot (\rho \cdot C_P \cdot T_{AB})] = \sum_{B=1}^{M}\left[\xi_{\alpha_{AB}} \cdot S_{AB} \cdot (\rho \cdot C_P \cdot \alpha^*) \cdot \frac{T_B - T_A}{r_{AB} \cdot n_{AB}}\right] \quad (58)$$

A correction factor $\xi_{\alpha_{AB}}$ on the right-hand side of Equation (58) is obtained by using Equation (47) of the correction factor of the heat transfer analysis described above and replacing the thermal conductivity $\lambda$ with the thermal diffusivity $\alpha^*$. The correction factor $\xi_{\alpha AB}$ is a correction factor based on a physical property and a physical quantity as an analysis result of a physical phenomenon by a calculation data model with respect to divided domains.

In order to express Equation (58) in the electric circuit form of MBD, heat resistance and a heat conductance as the reciprocal are defined as follows.

$$C_{\alpha_{AB}} \equiv \frac{1}{R_{\alpha_{AB}}} \equiv \xi_{\alpha_{AB}} \cdot S_{AB} \cdot (\rho \cdot C_P \cdot \alpha^*) \cdot \frac{1}{r_{AB} \cdot n_{AB}} \quad (59)$$

$$C_{U_{AB}} \equiv \frac{1}{R_{U_{AB}}} \equiv \xi_{U_{AB}} \cdot S_{AB} \cdot u_{nAB} \cdot (\rho \cdot C_P) \quad (60)$$

Incorporating Equation (59) and Equation (60) into Equation (58), a differential equation expressed in the electric circuit form of MBD (thermal network equation) is obtained as follows.

An advective term (the second term of the left-hand side) changes depending on the flow velocity in the normal direction $u_{nAB}$ being positive or negative. In the case of a first-order upwind scheme, $T_{AB}=T_A$ if positive, and $T_{AB}=T_B$ if negative.

$$(\rho \cdot C_P \cdot V_A) \frac{\partial T_A}{\partial t} + \sum_{B=1}^{M} [C_{U_{AB}} \cdot T_{AB}] = \sum_{B=1}^{M} [C_{\alpha_{AB}} \cdot (T_B - T_A)] \quad (61)$$

In the differential equation (61) expressed in the electric circuit form of MBD (thermal network equation), the thermal capacitance (heat capacity) of the aggregated domain A is expressed as $(\rho \cdot C_p \cdot V_A)$ as the coefficient of the time derivative term on the left-hand side of Equation (61).

As in the heat transfer analysis, Equation (61) can be expressed in the electric circuit form of the MBD program (thermal network equation). If replacing heat resistance with electric resistance, temperature T with voltage, and heat capacity $(\rho \cdot C_p \cdot V_A)$ with electric capacity (capacitance), respectively, Equation (61) expresses the same calculation (thermal network calculation) as an unsteady calculation of an electric circuit that is calculated while satisfying Kirchhoff's law. Therefore, according to an implementation method of heat conductance and thermal capacitance on an MBD program, which will be described later, by incorporating the heat conductance and the thermal capacitance into the MBD program, or providing an execution module that represents a thermal network model incorporating the heat conductance and the thermal capacitance to be called from the MBD program, it is possible to execute an unsteady numerical calculation by the MBD program coupled with the thermal network model incorporating the heat conductance and the thermal capacitance.

As above, it has been described that a diffusion field of heat and an advective diffusion field of heat can be represented as electric circuit models to be implemented in an MBD program. Therefore, for all continuum models represented with advection and a diffusion field (heat, fluid, substance diffusion, and the like), according to an implementation method on an MBD program as will be described later, by incorporating conductance and capacitance into the MBD program, or by having the MBD program coupled with an electric circuit model incorporating the conductance and the capacitance, it is possible to execute an unsteady numerical calculation by the MBD program.

Note that when setting the correction factor expressed as Equation (47) describing a diffusion field as $\xi_{\lambda AB}=1$, the heat conductance $C_{AB}$ between domains expressed as Equation (49) is calculated from boundary-surface characteristic quantities between domains (the area and the normal vector of each boundary surface), the distance between control points of domains, and a physical property. It is not necessary to execute a heat transfer analysis from a cell division of a calculation region in order to obtain the correction factor.

This is substantially the same for advective diffusion analysis of a temperature field. If setting the correction factors of Equation (57) and Equation (58) to 1, Equation (59) and Equation (60) as the heat conductance between domains are calculated from boundary-surface characteristic quantities between domains (the area and the normal vector of each boundary surface), the distance between control points of domains, and a physical property. It is not necessary to execute a heat transfer analysis from a cell division of a calculation region in order to obtain the correction factor.

If the correction factor is set to 1, it is not necessary to execute a numeric simulation calculation using a cell division of an analysis domain to obtain a correction factor, and this calculation time can be reduced. Since the cell-division precision of the boundary shape of the analysis domain is maintained even in a coarse domain division, when obtaining the heat quantity flowing in and out the boundary of the analysis domain, it is possible to execute an MBD program in which the heat transfer area on the boundary is maintained at a high precision.

Next, an implementation method of heat conductance and thermal capacitance on a general-purpose MBD program will be described. Implementation of heat conductance and thermal capacitance on a general-purpose MBD program means coupling a thermal network model with the general-purpose MBD program by a method that includes using heat conductance and thermal capacitance calculated from Equation (49), Equation (50), Equation (59), Equation (60), and Equation (61); generating a thermal network model based on the fundamental equation of Equation (50) in the case of heat transfer analysis or of Equation (61) in the case of advective diffusion analysis of heat; incorporating the thermal network model into the general-purpose MBD program as a library by using a model description language, or describing the thermal network model by using a programming language, which is then compiled to be called as an execution module from the general-purpose MBD program.

Here, the thermal network model based on the fundamental equation of Equation (50) in the case of heat transfer analysis or of Equation (61) in the case of advective diffusion analysis of heat is generated by the following procedure. The fundamental equations of Equation (50) and Equation (61) are fundamental equations representing an unsteady change of thermal energy that transfers from the domain A to the domain B, and thermal energy accumulated in the domain A. As described above, if replacing heat resistance with electric resistance, temperature T with voltage, and heat capacity $(\rho \cdot C_p \cdot V_A)$ with electric capacity (capacitance), respectively, it is possible to execute unsteady numeric simulation calculation with Equation (50) and Equation (61) as unsteady calculation of an electric circuit (thermal network calculation). As described above, the analysis domain is divided into multiple aggregated domains, namely, domains. The thermal capacitance is calculated for each of these domains. Next, the heat conductance is calculated between one domain and each of the other multiple domains to which thermal energy transfers from the one domain. Executing this procedure for all the domains in the analysis domain generates a thermal network model that connects domains in the analysis domain in a form of a network. The thermal network model is formed in which the thermal capacitance is set to each of the domains and the heat conductance is set between a domain and a domain. Next, by replacing the thermal capacitance with electric capacity, and the heat resistance as the reciprocal of the heat conductance with electric resistance, respectively, an electric circuit model equivalent to the above thermal network model is generated. This electric circuit model is described by using a model description language or a programming language. The electric circuit model described by using a model description language or a programming language is coupled with the general-purpose MBD program by a method of incorporating the thermal network model into the general-purpose MBD program as a library, or calling the thermal network model as a compiled execution module from the general-purpose MBD program.

As the model description language, a general-purpose model description language called VHDL-AMS (Very-High Speed IC Hardware Description Language-Analog Mixed Signals) is available. Further, a model description language specific to each general-purpose MBD program is also available, and may be used.

Program codes of Equation (50) and Equation (61) are written in the model description language. Since patterned methods are available for describing a model of electric resistance and electric capacity (capacitance), it is possible to automatically generate program codes in the model description language with respect to Equation (50) and Equation (61) according to the domain division and network links between the domains, by the number of domains and the number of network links between the domains. By transferring the codes to the MBD program as a library, it becomes possible to execute unsteady numeric simulation calculation coupled with the MBD program.

Similarly, Equation (50) and Equation (61) may be turned into program codes by using a general programming language used for numerical calculation, such as Fortran and C++. Since description of a model of electric resistance and electric capacity (capacitance) by a programming language can be patterned, it is possible to automatically generate program codes in the programming language with respect to Equation (50) and Equation (61) according to the domain division and network links between the domains, by the number of domains and the number of network links between the domains. By compiling the codes by a compiler to generate an execution module, and calling the module from the MBD program, it becomes possible to execute unsteady numeric simulation calculation coupled with the MBD program.

(Numerical Analysis Apparatus and Numerical Analysis Program)

In the following, a numerical analysis apparatus according to the present embodiment and a numerical analysis program according to the present embodiment will be described. In the following embodiment, a case of obtaining an advective diffusion phenomenon of heat in a cabin space of a motor vehicle by numerical analysis will be described.

Figure 16:
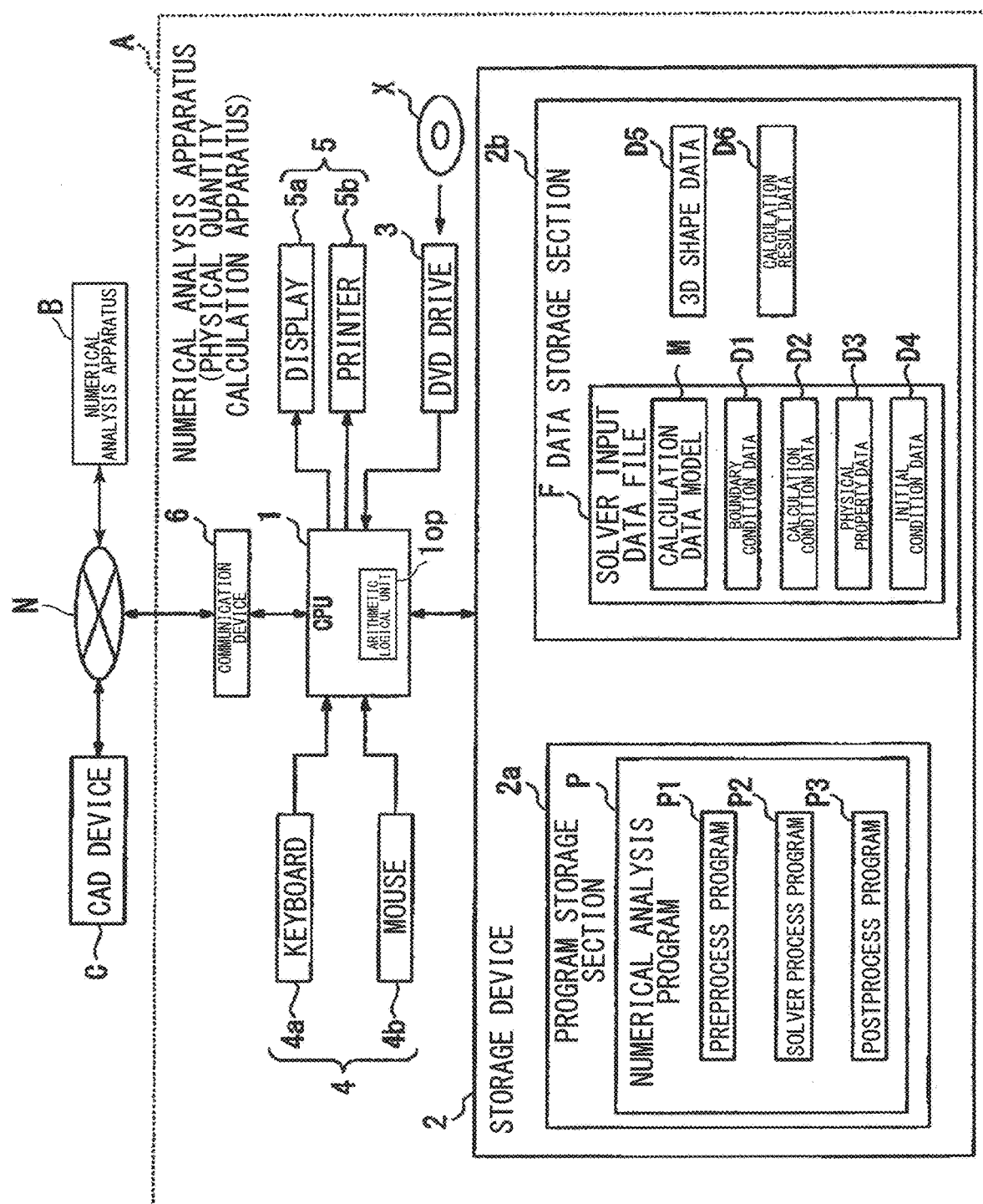
FIG. 16 is a block diagram schematically illustrating a hardware configuration of a numerical analysis apparatus A of the present embodiment.

As illustrated in FIG. 16, the numerical analysis apparatus A of the present embodiment is constituted with a computer, such as a personal computer, a workstation, or the like, that includes a CPU 1, a storage device 2, a DVD (Digital Versatile Disc) drive 3, input devices 4, output devices 5, and a communication device 6. The numerical analysis apparatus A is connected with a CAD device C and a numerical analysis apparatus B through a network N such as an in-house LAN.

The CPU 1 is electrically connected to the storage device 2, the DVD drive 3, the input devices 4, the output devices 5, and the communication device 6, to process signals input from these various devices, and to output a processed result.

The storage device 2 is constituted with an internal storage device, such as a memory, and an external storage device, such as a hard disk drive, to store information input from the CPU 1 and to output stored information based on a command input from the CPU 1.

In addition, in the present embodiment, the storage device 2 includes a program storage section 2a and a data storage section 2b.

The program storage section 2a stores a numerical analysis program P. This numerical analysis program P is an application program to be executed on a predetermined OS (Operating System), to cause the numerical analysis apparatus A of the present embodiment constituted with a computer to function so as to execute numerical analysis. The numerical analysis program P also cause the numerical analysis apparatus A of the present embodiment to function as, for example, an arithmetic/logic unit lop.

Further, as illustrated in FIG. 16, the numerical analysis program P includes a preprocess program P1, a solver process program P2, and a postprocess program P3.

The preprocess program P1 is a program that causes the numerical analysis apparatus A of the present embodiment to execute a process (preprocess) prior to executing a solver process, and to function as the arithmetic/logical unit lop so as to generate a first calculation data model. Also, the preprocess program P1 causes the numerical analysis apparatus A of the present embodiment to set conditions required for executing the solver process, and further, to generate a solver input data file F in which the above calculation data models and the set conditions are put together.

Then, in the case of causing the numerical analysis apparatus A of the present embodiment to function as the arithmetic/logical unit lop, the preprocess program P1 first causes the numerical analysis apparatus A of the present embodiment to obtain three-dimensional shape data including a cabin space of a motor vehicle, and to generate an analysis domain representing the cabin space of the motor vehicle included in the obtained three-dimensional shape data.

Note that as will be described later in detail, in the present embodiment, in the solver process, the discretized governing equations described in the above numerical analysis method that use only quantities that do not require quantities that specify geometrical shapes, and are derived based on a weighted residual method are used. Because of this, when generating the calculation data models, it is possible to discretionarily change the shapes of divided domains and the shape of the analysis domain under the conditions satisfying the conservation law. Therefore, simple work would be sufficient for modifying or changing the cabin space of the motor vehicle included in the three-dimensional shape data. Thereupon, in the present embodiment, the preprocess program P1 causes the numerical analysis apparatus A of the present embodiment to execute a process of mending holes and gaps existing in the cabin space of the motor vehicle that is included in the obtained three-dimensional shape data, by a wrapping process with minute closed surfaces.

Thereafter, the preprocess program P1 causes the numerical analysis apparatus A of the present embodiment to form divided domains as has been described in the process of dividing into multiple divided domains, and to generate an analysis domain including the entire cabin space mended by the wrapping process and the like. Next, the preprocess program P1 causes the numerical analysis apparatus A of the present embodiment to cut out a domain protruding from the cabin space among the generated divided domains, so as to generate an analysis domain that represents the cabin space. Here again, since the above discretized governing equations are used in the solver process, it is possible to easily cut a domain protruding from the cabin space in the analysis domain.

Thereby, the boundary with the external space does not become a staircase shape as in the voxel method, and when generating the analysis domain around the boundary with the external space, there is no need for special modifications or processes involving a tremendous amount of manual work requiring experiences and/or trial and error as needed in the cut-cell method of the voxel method. For this reason, in the present embodiment, there is no problem according to processing the boundary with the external space, which has been a problem in the voxel method.

Note that in the present embodiment, as will be described later, by filling a gap between the cabin space and a cut domain with a new discretionarily-shaped divided domain, the analysis domain becomes constituted with divided domains not dependent only on orthogonal grid shapes, and in addition, the analysis domain is filled with divided domains without overlapping.

Also, in the case of causing the numerical analysis apparatus A of the present embodiment to function as the arithmetic/logical unit 1op, the preprocess program P1 causes the numerical analysis apparatus A of the present embodiment to execute a process of arranging one control point in the inside of each divided domain included in the analysis domain representing the generated cabin space, and to store the arrangement information on the control points, and the volume data occupied by the respective divided domains.

In addition, in the case of causing the numerical analysis apparatus A of the present embodiment to function as the arithmetic/logical unit 1op, the preprocess program P1 causes the numerical analysis apparatus A of the present embodiment to calculate the area and the normal vector for each boundary surface as the boundary surface between the divided domains, and to store the area and the normal vector of each of these boundary surfaces.

Further, in the case of causing the numerical analysis apparatus A of the present embodiment to function as the arithmetic/logical unit 1op, the preprocess program P1 causes the numerical analysis apparatus A to generate linkage information on the control points of the divided domains (links), and to store the links.

Then, the preprocess program P1 causes the numerical analysis apparatus A of the present embodiment to put together the volume of each divided domain; the area and normal vector of each boundary surface; the arrangement information on the control points of the divided domains; and the linkage information on the control points of the divided domains (links), so as to generate the calculation data model. The arrangement represented in the arrangement information may be represented, for example, by using coordinates.

Also, in the case of causing the numerical analysis apparatus A of the present embodiment to function as the arithmetic/logical unit 1op, the preprocess program P1 causes the numerical analysis apparatus A of the present embodiment to aggregate multiple divided domains as described with the process of generating aggregated domains, so as to generate a requested number of aggregated domains.

Also, in the case of causing the numerical analysis apparatus A of the present embodiment to function as the arithmetic/logical unit 1op, the preprocess program P1 causes the numerical analysis apparatus A of the present embodiment to virtually arrange one control point in the inside of each of the generated aggregated domains, and to store the arrangement information on the control points of the aggregated domains, and the volume data of the aggregated domains.

Also, in the case of causing the numerical analysis apparatus A of the present embodiment to function as the arithmetic/logical unit 1op, the preprocess program P1 causes the numerical analysis apparatus A of the present embodiment to calculate the area and the normal vector of the boundary surface between the above aggregated domains, and to store the areas and the normal vectors of these boundary surfaces.

Further, in the case of causing the numerical analysis apparatus A of the present embodiment to function as the arithmetic/logical unit 1op, the preprocess program P1 causes the numerical analysis apparatus A to generate linkage information on the control points of the aggregated domains (links), and to store the links.

Then, as described in the process of generating a calculation model with respect to aggregated domains, the preprocess program P1 causes the numerical analysis apparatus A of the present embodiment to put together the volumes of the aggregated domains having the control points arranged; the area and second normal vector of each boundary surface as the boundary surface between the aggregated domains; the arrangement information on the control points of the aggregated domains; and linkage information on the control points of the aggregated domains (links), so as to generate the calculation data model. The arrangement represented in the arrangement information may be represented, for example, by using coordinates.

Also, in the case of setting conditions required for executing the solver process described above, the preprocess program P1 causes the numerical analysis apparatus A of the present embodiment to execute settings of physical properties, settings of boundary conditions, settings of initial conditions, and settings of calculation conditions.

Here, the physical properties include the density, viscous coefficient, thermal conductivity, and the like of the air in the cabin space.

The boundary conditions are conditions that specify laws of exchange of physical quantities between control points, which are, as have been described above in the present embodiment, the discretized governing equation based on the heat conduction equation expressed as Equation (11) and the discretized governing equation based on the advection-diffusion equation of heat expressed as Equation (12).

The boundary conditions also include information that represents aggregated domains that face the boundary surface between the cabin space and the external space.

The initial conditions represent physical quantities at the outset of executing the solver process, which are initial values of the flow velocity in the respective divided domains.

The calculation conditions are conditions of calculation in the solver process, for example, the number of repetitions and convergence criteria.

Also, the preprocess program P1 causes the numerical analysis apparatus A of the present embodiment to form a GUI (Graphical User Interface). More specifically, the preprocess program P1 causes the display 5a of the output device 5 to display graphics, and transitions into a state in which operations with the keyboard 4a and the mouse 4b of the input device 4 are enabled.

The solver process program P2 (physical quantity calculation program) is a program that causes the numerical analysis apparatus A of the present embodiment to execute the solver process, and causes the numerical analysis apparatus A of the present embodiment to function as a physical quantity calculation apparatus.

Here, the operator of the numerical analysis apparatus A is requested to input a selection, via the GUI, keyboard, and/or mouse operations, whether to set the correction factor to 1 or not to 1 (to derive the correction factor by the solver process) upon calculating the conductance representing a characteristic with respect to transfer of a physical quantity between the aggregated domains, and the capacitance representing a characteristic with respect to accumulation of the physical quantity for each aggregated domain.

Then, in the case of not setting the correction factor to 1, as an initial calculation, in the case of causing the numerical analysis apparatus A of the present embodiment to function as the arithmetic/logical unit lop, the solver process program P2 causes the numerical analysis apparatus A to calculate physical quantities in the analysis domain by using the solver data file F that includes the volume of the control volume of each divided domain and the area and the normal vector of each boundary surface of the divided domains included in the calculation data model (initial calculation). Based on this initial calculation result of the physical quantity in the analysis domain, and a physical property with respect to the divided domains and the calculation data model with respect to the divided domains, the correction factor is calculated.

Then, in the case of causing the numerical analysis apparatus A of the present embodiment to function as the arithmetic/logical unit lop, the solver process program P2 causes the numerical analysis apparatus A to calculate, as described above in the calculating process, the conductance representing a characteristic with respect to transfer of a physical quantity between the aggregated domains, and the capacitance representing a characteristic with respect to accumulation of the physical quantity for each aggregated domain, based on the correction factor described above, the physical property with respect to the analysis domain, and the calculation data model with respect to the aggregated domains.

In the case of setting the correction factor to 1, the solver processing program P2 does not execute the initial calculation; and in the case of causing the numerical analysis apparatus A of the present embodiment to function as the arithmetic/logical unit lop, the solver process program P2 sets the correction factor to 1 and causes the numerical analysis apparatus A to calculate, as described above in the calculating process, the conductance representing a characteristic with respect to transfer of a physical quantity between the aggregated domains, and the capacitance representing a characteristic with respect to accumulation of the physical quantity for each aggregated domain, based on the physical property with respect to the analysis domain, and the calculation data model with respect to the aggregated domains.

Next, in the solver process, as described above in the implementation method of heat conductance and thermal capacitance on a general-purpose MBD program, the solver process program P2 causes the numerical analysis apparatus A to generate a cabin thermal network model that connects control points of all the aggregated domains in the analysis domain in a form of a network by using the conductance and the capacitance described above, and causes the data storage section 2b to store data of the cabin thermal network model (calculation result data) described in a model description language or a programming language.

The postprocess program P3 causes the numerical analysis apparatus A of the present embodiment to execute a visualization process, an extraction process, and the like with respect to a calculation result.

Here, the visualization process is a process of causing the output device 5 to output, for example, in the case of having executed the initial calculation described above, a cross-sectional contour display, a vector display, an isosurface display, and an animation display by using the result data of the initial calculation. Also, the extraction process is, in the case of having executed the initial calculation described above, a process of extracting quantitative values in domains specified by the operator to be output on the output device 5 as numerical values and/or graphs, or of extracting quantitative values in domains specified by the operator to be output as a file by using the result data of the initial calculation.

The postprocess program P3 also causes the numerical analysis apparatus A of the present embodiment to execute automatic report generation, display of calculated residuals, and analysis with respect to the conductance, the capacitance, and the cabin thermal network model data that have been calculated by the solver process.

The data storage section 2b stores the calculation data model M; boundary condition data D1 representing the boundary conditions; calculation condition data D2 representing the calculation conditions; physical property data D3 representing the physical properties; the solver input data file F including initial condition data D4 representing the initial conditions; three-dimensional shape data D5; calculation result data D6; and the like. Further, the data storage section 2b temporarily stores intermediate data generated during the course of processing executed by the CPU 1.

The DVD drive 3 is configured to be capable of taking in a DVD medium X, and based on a command input from the CPU 1, outputs data to be stored in the DVD medium X. Further, in the present embodiment, the numerical analysis program P is stored in the DVD medium X, and the DVD drive 3 outputs the numerical analysis program P stored in the DVD medium X based on a command input from the CPU 1.

The input device 4 is a human-machine interface between the numerical analysis apparatus A of the present embodiment and the operator, and includes the keyboard 4a and the mouse 4b as pointing devices.

The output device 5 is a device to visualize and output signals input from the CPU 1, and includes the display 5a and the printer 5b.

The communication device 6 exchanges data between the numerical analysis apparatus A of the present embodiment and an external device such as a CAD device C, and is electrically connected to a network B such as an in-house LAN (Local Area Network). Here, the communication device 6 obtains the cabin thermal network model data extracted by the CPU 1, and transmits the obtained cabin thermal network model data to the numerical analysis apparatus B, which will be described later. Also, the communication device 6 may cause an auxiliary storage device such as a USB flash drive to store the cabin thermal network model data, and to output the stored cabin thermal network model data from the auxiliary storage device to the numerical analysis apparatus B.

Next, a numerical analysis method using the numerical analysis apparatus A of the present embodiment configured as such (simulation method of the present embodiment) will be described with reference to flowcharts in FIG. 17 and FIG. 18.

Note that before executing the numerical analysis method of the present embodiment, the CPU 1 extracts from the DVD medium X the numerical analysis program P stored in the DVD medium X taken into the DVD drive 3, and stores it in the program storage section 2a of the storage device 2.

Then, when a signal instructing to start numerical analysis is input from the input device 4, the CPU 1 executes the numerical analysis based on the numerical analysis program P stored in the storage device 2. More specifically, the CPU 1 executes the preprocess based on the preprocess program P1 stored in the program storage section 2a; executes the solver process based on the solver process program P2 stored in the program storage section 2a; and executes the postprocess based on the postprocess program P3 stored in the program storage section 2a. Note that the CPU 1 executing the preprocess based on the preprocess program P1 causes the numerical analysis apparatus A of the present embodiment to function as the arithmetic/logical unit lop. Also, the CPU 1 executing the solver process based on the solver process program P2 causes the numerical analysis apparatus A of the present embodiment to function as the arithmetic/logical unit lop.

Figure 17:
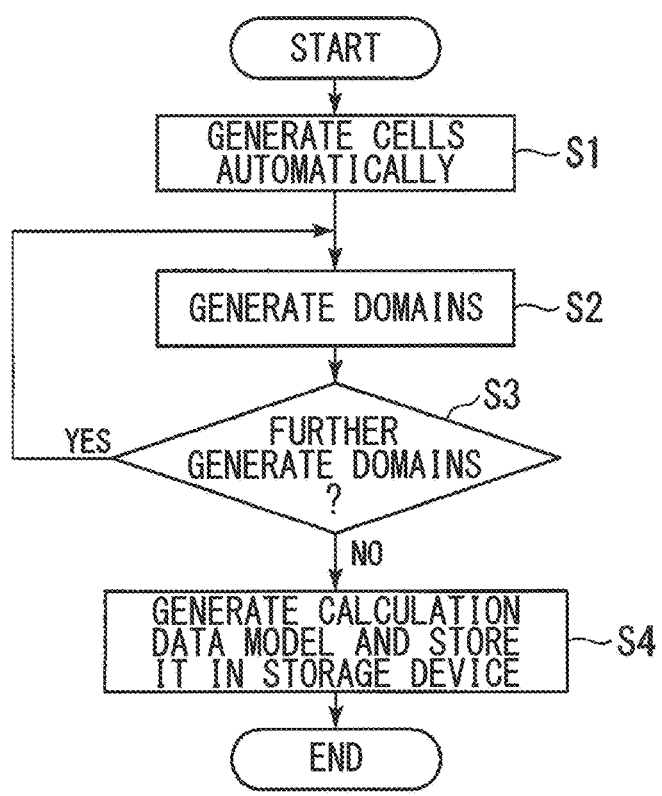
FIG. 17 is a flowchart illustrating an example of operations of the numerical analysis apparatus A of the present embodiment.

FIG. 17 is a flowchart illustrating an example of operations of the numerical analysis apparatus A of the present embodiment. FIG. 17 illustrates a process in which the numerical analysis apparatus A generates a calculation data model.

(Step S1)

Once the preprocess has been started, the CPU 1 causes the communication device 6 to obtain the three-dimensional shape data D5 including the cabin space of the motor vehicle from the CAD device C via the network N. The CPU 1 causes the data storage section 2b of the storage device 2b to store the obtained three-dimensional shape data D5.

Next, the CPU 1 analyzes the obtained three-dimensional shape data D5, to detect overlapping curved surfaces, crossing curved surfaces, gaps between curved surfaces, minute holes, and the like that may be included in the three-dimensional shape data D5 stored in the storage device 2b.

Next, the CPU 1 executes a correction or change process of the obtained three-dimensional shape data D5. More specifically, the CPU 1 executes a process of wrapping or the like of a cabin space K included in the three-dimensional shape data D5 by a minute closed surface, to exclude existence of overlapping curved surfaces, crossing curved surfaces, gaps between curved surfaces, minute holes, and the like from the three-dimensional shape data D5 of the cabin space.

Note that in the correction or change process, the CPU 1 forms a GUI, and when a command (for example, a command to specify a domain to be mended) is input from the GUI, executes the correction or change process reflecting the command.

From the three-dimensional shape data D5 that has been corrected or changed, the CPU 1 executes generation of an analysis domain that includes the entire region of the cabin space, and is divided into divided domains. Note that here, although the analysis domain is divided into divided domains of orthogonal grids for shortening the time, the divided domains constituting the analysis domain do not necessarily need to be orthogonal grids, and may have any shapes.

Next, the CPU 1 deletes a divided domain projecting from the cabin space, so that the analysis domain is contained in the cabin space without protrusion. Consequently, a gap is formed between the boundary surface of the analysis domain and the boundary surface of the cabin space.

Next, the CPU 1 fills a gap with a new divided domain that becomes a part of the analysis domain.

As described above, in the numerical analysis method of the present embodiment, since a calculation data model with respect to divided domains not having quantities that specify geometrical shapes is generated, the calculation data model can be generated without imposing constraints on geometric shapes of the divided domains. In other words, when generating a calculation data model, a divided domain constituting the analysis domain can take any shape. Therefore, when filling a gap with a new divided domain, the CPU 1 can set any shape for the divided domain. Because of this, a gap can be filled with a divided domain very easily, and for example, even if the operator does not operate on the GUI, it is adequately possible to form a divided domain automatically. If a gap is to be filled with a divided domain in the conventional finite volume method, under the constraint on the geometric shape of the divided domain as described above, it is necessary to arrange the divided domain so as not to generate a strain or twist. This work needs to be done by the operator's manual operation, and consequently, forces a huge burden upon the operator, and leads to a prolonged analysis operation time.

Next, the CPU 1 virtually arranges one control point in each divided domain included in the analysis domain that represents the cabin space. Here, the CPU 1 virtually arranges one control point in each divided domain. Then, the CPU 1 calculates the arrangement information on the control points, the volume of the control volume occupied by each control point (the volume of the divided domain having the control point arranged), and causes the data storage section 2b of the storage device 2 to temporarily store the calculated data.

The CPU 1 also calculates the area and the normal vector of each boundary surface as the boundary surface between the divided domains, and causes the data storage section 2b of the storage device 2 to temporarily store the areas and the normal vectors of these boundary surfaces.

The CPU 1 also generates links, and causes the data storage section 2b of the storage device 2 to temporarily store the links.

Then, the CPU 1 generates a database from the arrangement information on the control points, the volume of the control volume occupied by each control point, the area and the normal vector of each boundary surface, and the links stored in the data storage section 2b to generate the calculation data model M, and causes the data storage section 2b of the storage device 2 to store the generated calculation data model M.

Note that a final analysis domain is generated by dividing the analysis domain including the cabin space into divided domains, further deleting a divided domain projecting from the cabin space, and further filling a gap generated between the analysis domain and the cabin space as a result of the deletion, with a new divided domain. Because of this, the entire region of the cabin space is put into a state of being filled with non-overlapping divided domains.

Therefore, the calculation data model is considered to satisfy the three conditions (a) to (c) for satisfying the conservation law described above.

Further, in the present embodiment, a configuration is adopted in which divided domains are formed first, and then, control points are arranged, and for each of the control points, the volume of the divided domain having the control point arranged is assigned.

However, in the present embodiment, it is also possible to arrange the control points in the analysis domain first, and then, to assign the volume to each of the control points.

Specifically, for example, each control point is given a weight based on a radius reaching a different control point or a distance to a control point in a linkage relationship (associated with a link).

Further, in the generation of the calculation data model, the CPU 1 forms a GUI, and when a command (for example, a command to specify the density of the divided domains or a command to specify the shapes of the divided domains) is input from the GUI, executes a process reflecting the command. Therefore, the operator can discretionarily adjust the arrangement of the control points and the shapes of the divided domains by operating the GUI.

However, upon collation with the three conditions for satisfying the conservation law stored in the numerical analysis program, if the command input from the GUI deviates from the conditions, the CPU 1 causes the display 5a to display a message indicating the deviation.

(Step S2)

Next, the CPU 1 generates a requested number of aggregated domains by aggregating multiple divided domains As described above, in the numerical analysis method of the present embodiment, since a calculation data model with respect to aggregated domains not having quantities that specify geometrical shapes is generated, the calculation data model can be generated without imposing constraints on geometric shapes of the aggregated domains. In other words, when generating a calculation data model, an aggregated domain can take any shape.

(Step S3)

The CPU 1 of the numerical analysis apparatus A determines whether to newly generate a domain by aggregating multiple domains generated at Step S2, based on requested fineness and calculation precision of a cell division according to the process of generating aggregated domains described above. If having determined to generate at Step S3, the process transitions to Step S2.

(Step S4)

If having determined not to generate at Step S3, the CPU 1 of the numerical analysis apparatus A arranges one control point virtually in each aggregated domain included in the analysis domain that represents the cabin space. Here, the CPU 1 virtually arranges one aggregated control point in each aggregated domain. Then, the CPU 1 calculates arrangement information on the control points, and the volume of the control volume occupied by each control point (the volume of an aggregated domain having a control point arranged), and causes the data storage section 2b of the storage device 2 to store them temporarily.

The CPU 1 also calculates the area and the normal vector of each boundary surface as the boundary surface of the aggregated domains, and causes the data storage section 2b of the storage device 2 to store these areas and normal vectors of the boundary surface temporarily.

Also, the CPU 1 generates links and causes the data storage section 2b of the storage device 2 to store the links.

Then, the CPU 1 generates a database from the arrangement information on the control points, the volume of the control volume occupied by each control point, the area and the normal vector of each boundary surface, and the links to generate the calculation data model M, and causes the data storage section 2b of the storage device 2 to store the generated calculation data model M.

The calculation data model with respect to the aggregated domains is considered to satisfy the three conditions (a) to (c) for satisfying the conservation law described above.

Figure 18:
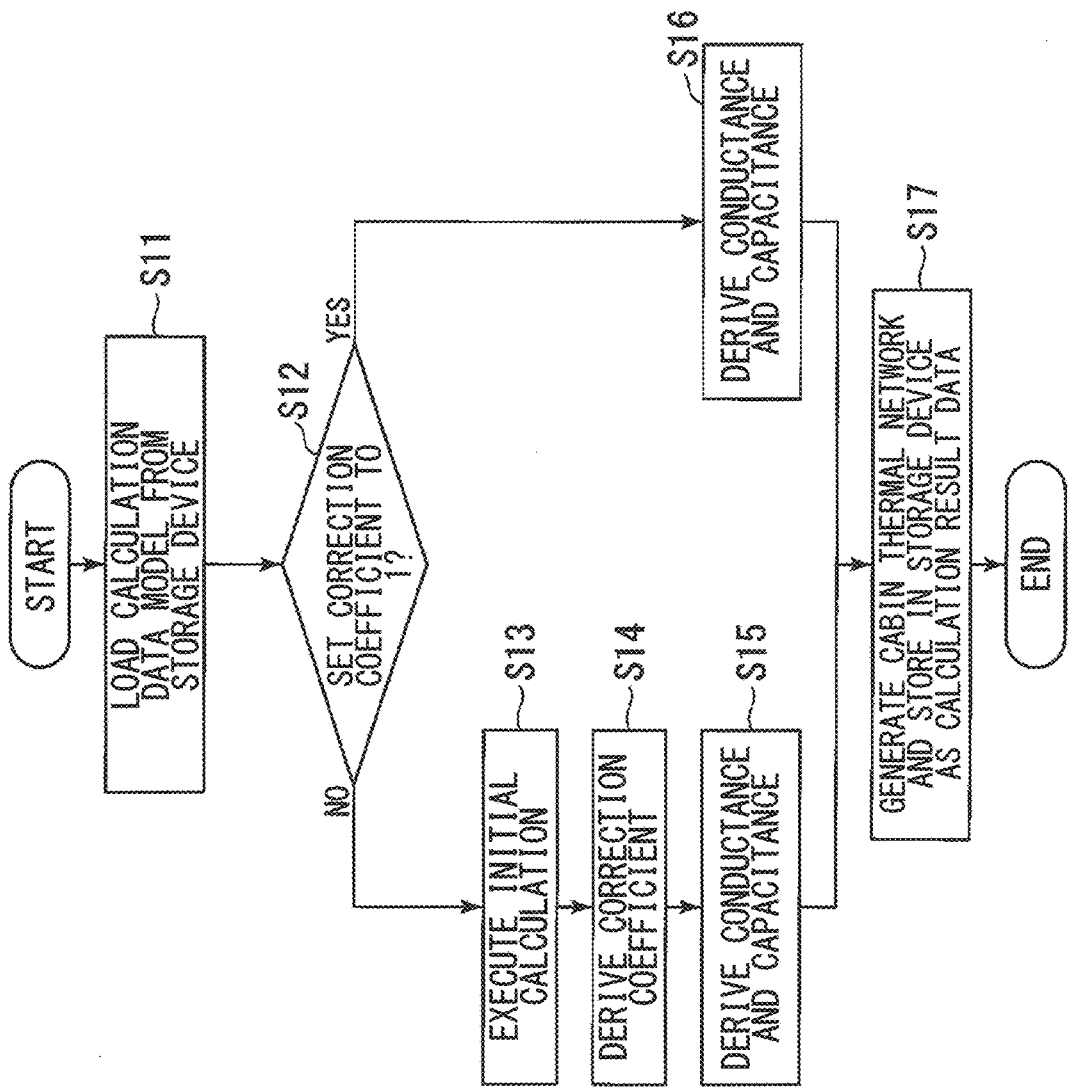
FIG. 18 is a flowchart illustrating an example of operations of the numerical analysis apparatus A of the present embodiment.

FIG. 18 is a flowchart illustrating an example of operations of the numerical analysis apparatus A of the present embodiment. FIG. 18 illustrates a process in which the numerical analysis apparatus A generates a cabin thermal network.

(Step S11)

The CPU 1 of the numerical analysis apparatus A calls the calculation data model M described above from the data storage section 2b of the storage device 2, to execute a calculation process according to the flowchart in FIG. 18.

(Step S12)

The CPU 1 determines whether or not to set the correction factor to 1 by a command input from the GUI by an operator of the numerical analysis apparatus A.

(Step S13)

A case will be described in which it has been determined not to set the correction factor to 1.

The CPU 1 sets boundary condition data. Specifically, the CPU 1 displays an input screen of boundary conditions on the display 5a by using the GUI, and causes the data storage unit 2b to temporarily store signals representing the boundary conditions input from the keyboard 4a or the mouse 4b as the boundary condition data D1, to set the boundary condition data. Note that the boundary conditions mentioned here represent a discretized governing equation that dominates a physical phenomenon in the cabin space, identification information on control points facing the boundary surface between the cabin space and the external space, and a heat transfer condition between the cabin space and the external space, and the like. If default data prepared in advance is adequate as the boundary condition data, there is no need to input boundary conditions on an input screen of the GUI, and the default data is automatically set as the boundary condition data.

Note that these discretized governing equations are selected, for example, from among multiple discretized governing equations stored in advance in the numerical analysis program P and displayed on the display 5a, by the operator using the keyboard 4a and the mouse 4b.

The CPU 1 sets initial condition data. Specifically, the CPU 1 displays an input screen of initial conditions on the display 5a by using the GUI, and causes the data storage unit 2b to temporarily store signals representing the initial conditions input from the keyboard 4a or the mouse 4b as the initial condition data D4, to set the initial condition data. If default data prepared in advance is adequate as the initial condition data, there is no need to input initial conditions on an input screen of the GUI, and the default data is automatically set as the initial condition data.

The CPU 1 sets calculation condition data. Specifically, the CPU 1 displays an input screen of calculation conditions on the display 5a by using the GUI, and causes the data storage unit 2b to temporarily store signals representing the calculation conditions input from the keyboard 4a or the mouse 4b as the calculation condition data D2, to set the calculation condition data. Note that the calculation conditions mentioned here are conditions of calculation in the solver process, for example, the number of repetitions and convergence criteria. If default data prepared in advance is adequate as the calculation condition data, there is no need to input calculation conditions on an input screen of the GUI, and the default data is automatically set as the calculation condition data.

The CPU 1 sets physical property data. Specifically, the CPU 1 displays an input screen of physical properties on the display 5a by using the GUI, and causes the data storage unit 2b to temporarily store signals representing the physical properties input from the keyboard 4a or the mouse 4b as the physical property data D3, to set the physical properties. Note that the physical properties mentioned here are characteristic values of the air as the fluid in the cabin space, which may include the density, viscosity coefficient, thermal conductivity, and the like of the air. If default data prepared in advance is adequate as the physical property data, there is no need to input physical properties on an input screen of the GUI, and the default data is automatically set as the physical property data.

The CPU 1 generates a solver input data file F.

Specifically, the CPU 1 stores the calculation data model M; the physical property data D3; the boundary condition data D1; the initial condition data D4; and the calculation condition data D2, in the solver input data file F, to generate the solver input data file F. Note that this solver input data file F is stored in the data storage section 2b.

Next, the CPU 1 determines the consistency of the solver input data. Note that the solver input data means data stored in the solver input data file F, which includes the calculation data model M; the boundary condition data D1; the calculation condition data D2; the physical property data D3; and the initial condition data D4.

Specifically, the CPU 1 analyzes whether the solver input data that enables to execute the physical quantity calculation in the solver process is stored in the solver input data file F, to determine the consistency of the solver input data.

Then, if having determined that the solver input data is inconsistent, the CPU 1 causes the display 5a to display an error, and further, to display a screen for inputting data to compensate for the inconsistent part. Thereafter, the CPU 1 adjusts the solver input data based on signals input from the GUI.

On the other hand, if having determined that the solver input data is consistent, the CPU 1 executes an initial calculation process.

Specifically, the CPU 1 generates a discretization coefficient matrix from the boundary condition data D1, the physical property data D3, and the discretized governing equations of partial domains stored in the calculation data model M, and further, generates a data table for matrix calculation, to execute the initial calculation process.

(Step S14)

The CPU 1 derives a correction factor from an initial calculation result with respect to the divided domains, the boundary-surface characteristic quantities between the domains, and the like.

(Step S15)

According to the calculating process described above, the CPU 1 calculates the heat conductance of the aggregated domains of the thermal network equation on MBD from the boundary condition data D1, the physical property data D3, and the discretized governing equation with respect to the aggregated domains stored in the calculation data model M, by using the correction factor described above.

According to the calculating process described above, the CPU 1 calculates the thermal capacitance (heat capacity) of the aggregated domains of the thermal network equation on MBD from the boundary condition data D1, the physical property data D3, and the discretized governing equation with respect to the aggregated domains stored in the calculation data model M, without using the initial calculation result.

(Step S16)

A case will be described in which it has been determined to set the correction factor to 1.

The CPU 1 sets boundary condition data.

Specifically, the CPU 1 displays an input screen of boundary conditions on the display 5a by using the GUI, and causes the data storage unit 2b to temporarily store signals representing the boundary conditions input from the keyboard 4a or the mouse 4b as the boundary condition data D1, to set the boundary condition data. Note that the boundary conditions mentioned here represent a discretized governing equation that dominates a physical phenomenon in the cabin space, identification information on control points facing the boundary surface between the cabin space and the external space, and a heat transfer condition between the cabin space and the external space, and the like. If default data prepared in advance is adequate as the boundary condition data, there is no need to input boundary condition on an input screen of the GUI, and the default data is automatically set as the boundary condition data.

Note that these discretized governing equations are selected, for example, from among multiple discretized governing equations stored in advance in the numerical analysis program P and displayed on the display 5a, by the operator using the keyboard 4a and the mouse 4b.

The CPU 1 sets physical property data.

Specifically, the CPU 1 displays an input screen of physical properties on the display 5a by using the GUI, and causes the data storage unit 2b to temporarily store signals representing the physical properties input from the keyboard 4a or the mouse 4b as the physical property data D3, to set the physical properties. Note that the physical properties mentioned here are characteristic values of the air as the fluid in the cabin space, which may include the density, viscosity coefficient, thermal conductivity, and the like of the air. If default data prepared in advance is adequate as the physical property data, there is no need to input physical property on an input screen of the GUI and the default data is automatically set as the physical property data.

The CPU 1 generates a solver input data file F. Specifically, the CPU 1 stores the calculation data model M; the physical property data D3; and the boundary condition data D1, in the solver input data file F, to generate the solver input data file F. Note that this solver input data file F is stored in the data storage section 2b.

Next, the CPU 1 determines the consistency of the solver input data. Note that the solver input data means data stored in the solver input data file F, which includes the calculation data model M; the boundary condition data D1; and the physical property data D3.

Specifically, the CPU 1 analyzes whether the solver input data that enables to execute the calculation of the thermal capacitance (heat capacity) and heat conductance of the MBD thermal network equation in the solver process is stored in the solver input data file F, to determine the consistency of the solver input data.

Then, if having determined that the solver input data is inconsistent, the CPU 1 causes the display 5a to display an error, and further, to display a screen for inputting data to compensate for the inconsistent part. Thereafter, the CPU 1 adjusts the solver input data based on signals input from the GUI.

On the other hand, if having determined that the solver input data is consistent, the CPU 1 executes a calculation process of the thermal capacitance (heat capacity) of the aggregated domains and the heat conductance of the aggregated domains of the MBD thermal network equation.

Specifically, the CPU 1 calculates thermal capacitance (heat capacity) of the aggregated domains and the heat conductance of the aggregated domains of an MBD thermal network equation, from the boundary condition data D1, the physical property data D3, and a discretized governing equation with respect to the aggregated domains stored in the calculation data model M.

(Step S17)

Next, as described above in the implementation method of heat conductance and thermal capacitance on a general-purpose MBD program, the CPU 1 generates a cabin thermal network model that connects control points of all the aggregated domains in the analysis domain in a form of a network by using the conductance and the capacitance of the aggregated domains of the MBD thermal network equation, and causes the data storage section 2b to store data of the cabin thermal network model (calculation result data) described in a model description language or a programming language.

Figure 19:
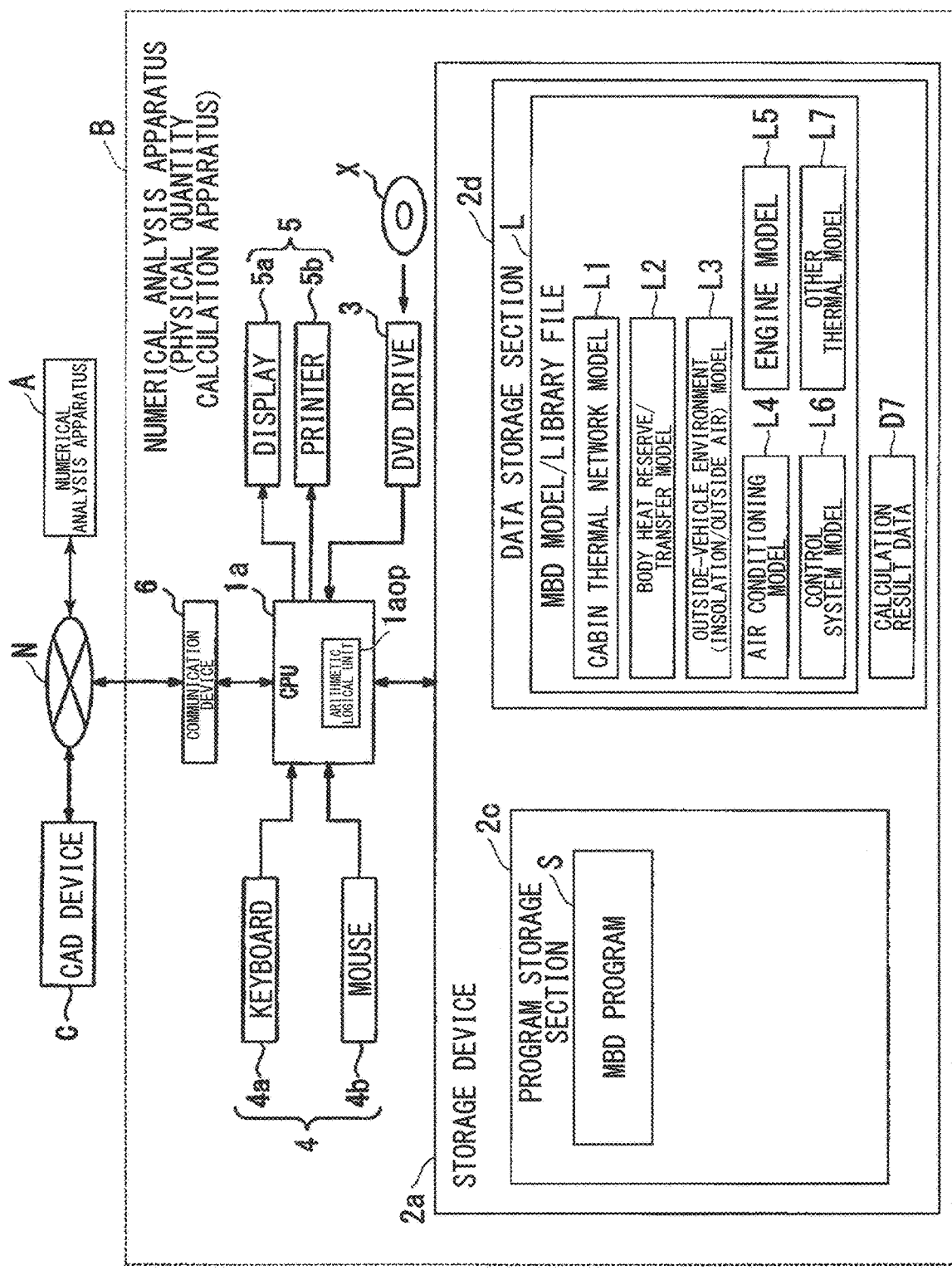
FIG. 19 is a block diagram schematically illustrating a hardware configuration of a numerical analysis apparatus B of the present embodiment.

As illustrated in FIG. 19, the numerical analysis apparatus B of the present embodiment is an apparatus that is constituted with a computer, such as a personal computer, a workstation, or the like, that includes a CPU 1a, a storage device 2a, a DVD drive 3, input devices 4, output devices 5, and a communication device 6.

The CPU 1a is electrically connected to the storage device 2a, the DVD drive 3, the input devices 4, the output devices 5, and the communication device 6, to process signals input from these various devices, and to output a processed result.

The storage device 2a is constituted with an internal storage device, such as a memory, and an external storage device, such as a hard disk drive, to store information input from the CPU 1a and to output stored information based on a command input from the CPU 1a.

In addition, in the present embodiment, the storage device 2a includes a program storage section 2c and a data storage section 2d.

The program storage section 2c stores an MBD program S. This MBD program S is an application program to be executed on a predetermined OS (Operating System), to cause the numerical analysis apparatus B of the present embodiment constituted with a computer to function so as to execute numerical analysis. Further, the MBD program S causes the numerical analysis apparatus B of the present embodiment to function as, for example, the arithmetic/logical unit Iaop.

In the case of causing the numerical analysis apparatus B of the present embodiment to function as the arithmetic/logical unit Iaop, the MBD program S uses the cabin thermal network model data transmitted by the numerical analysis apparatus A, to execute an unsteady numerical calculation of a physical quantity on an analysis target including the analysis domain. Also, in the case of causing the numerical analysis apparatus B of the present embodiment to function as the arithmetic/logical unit Iaop, the MBD program S may use the cabin thermal network model data output by an auxiliary storage device, to execute an unsteady numerical calculation of a physical quantity on an analysis target including the analysis domain.

The MBD program S causes the numerical analysis apparatus B of the present embodiment to execute a visualization process and an extraction process with respect to a calculation result.

Here, the visualization process is a process of causing the output device 5 to output, for example, a graph display, a list display, and an animation display of calculated physical quantities. Also, the extraction process is a process of extracting quantitative values of physical quantities specified by the operator to be output on the output device 5 as numerical values, graphs, and/or lists, or of extracting quantitative values of physical quantities specified by the operator to be output as a file.

The MBD program S also causes the numerical analysis apparatus B of the present embodiment to execute automatic report generation, display of calculated residuals, and analysis.

The data storage section 2d stores an MBL model/library file L, calculation result data D7, and the like. In addition, the data storage section 2d temporarily stores intermediate data generated during the course of processing executed by the CPU 1a.

The data storage section 2d further stores the cabin thermal network model L1 transmitted from the numerical analysis apparatus A by the communication device 6 as the MBL model/library file L. Alternatively, it may cause an auxiliary storage device to store the cabin thermal network model data, and to output the stored cabin thermal network model data from the auxiliary storage device to the numerical analysis apparatus B, so as to store in the data storage section 2d.

Also, the numerical analysis apparatus B of the present embodiment stores in the data storage section 2d, as the MBL model/library file L, a body heat reserve/transfer model L2; an outside-vehicle environment insolation/outside-air model L3; an air-conditioning model L4; an engine model L5; a control system model L6; another thermal model L7; and the like, which are attached to the MBD program S by default. Note that the MBL model/library file L may be customized by the operator by changing parameters and the like in the MBD model in accordance with the purpose of the analysis. Also, it is possible to store an MBD model library file generated by another operator.

The DVD drive 3 is configured to be capable of taking in a DVD medium X, and based on a command input from the CPU 1a, outputs data to be stored in the DVD medium X. Further, in the present embodiment, the MBD program S is stored in the DVD medium X, and the DVD drive 3 outputs the MBD program S stored in the DVD medium X based on a command input from the CPU 1a.

The communication device 6 is a device that exchanges data between the numerical analysis apparatus B of the present embodiment and external devices such as a CAD device C and the numerical analysis apparatus A, and is electrically connected to a network N such as an in-house LAN. Here, the communication device 6 receives the cabin thermal network model data transmitted by the numerical analysis apparatus A, and outputs the received cabin thermal network model data to the CPU 1a.

Figure 20:
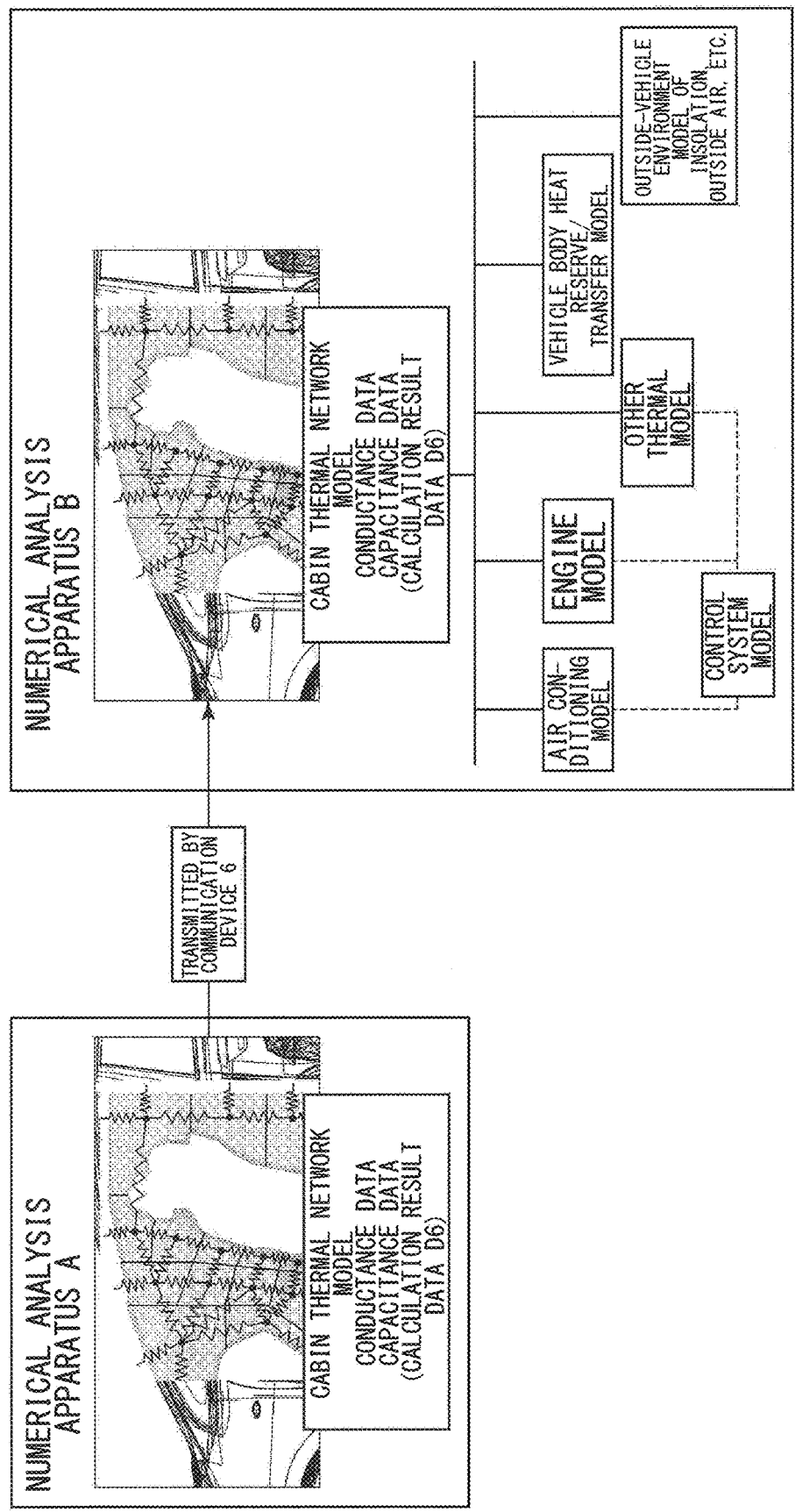
FIG. 20 is a diagram illustrating an example of operations of the numerical analysis apparatus B of the present embodiment.

FIG. 20 is a diagram illustrating an example of operations of the numerical analysis apparatus B of the present embodiment. In the example illustrated in FIG. 20, the numerical analysis apparatus B sets a cabin of a motor vehicle as the analysis domain, and executes an unsteady numerical calculation of a physical quantity of a thermal fluid of the air in the cabin of the motor vehicle, by executing a coupled calculation with one or more models among the cabin thermal network model L1; the air-conditioning model L4; the engine model L5; the automobile body heat reserve/transfer model L2; the outside-vehicle environment insolation/outside-air model L3; and the other thermal model L7; which has been received from the numerical analysis apparatus A via the communication device 6. However, the air-conditioning model L4, the engine model L5, and the other thermal model L7 are controlled by the control system model L6.

Here, as an example, a case will be described in which the numerical analysis apparatus B executes a thermal fluid simulation of the air in the cabin.

Figure 21:
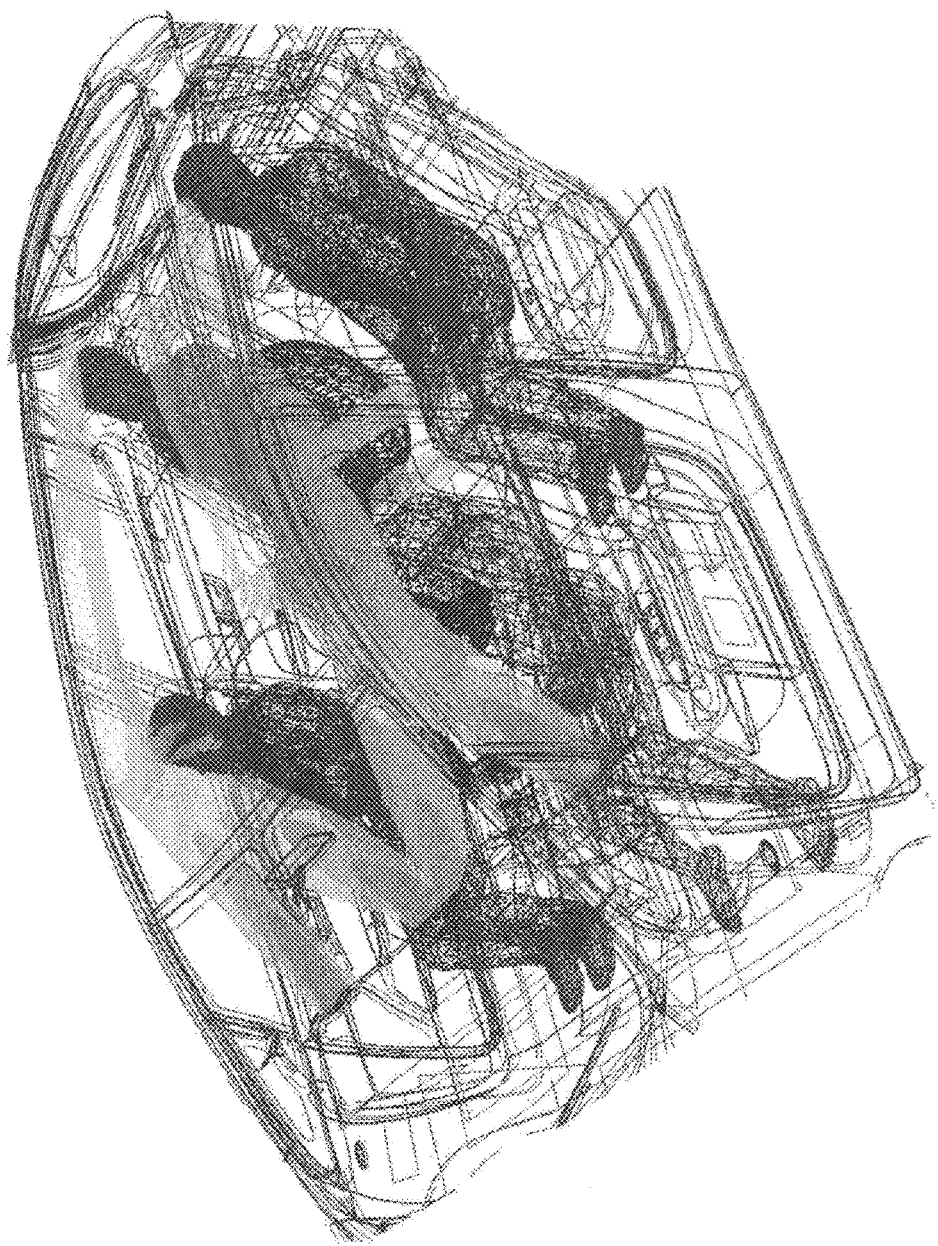
FIG. 21 is a diagram illustrating an example of a thermal fluid simulation of the present embodiment.

FIG. 21 is a diagram illustrating an example of a thermal fluid simulation of the present embodiment. In the thermal fluid simulations, a cabin of a motor vehicle is taken as an example of the analysis domain, and air-conditioning conditions in summer are taken as an example of boundary conditions. Specifically, the outside-vehicle reference temperature is set to 35 degrees; the outside-vehicle heat transfer rate is set to 40 W/m²K; the number of occupants in the motor vehicle is four; the wind velocity blowing out of the air conditioner is set to 5 m/s; and the air temperature blowing out of the air conditioner is set at 8° C. In addition, the boundary conditions may include at least one of the temperature of the engine room, the temperature of the trunk, the temperature of the underfloor, the temperature inside of the dashboard, and the temperature of the ceiling.

As described above, the numerical analysis apparatus A divides the analysis domain (the cabin of the motor vehicle) into cells that do not require coordinates of the vertices and connectivity information on the vertices. In the present embodiment, a case will be described in which the numerical analysis apparatus A divides the analysis domain (the cabin of the motor vehicle) into approximately 4,500,000 cells.

Figure 22:
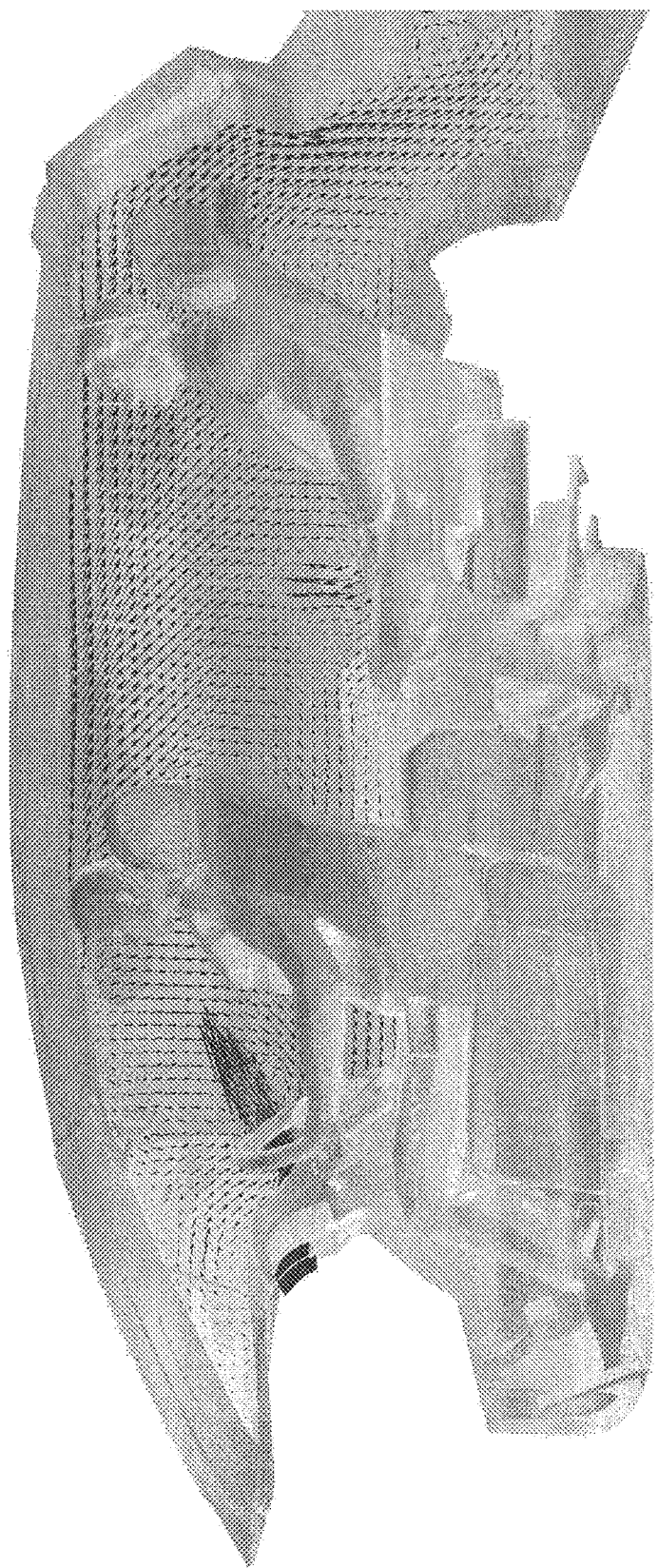
FIG. 22 is a diagram illustrating an example of a thermal fluid simulation of the present embodiment.
Figure 23:
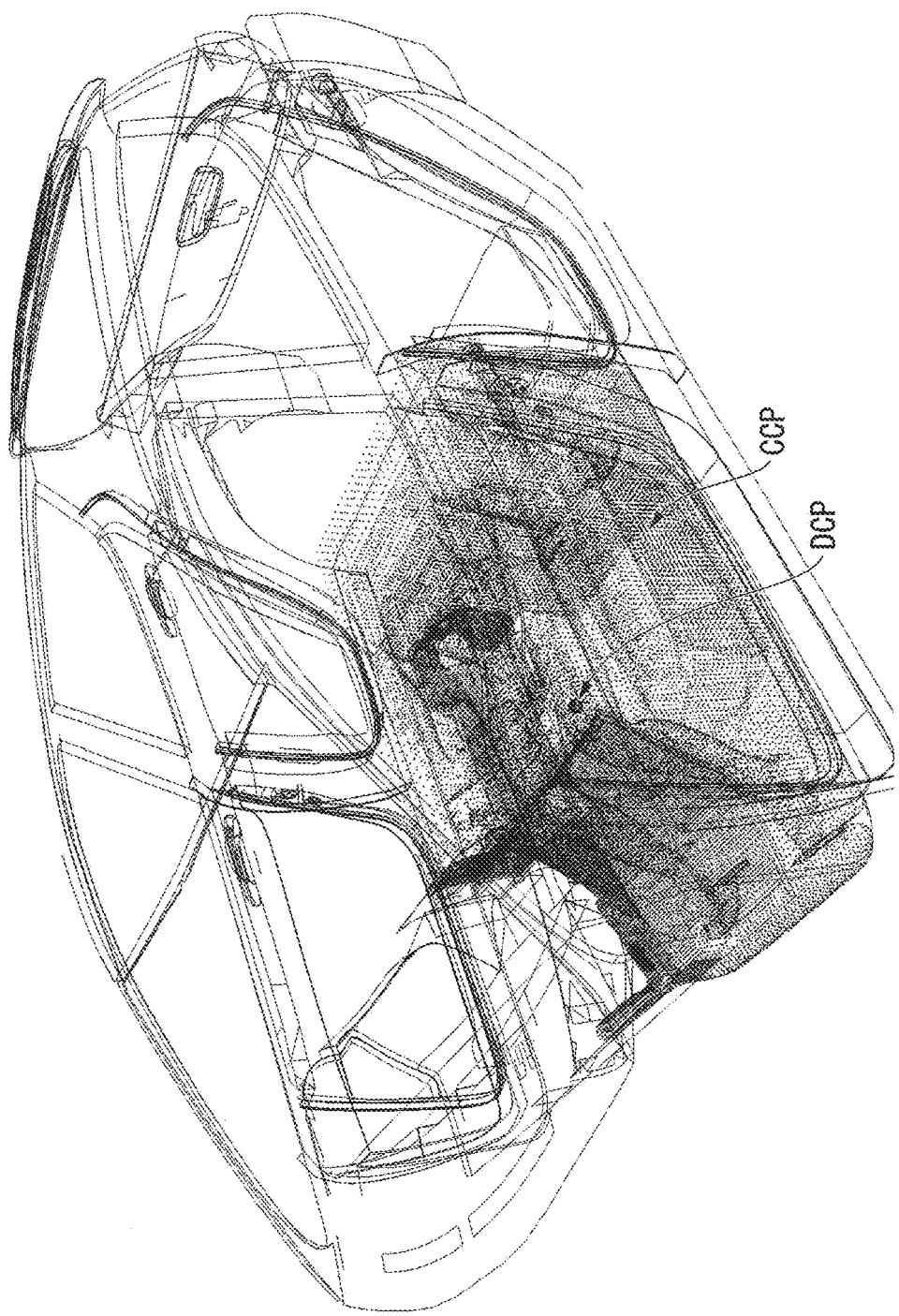
FIG. 23 is a diagram illustrating an example of a generation result of an aggregated domain (domain 1) in a thermal fluid simulation of the present embodiment.
Figure 24:
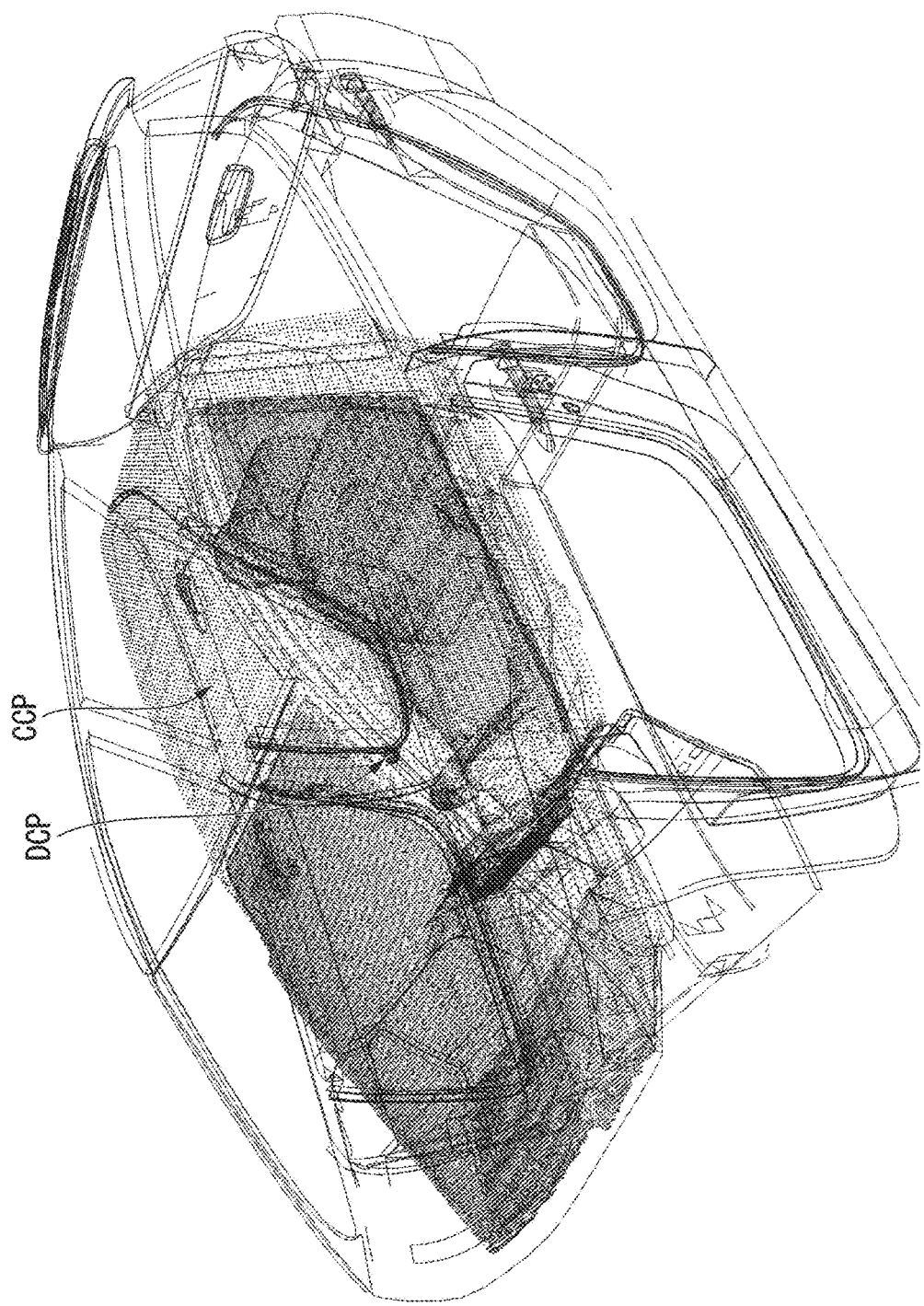
FIG. 24 is a diagram illustrating an example of a generation result of an aggregated domain (domain 2) in a thermal fluid simulation of the present embodiment.
Figure 25:
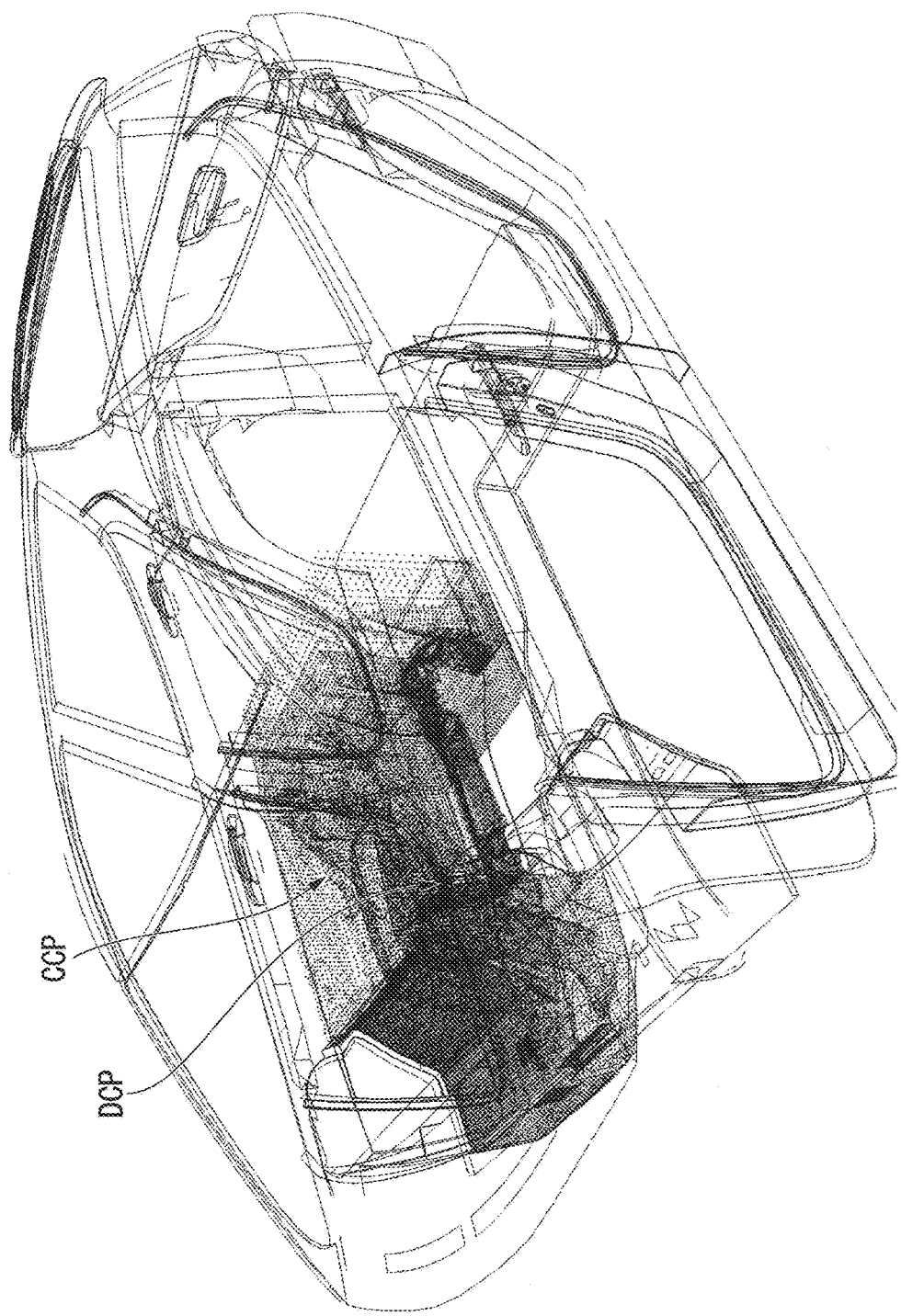
FIG. 25 is a diagram illustrating an example of a generation result of an aggregated domain (domain 3) in a thermal fluid simulation of the present embodiment.
Figure 26:
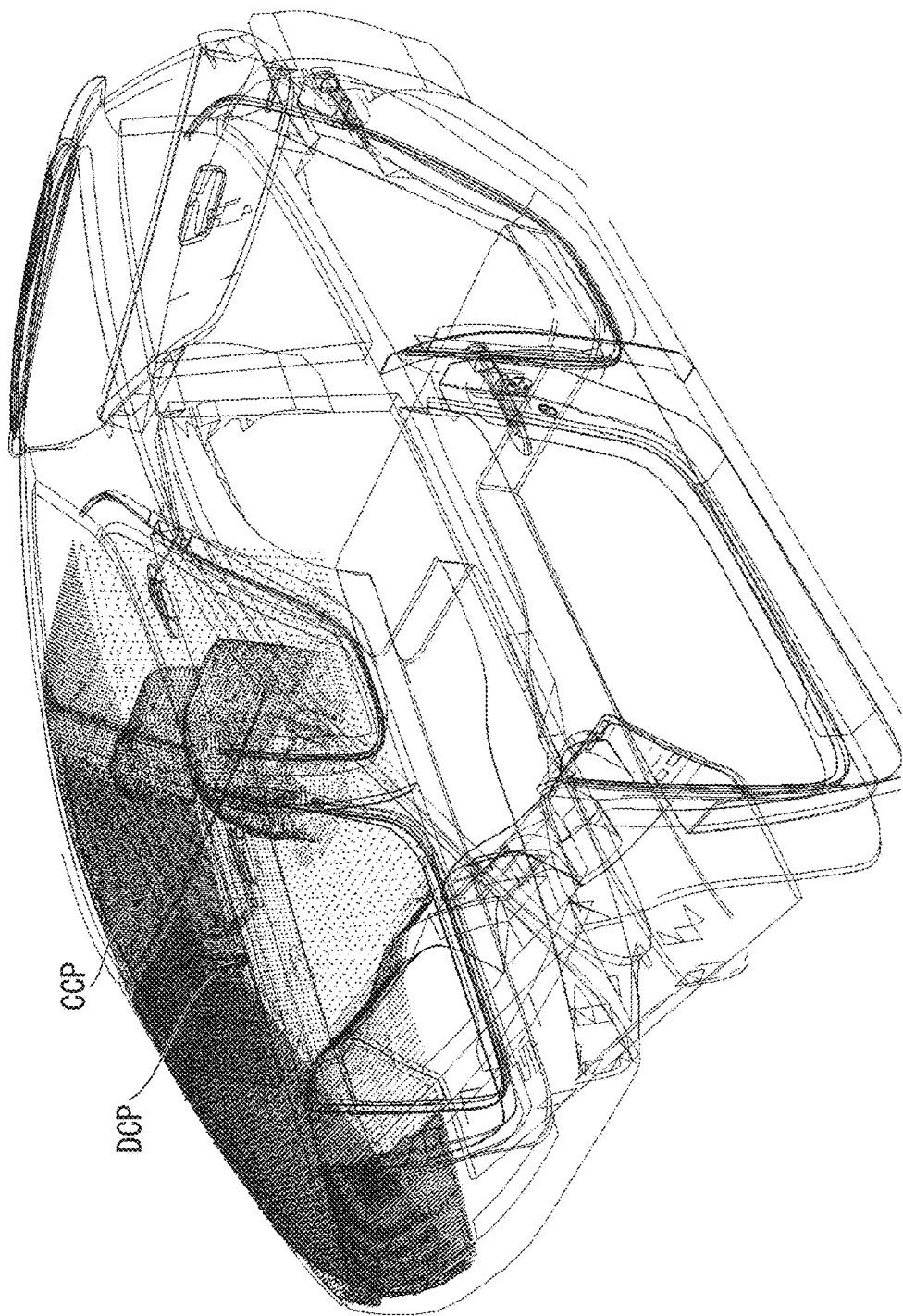
FIG. 26 is a diagram illustrating an example of a generation result of an aggregated domain (domain 4) in a thermal fluid simulation of the present embodiment.
Figure 27:
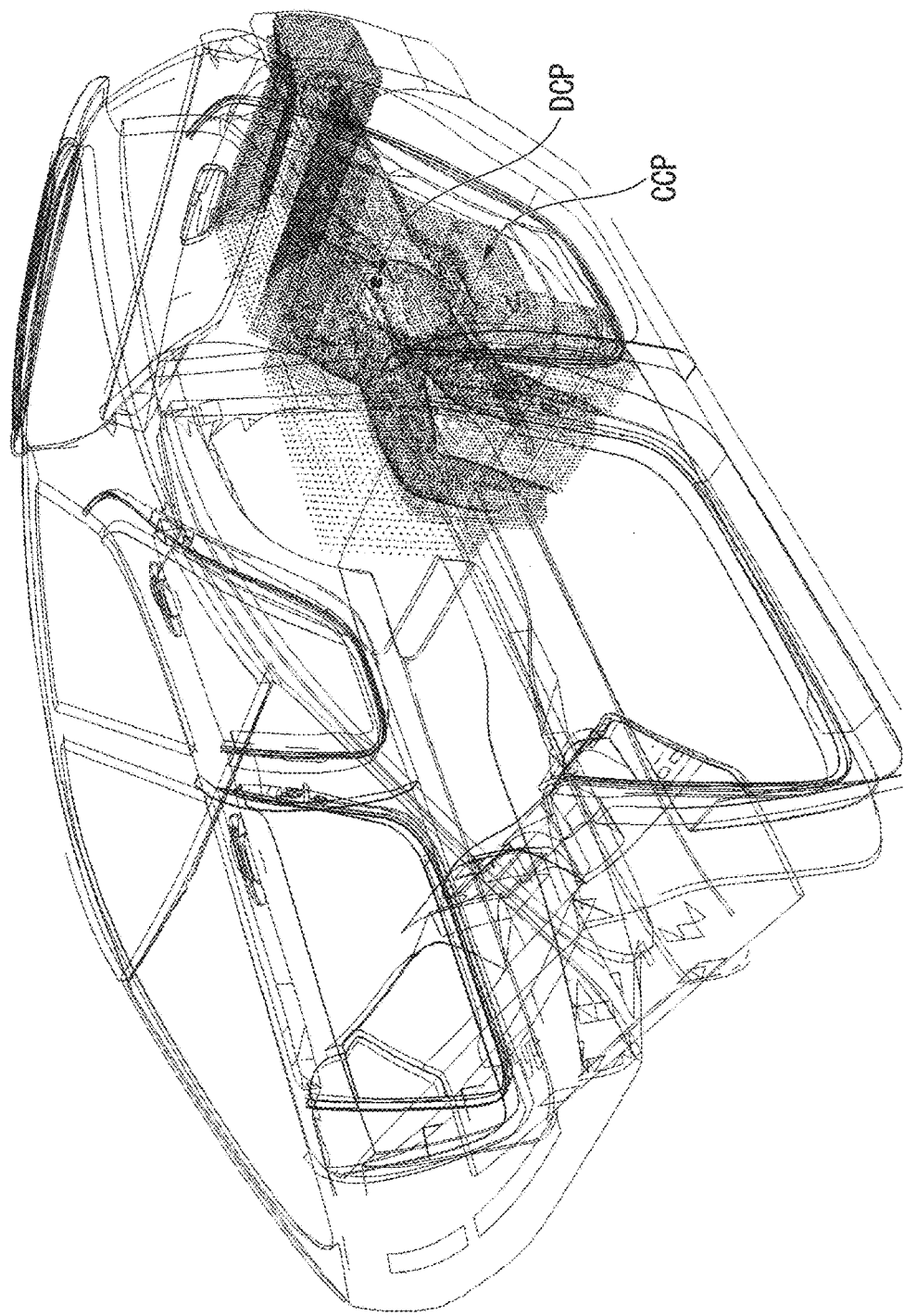
FIG. 27 is a diagram illustrating an example of a generation result of an aggregated domain (domain 5) in a thermal fluid simulation of the present embodiment.
Figure 28:
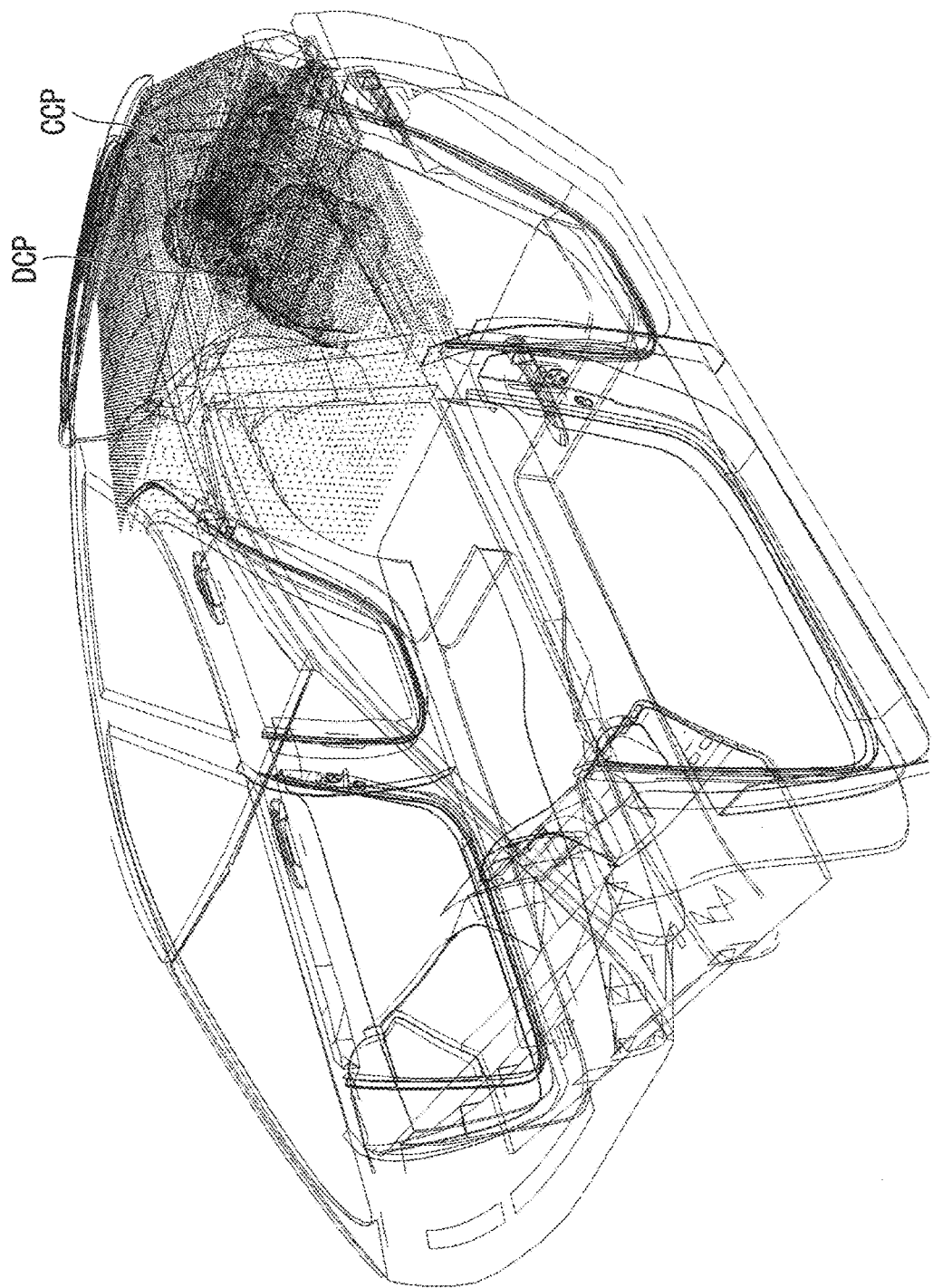
FIG. 28 is a diagram illustrating an example of a generation result of an aggregated domain (domain 6) in a thermal fluid simulation of the present embodiment.
Figure 29:
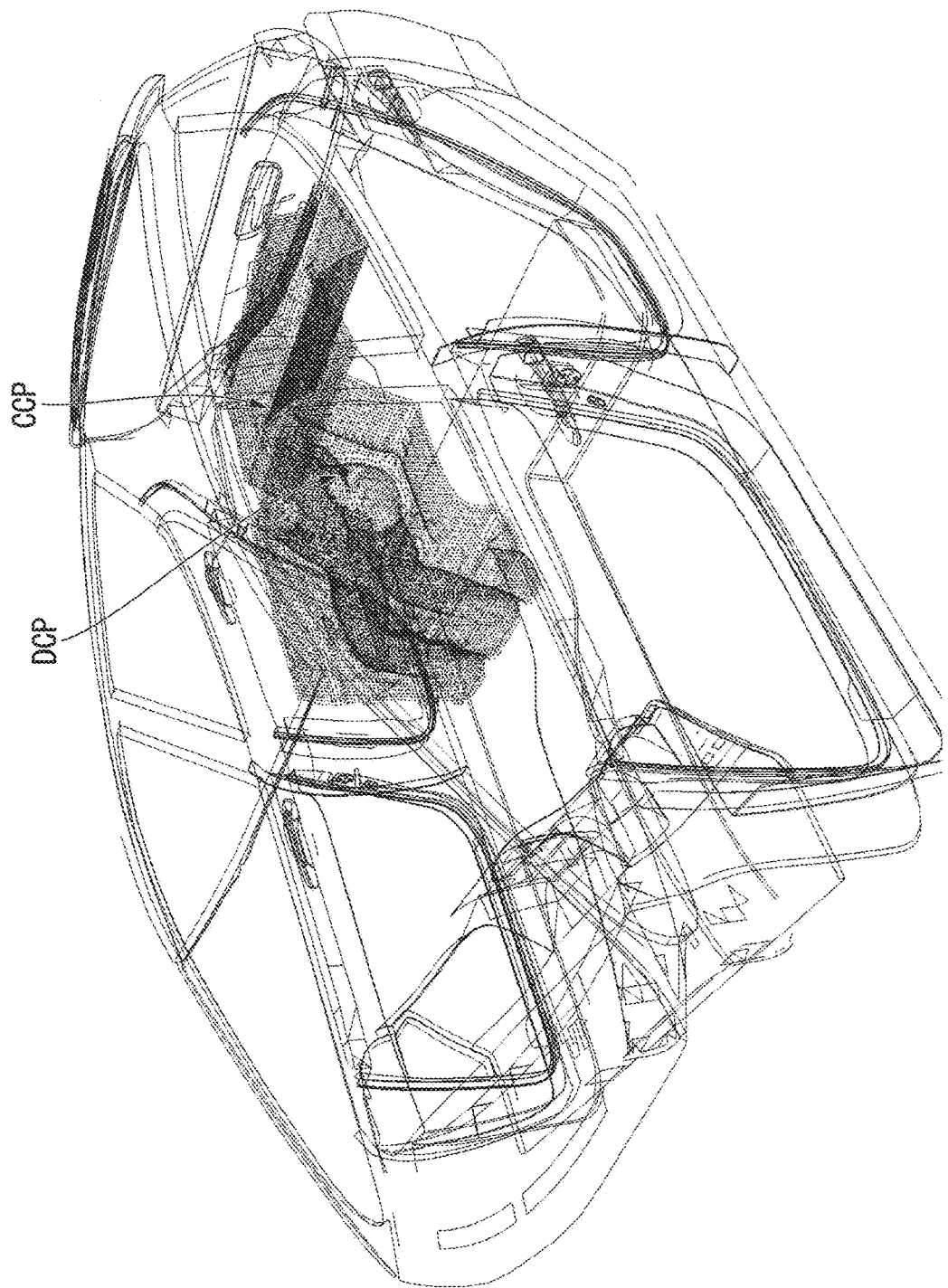
FIG. 29 is a diagram illustrating an example of a generation result of an aggregated domain (domain 7) in a thermal fluid simulation of the present embodiment.
Figure 30:
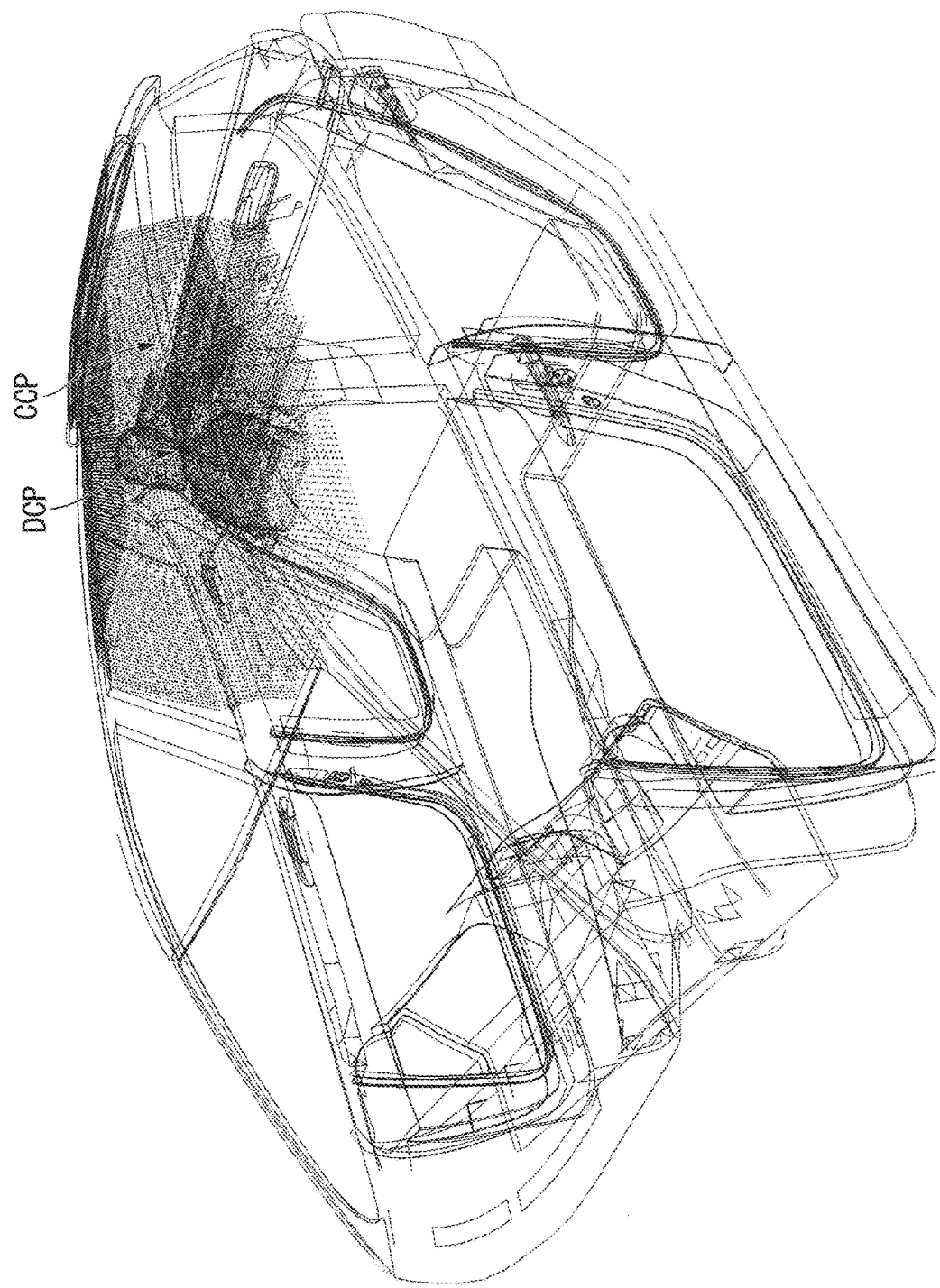
FIG. 30 is a diagram illustrating an example of a generation result of an aggregated domain (domain 8) in a thermal fluid simulation of the present embodiment.

A result of dividing the analysis domain (the cabin of the motor vehicle) into approximately 4,500,000 cells is illustrated in FIG. 22. The numerical analysis apparatus A generates approximately 4,500,000 cells automatically with respect to the analysis domain (the cabin of the motor vehicle), and executes a 3D thermal fluid simulation by using these cells. This corresponds to an initial calculation executed in the case of not setting the correction factor to 1 described above with Step S13. The result of this 3D thermal fluid simulation is used for calculation of a correction factor when obtaining heat conductance.

In the present embodiment, the numerical analysis apparatus A generates approximately 4,500,000 cells automatically with respect to the analysis domain (the cabin of the motor vehicle). By executing the process of generating aggregated domains from cells described above, the numerical analysis apparatus A generates eight aggregated domains (domains). FIG. 23 to FIG. 30 illustrate an example of a result of generation of eight aggregated domains, respectively. In each in FIG. 23 to FIG. 30, a DCP designates the control point of an aggregated domain (domain), and a CCP is one of the control points of cells. FIG. 23 to FIG. 30 illustrate a domain 1 to a domain 8 in this order. Also, although not illustrated in FIG. 23 to FIG. 30, the numerical analysis apparatus A obtains the outside surface for each of the aggregated domains. The numerical analysis apparatus A obtains a boundary condition between the obtained outside surface and a member that contacts the outside surface. The boundary condition may vary depending on the material of the member that contacts the outside surface.

Figure 31:
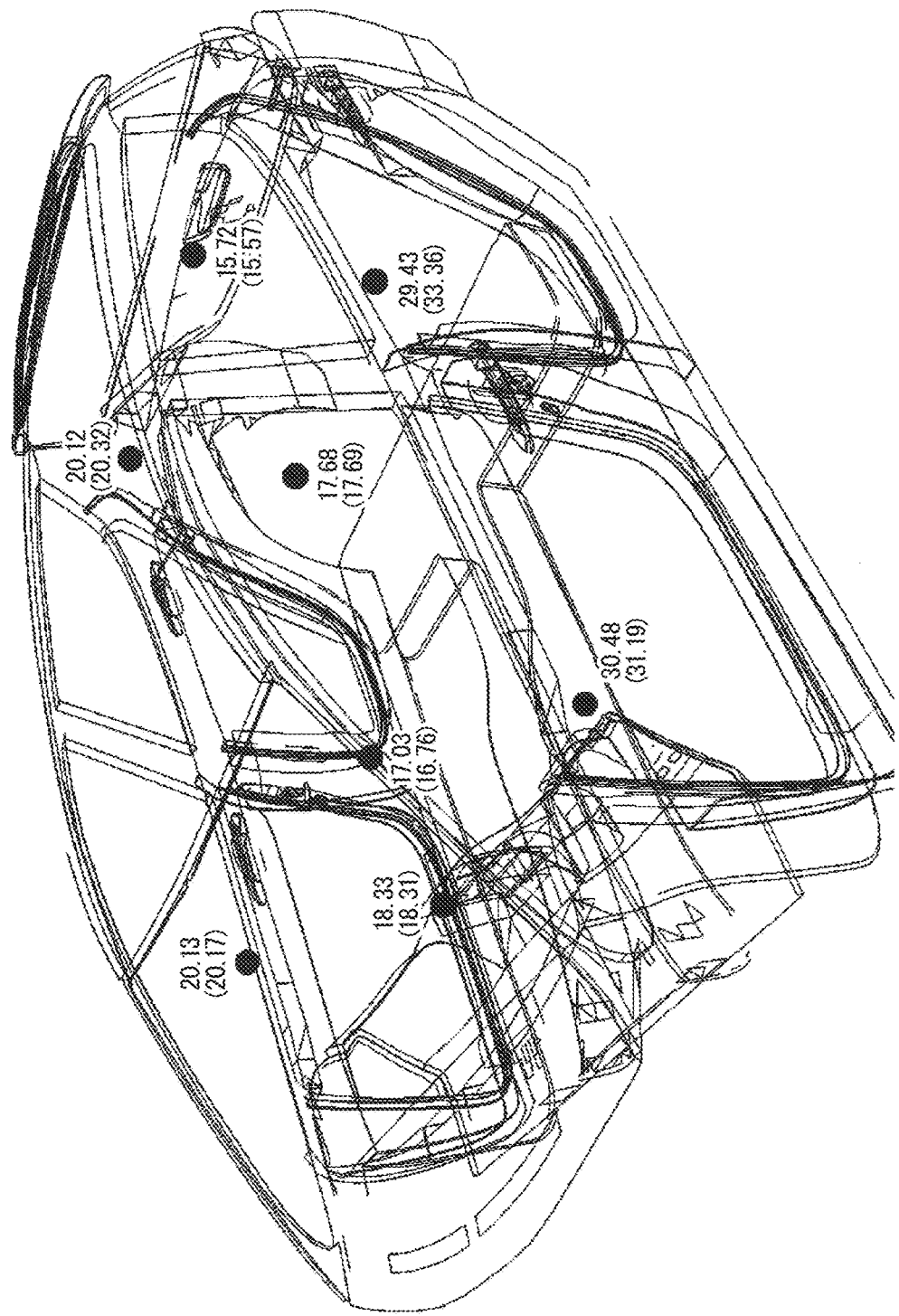
FIG. 31 is a diagram illustrating an example of a result of a thermal fluid simulation (air temperatures) of the present embodiment.
Figure 32:
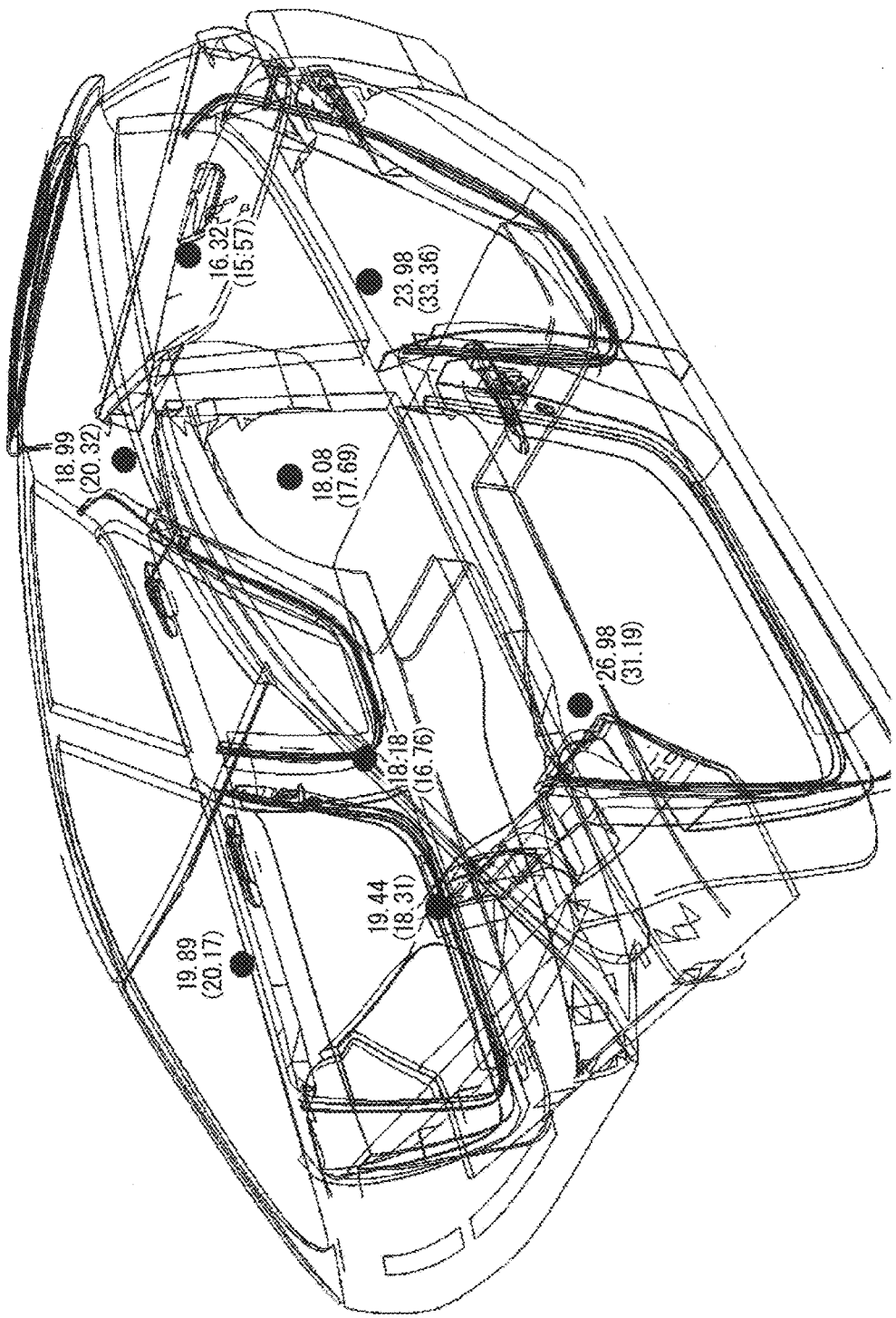
FIG. 32 is a diagram illustrating an example of a result of a thermal fluid simulation (air temperatures) of the present embodiment.

Table 1, Table 2, FIG. 31, and FIG. 32 illustrate examples as results of a numerical calculation of the present embodiment. Table 1 and Table 2 illustrate thermal capacitance of the eight aggregated domains (domains) and heat conductance calculated between the eight aggregated domains (domains), which are obtained by a numerical calculation on the numerical analysis apparatus A. An example illustrated in Table 1 illustrates the case of not setting the correction factor to 1, and an example illustrated in Table 2 illustrates the case of setting the correction factor to 1. In the case of not setting the correction factor to 1, a result of the 3D thermal fluid simulation executed by using approximately 4,500,000 cells described above was used as the initial calculation to be executed in the case of not setting the correction factor to 1 as described above with Step S13.

TABLE 1

(Case of correction coefficient not set to 1)

| | Heat Capacitance (J/K) | Heat Conductance (W/K) | | | | | | | |
|---|---|---|---|---|---|---|---|---|---|
| | | domain1 | domain2 | domain3 | domain4 | domain5 | domain6 | domain7 | domain8 |
| domain1 | 232.522339 | | 303.144043 | 75.510178 | 8.994596 | 46.902405 | 31.335381 | 0 | 0 |
| domain2 | 339.31131 | 303.144043 | | 30.199022 | 316.425995 | 27.338243 | 539.833801 | 0 | 0 |
| domain3 | 247.317749 | 75.510178 | 30.199022 | | 88.792122 | 0 | 0 | 106.180595 | 9.024489 |
| domain4 | 351.003174 | 8.994596 | 316.425995 | 88.792122 | | 0 | 0 | 12.061638 | 104.680679 |
| domain5 | 231.165604 | 46.902405 | 27.338243 | 0 | 0 | | 283.592194 | 77.572823 | 6.163713 |
| domain6 | 344.072357 | 31.335381 | 539.833801 | 0 | 0 | 283.592194 | | 34.402424 | 328.088531 |
| domain7 | 247.348282 | 0 | 0 | 106.180595 | 12.061638 | 77.572823 | 34.402424 | | 122.069153 |
| domain8 | 351.017853 | 0 | 0 | 9.024489 | 104.680679. | 6.163713 | 328.088531 | 122.069153 | |

TABLE 2

(Case of correction coefficient set to 1)

| | Heat Capacitance (J/K) | Heat Conductance (W/K) | | | | | | | |
|---|---|---|---|---|---|---|---|---|---|
| | | domain1 | domain2 | domain3 | domain4 | domain5 | domain6 | domain7 | domain8 |
| domain1 | 232.522339 | | 226.88826 | 62.768387 | 7.363295 | 46.938976 | 22.56254 | 0 | 0 |
| domain2 | 339.31131 | 226.88826 | | 21.685827 | 227.722839 | 20.102888 | 379.715302 | 0 | 0 |

TABLE 2-continued (Case of correction coefficient set to 1)

| | Heat Capacitance (J/K) | Heat Conductance (W/K) | | | | | | | |
|---|---|---|---|---|---|---|---|---|---|
| | | domain1 | domain2 | domain3 | domain4 | domain5 | domain6 | domain7 | domain8 |
| domain3 | 247.317749 | 62.768387 | 21.685827 | | 63.602962 | 0 | 0 | 69.133202 | 8.912815 |
| domain4 | 351.003174 | 7.363295 | 227.722839 | 63.602962 | | 0 | 0 | 7.999777 | 99.992706 |
| domain5 | 231.165604 | 46.938976 | 20.102888 | 0 | 0 | | 199.765991 | 53.303791 | 7.329874 |
| domain6 | 344.072357 | 22.56254 | 379.715302 | 0 | 0 | 199.765991 | | 23.19902 | 251.985153 |
| domain7 | 247.348282 | 0 | 0 | 69.133202 | 7.999777 | 53.303791 | 23.19902 | | 105.522942 |
| domain8 | 351.017853 | 0 | 0 | 8.912815 | 99.992706 | 7.329874 | 251.985153 | 105.522942 | |

The values of the heat conductance and thermal capacitance illustrated in Table 1 and Table 2 are transmitted from the numerical analysis apparatus A to the numerical analysis apparatus B, as described in the implementation method of heat conductance and thermal capacitance on a general-purpose MBD program, as a cabin thermal network model generated on the numerical analysis apparatus A, which connects control points of all the aggregated domains in the analysis domain in a form of a network, and described in a model description language or a programming language. By executing an MBD program, the numerical analysis apparatus B receives the cabin thermal network model data transmitted by the numerical analysis apparatus A, and executes a coupled calculation with one or more models among the air-conditioning model; the engine model; the automobile body heat reserve/transfer model; the outside-vehicle environment insolation/outside-air model; and the other thermal model in the MBL model/library file L stored in the data storage section 2d, to implement on the MBD program so as to be capable of executing thermal fluid analysis in the cabin of the motor vehicle.

For example, assuming that an MBD model of a vehicle air conditioner has been set up on an MBD program, by implementing a thermal network equation described above on the MBD program as the thermal network model, it is possible to execute an unsteady simulation in which the MBD model of the vehicle air conditioner is coupled with the thermal network model representing a temperature distribution of the air in the cabin of the motor vehicle.

For example, during the daytime in summer, although the temperature of the air in a cabin of a motor vehicle parked at a parking lot without a roof may increase up to 30° C. or higher, once the engine has been started, after certain seconds of time passes, the temperature of the air in the cabin may fall down to a target control temperature of air conditioning. In this case, to confirm by what degrees the air temperature falls at the driver's seat, the front passenger's seat, and a backseat, it is possible to execute an unsteady simulation analysis that also includes the three-dimensional air distribution. Note that in the present embodiment, the temperature distribution of the air in a cabin of a motor vehicle is represented at eight control points of aggregated domains (domains). In the case of analyzing the air temperature distribution in more detail, it is necessary to increase the number of aggregated domains (domains).

In the 3D thermal fluid simulation (FIG. 22) that was executed by using approximately 4,500,000 cells automatically generated with respect to the analysis domain (the cabin of the motor vehicle) described above, until a calculation result of a steady state was obtained, it took approximately 30 hours of computation time by using a PC having a CPU of Xeon (2.6 GHz) made by Intel Corp. installed. On the other hand, in the 3D thermal fluid simulation with respect to the eight domains on the same PC, it took one second or less to obtain a calculation result.

Although in an unsteady simulation calculation of an MBD model, such as a vehicle air conditioner implemented on an MBD program, it takes several seconds per step, if coupled with a 3D thermal fluid simulation, the computation time of the 3D thermal fluid simulation serves as a rate limiting factor, to cause the unsteady simulation to take an extremely huge computation time. On the other hand, in the present embodiment, in the case of coupling with the thermal network model that represents the temperature distribution of the air in the cabin of the motor vehicle at the eight control points of aggregated domains (domains), the computation time per step in the unsteady simulation does not significantly increase from the several seconds, and the unsteady simulation can be executed within a practical computation time. In the case of analyzing the distribution of the air temperature in more detail, the number of aggregated domains (domains) is to be increased; however, even if the number is increased to several hundreds, the computation time per step in the unsteady simulation does not increase greatly from the several seconds, and the unsteady simulation can be executed within a practical computation time.

Therefore, in the case where the user of the numerical analysis apparatus A, the numerical analysis method, and the numerical analysis program of the present embodiment changes the shape of the cabin of the motor vehicle as the analysis domain depending on a result of the unsteady simulation in which the MBD model of the vehicle air conditioner is coupled with the thermal network model representing the temperature distribution of the air in the cabin of the motor vehicle, and repeats the unsteady simulation again starting from the three-dimensional shape data in which the shape of the analysis domain has been changed, the unsteady simulation can be executed within a practical computation time.

In other words, by evaluating calculation result data obtained by the unsteady simulation, if the user determines that a desired result has been obtained with the three-dimensional shape data to be analyzed, the user may end the simulation. Alternatively, by evaluating calculation result data obtained by the unsteady simulation, if the user determines that a desired result has not been obtained with the three-dimensional shape data to be analyzed, the user may modify the three-dimensional shape data, to execute the simulation again. In the above operations, if the simulation exhibits a desired result, the user may determine that the design of a physical entity (e.g., the inside of a cabin of a motor vehicle, a cockpit, a residence, an electric device, an industrial device, a manufacturing device of glass, steel, and the like, or anything that constitutes a closed space) represented by the three-dimensional shape data to be analyzed is satisfactory, and may proceed to manufacture and/or produce the physical entity. On the other hand, if the simulation does not exhibit a desired result, the user may determine that the design of a physical entity represented by the three-dimensional shape data to be analyzed is not satisfactory, and may proceed to change the design of the physical entity, to execute the simulation again based on the three-dimensional shape data after the design change.

FIG. 31 and FIG. 32 illustrate a result of a thermal fluid simulation of the air in the cabin obtained by numerical calculation executed by an MBD program with respect to a cabin thermal network model that was generated by using numerical values of the thermal capacitance and heat conductance illustrated in Table 1 and Table 2 obtained by numerical calculation on the numerical analysis apparatus A; transmitted to the numerical analysis apparatus B; and coupled with the air-conditioning model of the numerical analysis apparatus B to be calculated. Numerical values of air temperatures in the eight aggregated domains (domain) are illustrated, which were obtained by an unsteady thermal fluid simulation that was executed under fixed conditions of the outside-vehicle reference temperature set to 35 degrees; the outside-vehicle heat transfer rate set to 40 W/m$^2$K; the number of occupants in the motor vehicle being four; the wind velocity blowing out of the air conditioner set to 5 m/s; and the air temperature blowing out of the air conditioner set at 8° C., with the initial temperature in the cabin set at 35° C., where the air temperature in the cabin fell by air conditioning, and then, reached a steady state of the air temperature being steady and unchanged in time. FIG. 31 illustrates a result in the case of the correction factor not set to 1, and FIG. 32 illustrates a result in the case of the correction factor set to 1.

By comparing the results in FIG. 31 with the result in FIG. 32, the calculation precision is compared.

In FIG. 31 and FIG. 32, in lower parentheses below air temperature values, a result of a steady analysis of a 3D thermal fluid simulation executed by using approximately 4,500,000 cells under the same boundary conditions are presented. It can be understood that as for the calculation result of the air temperatures with respect to the aggregated domains (domains), the result in the case of the correction factor not set to 1 (FIG. 31) is more consistent with the result of the steady analysis of the 3D thermal fluid simulation executed by using approximately 4,500,000 cells under the same boundary conditions. From this, it can be understood that use of the correction factor improves the calculation precision. However, in the case of using the correction factor, one execution for results of a 3D thermal fluid simulation with respect to cells is required, and its simulation time increases the entire analysis time. In the present embodiment, although an application example of eight aggregated domains (domains) has been presented, if the number of aggregated domains (domains) is increased to several hundred, it is possible to analyze the air temperature distribution with a comparatively good precision even if setting the correction factor to 1. By selecting whether to use the correction factor and the number of aggregated domains (domains) in accordance with the purpose of analysis or a required precision, it is possible to improve the precision of distribution of air temperature.

According to the numerical analysis apparatus A, the numerical analysis apparatus B, the numerical analysis method, and the numerical analysis program of the present embodiment as above, in the preprocess, a calculation data model M is generated to include the volume of each control volume and the area and the normal vector of each boundary surface; and in the solver process, by using the volume of each control volume, the area and the normal vector of each boundary surface, links between the domains, and the distances between the control points of a domains, the conductance representing a characteristic with respect to transfer of a physical quantity between aggregated domains, and the capacitance representing a characteristic with respect to accumulation of the physical quantity for each aggregated domain are calculated.

Also, according to the numerical analysis apparatus A, the numerical analysis apparatus B, the numerical analysis method, and the numerical analysis program of the present embodiment, since analysis is executed not with respect to divided domains but with respect to aggregated domains, it is possible to shorten the calculation time. Especially, in the case of setting the correction factor to 1, although the analysis precision may fall depending on how domains are divided, the calculation time is further shortened compared to the case of setting the correction factor not to 1. The numerical analysis apparatus A, the numerical analysis method, and the numerical analysis program of the present embodiment can reflect the shape of the body of the motor vehicle; the energy consumption in heating ventilation and air conditioning (HVAC); existence of glasses and persons; external insolation energy; humidity; the vehicle speed; and the like in a simulation model, to calculate physical quantities that represent a characteristic with respect to transfer of energy between aggregated domains, and accumulation of energy for each aggregated domain. Here, the physical quantities include thermal capacitance (heat capacity) and heat conductance.

Also, the numerical analysis apparatus A, the numerical analysis method, and the numerical analysis program of the present embodiment can be applied to, other than the above application to a motor vehicle, thermal analysis of an engine, thermal analysis of exhaust gas, thermal analysis of an engine room, analysis of fuel efficiency of a motor vehicle, and the like.

Also, the numerical analysis apparatus A, the numerical analysis method, and the numerical analysis program of the present embodiment can be applied to, other than fields related to a motor vehicle, thermal analysis and sound analysis of an interior space, such as a cabin or cockpit, of an aircraft, vessel, spacecraft, space station; thermal analysis and sound analysis of an interior space of a residence, building, atrium, and the like; thermal analysis and sound analysis of the inside of an electric device or an industrial device; and thermal analysis and sound analysis of a device itself of a production facility of glass, steel, and the like.

As above, although the preferred embodiments have been described above with reference to the accompanying drawings, it is needless to say that an embodiment is not limited to the embodiments described above. The shapes and combinations of the elements illustrated in the above embodiments are merely examples, and various modifications can be made based on design requirements and the like without departing from the gist of the embodiments.

In the above embodiments, a configuration has been described in which the air temperature is obtained by numerical analysis that uses the discretized governing equations derived from the equation of heat conduction and the heat advection-diffusion equation.

However, the present invention is not limited as such; a physical quantity may be calculated by numerical analysis using a discretized governing equation derived from at least any one of the mass conservation equation, the equation for conservation of momentum, the equation of conservation of angular momentum, the equation for conservation of energy, the advection-diffusion equation, and the wave equation.

Also, in the above embodiments, a configuration has been described in which the area of a boundary surface and the normal vector of the boundary surface are used as the boundary-surface characteristic quantities of the present invention.

However, the present invention is not limited as such; as the boundary-surface characteristic quantity, another quantity (e.g., the perimeter of the boundary surface) may be used.

Also, in the above embodiments, a configuration has been described in which a calculation data model is generated such that the three conditions described above are satisfied so as to satisfy the conservation law.

However, the present invention is not limited as such; if the conservation law does not need to be satisfied, the calculation data model does not necessarily need to be generated to satisfy the three conditions described above.

Also, in the above embodiments, a configuration has been described in which the volume of a divided domain is regarded as the volume of a control volume occupied by a control point arranged inside of the divided domain.

However, the present embodiment is not limited as such; a control point does not necessarily need to be arranged inside of the divided domain. In the case where a dented surface exists on the boundary shape forming a divided domain, the control point may be located on the outside of the divided domain. Even in such a case, it is possible to execute numerical analysis by replacing the volume of a control volume with the volume of the divided domain.

Also, in the above embodiments, a configuration has been described in which the numerical analysis program P is stored in the DVD medium X so as to be conveyable.

However, the present invention is not limited as such; another configuration can also be adopted in which the numerical analysis program P is stored in another removable medium so as to be conveyable.

Also, the preprocess program P1 and the solver process program P2 may be stored in separate removable media so as to be conveyable. Also, the numerical analysis program P may also be transferred through a network.

In the above embodiment, the numerical analysis apparatus A and the numerical analysis apparatus B are examples of a computer, the numerical analysis apparatus A is an example of a numerical analysis apparatus, and the numerical analysis apparatus B is an example of another numerical analysis apparatus.

Furthermore, with respect to the embodiments described above, the following notes are further disclosed.
(Note 1)
A simulation method executed by a computer to numerically analyze a physical quantity in a physical phenomenon, the method comprising:
obtaining by the computer three-dimensional shape data of an analysis domain from an external device;
dividing the analysis domain into a plurality of divided domains;
generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;
generating a requested number of aggregated domains by aggregating the divided domains;
generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;
calculating, based on a physical property in the analysis domain and the calculation data model with respect to the aggregated domains, conductance representing a characteristic with respect to transfer of the physical quantity between the aggregated domains and to the outside of the analysis domain, and capacitance representing a characteristic with respect to accumulation of the physical quantity for each aggregated domain;
storing the conductance and the capacitance in a memory of the computer, to enable an unsteady calculation of the physical quantity in another analysis domain including the analysis domain; and
repeating when the shape of the analysis domain is changed by a user of the simulation method depending on a result of the unsteady calculation, starting from the three-dimensional shape data having the shape of the analysis domain changed and up to the unsteady calculation again.
(Note 2)
A simulation method executed by a computer to numerically analyze a physical quantity in a physical phenomenon, the method comprising:
obtaining by the computer three-dimensional shape data of an analysis domain from an external device;
dividing the analysis domain into a plurality of divided domains;
generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;
generating a requested number of aggregated domains by aggregating the divided domains;
generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;

calculating, based on a physical property in the analysis domain and the calculation data model with respect to the aggregated domains, conductance representing a characteristic with respect to transfer of the physical quantity between the aggregated domains and to the outside of the analysis domain, and capacitance representing a characteristic with respect to accumulation of the physical quantity for each aggregated domain; and storing the conductance and the capacitance in a memory of the computer, to enable an unsteady calculation of the physical quantity in another analysis domain including the analysis domain.

(Note 3)

The method as described in note 1 or 2, wherein the divided domains are formed such that a condition that a total sum of volumes of all the divided domains is equivalent to a volume of the analysis domain, a condition that an area of a boundary surface is equivalent for divided domains adjacent to each other forming the boundary surface;

a condition that a normal vector of the boundary surface has an absolute value that is equivalent in either case of viewing from one of the divided domains adjacent to each other forming the boundary surface, or of viewing from another of the divided domains adjacent to each other; and a condition that a following Equation (1) is satisfied, $$\sum_{i=1}^{m} [(n_i \cdot n_p) \cdot S_i] = 0 \quad (1)$$

where $[n]_p$ represents a unit normal vector of an infinitely large projection plane P that passes through a divided domain, the unit normal vector being directed in an arbitrary direction; $S_i$ represents an area of a boundary surface of the divided domain; $[n]_i$ represents a unit normal vector of the boundary surface; m represents a total number of boundary surfaces of the divided domain; and a boldface character parenthesized in [ ] represents a vector, are satisfied.

(Note 4)

The method as described in any one of notes 1 to 3, wherein the aggregated-domain characteristic quantity includes a boundary-surface characteristic quantity that represents a characteristic of a boundary surface of aggregated domains adjacent to each other; linkage information on the aggregated domains adjacent to each other; and a distance between the aggregated domains adjacent to each other, and wherein the divided-domain characteristic quantity includes a boundary-surface characteristic quantity that represents a characteristic of a boundary surface of divided domains adjacent to each other; linkage information on the divided domains adjacent to each other; and a distance between the divided domains adjacent to each other.

(Note 5)

The method as described in note 4, wherein the boundary-surface characteristic quantity that represents the characteristic of the boundary surface of the aggregated domains adjacent to each other includes an area of the boundary surface of the aggregated domains adjacent to each other and a normal vector of the boundary surface, and wherein the boundary-surface characteristic quantity that represents the characteristic of the boundary surface of the divided domains adjacent to each other includes an area of the boundary surface of the divided domains adjacent to each other and a normal vector of the boundary surface.

(Note 6)

The method as described in any one of notes 1 to 5, the method further comprising:

deriving a correction factor for calculation with respect to the aggregated domains, based on the physical property and the physical quantity as an analysis result of the physical phenomenon by the calculation data model with respect to the divided domains, wherein the conductance and the capacitance are calculated based on the physical property and the physical quantity as an analysis result of the physical phenomenon by a corrected calculation data model with respect to the aggregated domains, the corrected calculation data model with respect to the aggregated domain being based on a corrected governing equation obtained by correcting the governing equation with respect to the aggregated domains with the correction factor.

(Note 7)

The method as described in any one of notes 1 to 6, wherein the governing equation with respect to the divided domains and the governing equation with respect to the aggregated domains are derived in advance from among a mass conservation equation, an equation for conservation of momentum, an equation for conservation of energy, an advection-diffusion equation, and a wave equation, and stored.

(Note 8)

A simulation method by an MBD program, the method comprising:

using the conductance and the capacitance obtained by the method as described in any one of notes 1 to 7; and further executing the unsteady calculation of the physical quantity in said another analysis domain including the analysis domain.

(Note 9)

A numerical analysis apparatus to numerically analyze a physical quantity in a physical phenomenon, comprising:

a communication device configured to exchange data with an external device;

an arithmetic/logic unit configured to execute obtaining three-dimensional shape data of an analysis domain from the external device via the communication device, dividing the analysis domain into a plurality of divided domains, and generating a requested number of aggregated domains by aggregating the divided domains; and a storage configured to store a discretized governing equation with respect to the divided domains that uses only quantities that do not require coordinates of vertices of the divided domains and connectivity information on the vertices, and is derived by a weighted residual method, and a discretized governing equation with respect to the aggregated domains that uses only quantities that do not require coordinates of vertices of the aggregated domains and connectivity information on the vertices, and is derived by a weighted residual method, wherein the arithmetic/logic unit generates a calculation data model with respect to the divided domains based on the discretized governing equation with respect to the divided domains stored in the storage, the calculation data model including a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices, generates a calculation data model with respect to the aggregated domains based on the discretized governing equation with respect to the aggregated domains stored in the storage, the calculation data model including a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices, based on a physical property in the analysis domain and the calculation data model with respect to the aggregated domains, calculates, based on a physical property in the analysis domain and the calculation data model with respect to the aggregated domains, conductance representing a characteristic with respect to transfer of the physical quantity between the aggregated domains and to the outside of the analysis domain, and capacitance representing a characteristic with respect to accumulation of the physical quantity for each aggregated domain, and stores the conductance and the capacitance in a memory of the computer, to enable an unsteady calculation of the physical quantity in another analysis domain including the analysis domain.

(Note 10)

A numerical analysis system for MBD, comprising:

the numerical analysis apparatus as described in note 9; and another numerical analysis apparatus configured to have an MBD program installed, wherein the MBD program causes a computer to use, as input data, the conductance and the capacitance that have been calculated by the numerical analysis apparatus and stored in the memory, and to execute the unsteady calculation of the physical quantity in said another analysis domain including the analysis domain.

(Note 11)

A numerical analysis system for MBD, configured to have an MBD program installed, wherein the MBD program causes a computer to use, as input data, the conductance and the capacitance that have been calculated by the numerical analysis apparatus as described in note 9 and stored in the memory, and to execute the unsteady calculation of the physical quantity in said another analysis domain including the analysis domain.

(Note 12)

A numerical analysis program that causes a computer to execute a process comprising:

obtaining from an external device three-dimensional shape data of an analysis domain in which a physical quantity in a physical phenomenon is to be analyzed;

dividing the analysis domain into a plurality of divided domains;

generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;

generating a requested number of aggregated domains by aggregating the divided domains;

generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;

calculating, based on a physical property in the analysis domain and the calculation data model with respect to the aggregated domains, conductance representing a characteristic with respect to transfer of the physical quantity between the aggregated domains and to the outside of the analysis domain, and capacitance representing a characteristic with respect to accumulation of the physical quantity for each aggregated domain; and storing the conductance and the capacitance in a memory of the computer, to enable an unsteady calculation of the physical quantity in another analysis domain including the analysis domain.

(Note 13)

An MBD program, comprising:

the numerical analysis program as described in note 12; and an MBD program that causes a computer to use, as input data, the conductance and the capacitance that have been calculated by the numerical analysis program and stored in the memory, and to execute the unsteady calculation of the physical quantity in said another analysis domain including the analysis domain.

(Note 14)

An MBD program that causes a computer to use, as input data, the conductance and the capacitance that has been calculated by the numerical analysis program as described in note 12 and stored in the memory, and to execute the unsteady calculation of the physical quantity in said another analysis domain including the analysis domain.

The invention claimed is:

1. A simulation method of simulating a cabin of a vehicle, the simulation method being executed by a computer to numerically analyze a physical quantity, which includes airflow temperature in the cabin of the vehicle, in a physical phenomenon, the method comprising:
obtaining, by the computer from an external device, three-dimensional shape data of an analysis domain of the cabin of the vehicle;
dividing the analysis domain into a plurality of divided domains;
generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;
generating a requested number of aggregated domains by aggregating the divided domains;
generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;
calculating, based on a physical property in the analysis domain and the calculation data model with respect to the aggregated domains, conductance representing a characteristic with respect to transfer of the physical quantity, which includes the airflow temperature in the cabin of the vehicle, between the aggregated domains and to the outside of the analysis domain, and capacitance representing a characteristic with respect to accumulation of the physical quantity, which includes the airflow temperature in the cabin of the vehicle, for each aggregated domain; and
storing the conductance and the capacitance in a memory of the computer, to enable an unsteady calculation of the physical quantity, which includes the airflow temperature in the cabin of the vehicle, in another analysis domain including the analysis domain.

2. The method as claimed in claim 1, wherein the divided domains are formed such that
a condition that a total sum of volumes of all the divided domains is equivalent to a volume of the analysis domain,
a condition that an area of a boundary surface is equivalent for divided domains adjacent to each other forming the boundary surface,
a condition that a normal vector of the boundary surface has an absolute value that is equivalent in either case of viewing from one of the divided domains adjacent to each other forming the boundary surface, or of viewing from another of the divided domains adjacent to each other, and
a condition that a following Equation (1) is satisfied, $$\sum_{i=1}^{m} [(n_i \cdot n_p) \cdot S_i] = 0 \qquad (1)$$

where [n]p represents a unit normal vector of an infinitely large projection plane P that passes through a divided domain, the unit normal vector being directed in an arbitrary direction; Si represents an area of a boundary surface of the divided domain; [n]i represents a unit normal vector of the boundary surface; m represents a total number of boundary surfaces of the divided domain; and a boldface character parenthesized in [ ] represents a vector, are satisfied.

3. The method as claimed in claim 1,
wherein the aggregated-domain characteristic quantity includes
a boundary-surface characteristic quantity that represents a characteristic of a boundary surface of aggregated domains adjacent to each other,
linkage information on the aggregated domains adjacent to each other, and
a distance between the aggregated domains adjacent to each other, and
wherein the divided-domain characteristic quantity includes
a boundary-surface characteristic quantity that represents a characteristic of a boundary surface of divided domains adjacent to each other,
linkage information on the divided domains adjacent to each other, and
a distance between the divided domains adjacent to each other.

4. The method as claimed in claim 3, wherein the boundary-surface characteristic quantity that represents the characteristic of the boundary surface of the aggregated domains adjacent to each other includes an area of the boundary surface of the aggregated domains adjacent to each other and a normal vector of the boundary surface, and
wherein the boundary-surface characteristic quantity that represents the characteristic of the boundary surface of the divided domains adjacent to each other includes an area of the boundary surface of the divided domains adjacent to each other and a normal vector of the boundary surface.

5. The method as claimed in claim 1, further comprising:
deriving a correction factor for calculation with respect to the aggregated domains, based on the physical property and the physical quantity, which includes the airflow temperature in the cabin of the vehicle, as an analysis result of the physical phenomenon by the calculation data model with respect to the divided domains,
wherein the conductance and the capacitance are calculated based on the physical property and the physical quantity, which includes the airflow temperature in the cabin of the vehicle, as an analysis result of the physical phenomenon by a corrected calculation data model with respect to the aggregated domains, the corrected calculation data model with respect to the aggregated domain being based on a corrected governing equation obtained by correcting the governing equation with respect to the aggregated domains with the correction factor.

6. The method as claimed in claim 1, wherein the governing equation with respect to the divided domains and the governing equation with respect to the aggregated domains are derived in advance from among a mass conservation equation, an equation for conservation of momentum, an equation for conservation of energy, an advection-diffusion equation, and a wave equation, and stored.

7. A simulation method by an MBD (Model-Based Development) program, the method comprising:
using the conductance and the capacitance obtained by the method as claimed in claim 1; and
executing the unsteady calculation of the physical quantity, which includes the airflow temperature in the cabin of the vehicle, in said another analysis domain including the analysis domain.

8. The method as claimed in claim 1, wherein
the physical phenomenon includes heat transfer,
the analysis domain is of an entire region of the cabin of the vehicle, and
each divided domain of the divided domains is of a sub-region of the cabin of the vehicle.

9. A numerical analysis apparatus that simulates a cabin of a vehicle to numerically analyze a physical quantity, which includes airflow temperature in the cabin of the vehicle, in a physical phenomenon, the numerical analysis apparatus comprising:
a communication device configured to exchange data with an external device;
processing circuitry configured to
obtain three-dimensional shape data of an analysis domain of the cabin of the vehicle from the external device via the communication device,
divide the analysis domain into a plurality of divided domains, and
generate a requested number of aggregated domains by aggregating the divided domains; and
a storage configured to store
a discretized governing equation with respect to the divided domains that uses only quantities that do not require coordinates of vertices of the divided domains and connectivity information on the vertices, and is derived by a weighted residual method, and
a discretized governing equation with respect to the aggregated domains that uses only quantities that do not require coordinates of vertices of the aggregated domains and connectivity information on the vertices, and is derived by a weighted residual method,
wherein the processing circuitry is configured to
generate a calculation data model with respect to the divided domains based on the discretized governing equation with respect to the divided domains stored in the storage, the calculation data model including a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices,
generate a calculation data model with respect to the aggregated domains based on the discretized governing equation with respect to the aggregated domains stored in the storage, the calculation data model including a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices,
calculate, based on a physical property in the analysis domain and the calculation data model with respect to the aggregated domains, conductance representing a characteristic with respect to transfer of the physical quantity, which includes the airflow temperature in the cabin of the vehicle, between the aggregated domains and to the outside of the analysis domain, and capacitance representing a characteristic with respect to accumulation of the physical quantity, which includes the airflow temperature in the cabin of the vehicle, for each aggregated domain, and
store the conductance and the capacitance in the storage, to enable an unsteady calculation of the physical quantity, which includes the airflow temperature in the cabin of the vehicle, in another analysis domain including the analysis domain.

10. A numerical analysis system for MBD (Model-Based Development), the numerical analysis system comprising:
the numerical analysis apparatus as claimed in claim 9; and
another numerical analysis apparatus configured to have an MBD program installed,
wherein the MBD program causes a computer to use, as input data, the conductance and the capacitance that have been calculated by the numerical analysis apparatus and stored in the storage, and to execute the unsteady calculation of the physical quantity, which includes the airflow temperature in the cabin of the vehicle, in said another analysis domain including the analysis domain.

11. A numerical analysis system for MBD (Model-Based Development), the numerical analysis system comprising:
a computer configured to use, as input data, the conductance and the capacitance that have been calculated by the numerical analysis apparatus as claimed in claim 9 and stored in the storage, and to execute the unsteady calculation of the physical quantity, which includes the airflow temperature in the cabin of the vehicle, in said another analysis domain including the analysis domain.

12. A non-transitory computer-readable storage medium including a numerical analysis program, wherein the numerical analysis program, when executed by a computer, causes the computer to perform a method of simulating a cabin of a vehicle, the method comprising:
obtaining, from an external device, three-dimensional shape data of an analysis domain of the cabin of the vehicle in which a physical quantity, which includes airflow temperature in the cabin of the vehicle, in a physical phenomenon is to be analyzed;
dividing the analysis domain into a plurality of divided domains;
generating a calculation data model with respect to the divided domains based on a discretized governing equation with respect to the divided domains that uses only quantities that do not require coordinates of vertices of the divided domains and connectivity information on the vertices, wherein the discretized governing equation is derived by a weighted residual method, and the calculation data model includes a volume of each divided domain and a divided-domain characteristic quantity representing a characteristic quantity of said each divided domain with respect to each adjacent divided domain as the quantities that do not require the coordinates of the vertices of the divided domains and the connectivity information on the vertices;

generating a requested number of aggregated domains by aggregating the divided domains;

generating a calculation data model with respect to the aggregated domains based on a discretized governing equation with respect to the aggregated domains that uses only quantities that do not require coordinates of vertices of the aggregated domains and connectivity information on the vertices, wherein the discretized governing equation is derived by a weighted residual method, and the calculation data model includes a volume of each aggregated domain and an aggregated-domain characteristic quantity representing a characteristic quantity of said each aggregated domain with respect to each adjacent aggregated domain as the quantities that do not require the coordinates of the vertices of the aggregated domains and the connectivity information on the vertices;

calculating, based on a physical property in the analysis domain and the calculation data model with respect to the aggregated domains, conductance representing a characteristic with respect to transfer of the physical quantity, which includes the airflow temperature in the cabin of the vehicle, between the aggregated domains and to the outside of the analysis domain, and capacitance representing a characteristic with respect to accumulation of the physical quantity, which includes the airflow temperature in the cabin of the vehicle, for each aggregated domain; and storing the conductance and the capacitance in a memory of the computer, to enable an unsteady calculation of the physical quantity, which includes the airflow temperature in the cabin of the vehicle, in another analysis domain including the analysis domain.

13. The non-transitory computer-readable storage medium as claimed in claim 12, further comprising:

causing a computer to use, as input data, the conductance and the capacitance that have been calculated and stored in the memory, and to execute the unsteady calculation of the physical quantity, which includes the airflow temperature in the cabin of the vehicle, in said another analysis domain including the analysis domain.

* * * * *